US007831518B2

(12) United States Patent
Montgomery et al.

(10) Patent No.: US 7,831,518 B2
(45) Date of Patent: Nov. 9, 2010

(54) SYSTEMS AND METHODS FOR DETECTING POSTAGE FRAUD USING AN INDEXED LOOKUP PROCEDURE

(75) Inventors: Scott Montgomery, Los Altos, CA (US); Harry T. Whitehouse, Portola Valley, CA (US)

(73) Assignee: PSI Systems, Inc., Palo Alto, CA (US)

( * ) Notice: Subject to any disclaimer, the term of this patent is extended or adjusted under 35 U.S.C. 154(b) by 1191 days.

(21) Appl. No.: 09/990,341

(22) Filed: Nov. 20, 2001

(65) Prior Publication Data

US 2003/0101148 A1 May 29, 2003

(51) Int. Cl.
*G06F 17/00* (2006.01)
*G07B 17/02* (2006.01)

(52) U.S. Cl. ........................... 705/62; 705/60; 705/401; 705/408

(58) Field of Classification Search ............. 705/60–62, 705/400–411; 707/102; 380/23–25, 51; 283/71
See application file for complete search history.

(56) References Cited

U.S. PATENT DOCUMENTS

| | | | |
|---|---|---|---|
| 4,253,158 | A | 2/1981 | McFiggans |
| 4,376,299 | A | 3/1983 | Rivest |
| 4,641,347 | A | 2/1987 | Clark et al. |
| 4,725,718 | A | 2/1988 | Sansone et al. |
| 4,743,747 | A | 5/1988 | Fougere et al. |
| 4,757,537 | A | 7/1988 | Edelmann et al. |
| 4,763,271 | A | 8/1988 | Field |
| 4,775,246 | A | 10/1988 | Edelmann et al. |
| 4,800,506 | A | 1/1989 | Axelrod et al. |

(Continued)

FOREIGN PATENT DOCUMENTS

| | | |
|---|---|---|
| EP | 0 137 737 A2 | 4/1985 |

(Continued)

OTHER PUBLICATIONS

Newsbytes: "UPS Customers Use PCs to Track Their Parcels", Oct. 11, 1993, pN/A.*

(Continued)

*Primary Examiner*—Andrew J. Fischer
*Assistant Examiner*—Joshua Murdough
(74) *Attorney, Agent, or Firm*—Pillsbury Winthrop Shaw Pittman LLP

(57) ABSTRACT

A method and system for using an indexing identifier (such as, e.g., a tracking ID or the combination of a postage vendor ID, user account, and piece count) to decrease the size of the postage indicium transmitted to an end user computer, or eliminate transmission of the postage indicium altogether, is provided. When the postage indicium for the end user computer is generated, it is stored, and the indexing identifier, rather than the postage indicium, is transmitted to the end user computer. The indexing identifier is applied to a mail piece, which is then scanned by the postal authority. The postal authority can obtain the stored postage indicium by reference to the indexing identifier. In this manner, the postal authority has access to the postage indicium without having to apply it to the mail piece. The indexing identifiers can optionally be used to index sender identification information for verifying that the sender of a mail piece is a trusted individual or entity.

28 Claims, 34 Drawing Sheets

U.S. PATENT DOCUMENTS

| | | | | |
|---|---|---|---|---|
| 4,802,218 | A | 1/1989 | Wright et al. | |
| 4,812,994 | A | 3/1989 | Taylor et al. | |
| 4,831,554 | A | 5/1989 | Storace et al. | |
| 4,831,555 | A | 5/1989 | Sansone et al. | |
| 4,837,701 | A | 6/1989 | Sansone et al. | |
| 4,858,138 | A | 8/1989 | Talmadge | |
| 4,864,618 | A | 9/1989 | Wright et al. | |
| 4,868,757 | A | 9/1989 | Gil | |
| 4,900,903 | A | 2/1990 | Wright et al. | |
| 4,900,904 | A | 2/1990 | Wright et al. | |
| 4,901,241 | A | 2/1990 | Schneck | |
| 4,908,770 | A | 3/1990 | Breault et al. | |
| 4,941,091 | A | 7/1990 | Breault et al. | |
| 5,008,827 | A | 4/1991 | Sansone et al. | |
| 5,043,908 | A * | 8/1991 | Manduley et al. | 700/227 |
| 5,065,000 | A | 11/1991 | Pusic | |
| 5,111,030 | A | 5/1992 | Brasington et al. | |
| 5,202,834 | A | 4/1993 | Gilham | |
| 5,239,168 | A | 8/1993 | Durst, Jr. et al. | |
| 5,319,562 | A | 6/1994 | Whitehouse | |
| 5,341,505 | A | 8/1994 | Whitehouse | |
| 5,423,573 | A | 6/1995 | de Passille | |
| 5,583,779 | A | 12/1996 | Maclerio et al. | |
| 5,606,613 | A | 2/1997 | Lee et al. | |
| 5,655,023 | A | 8/1997 | Cordery et al. | |
| 5,696,829 | A | 12/1997 | Cordery et al. | |
| 5,774,554 | A * | 6/1998 | Gilham | 380/51 |
| 5,822,739 | A | 10/1998 | Kara | |
| 5,917,925 | A | 6/1999 | Moore | |
| 6,005,945 | A | 12/1999 | Whitehouse | |
| 6,349,292 | B1 | 2/2002 | Sutherland et al. | |
| 6,427,021 | B1 * | 7/2002 | Fischer et al. | 382/101 |
| 6,523,014 | B1 * | 2/2003 | Pauschinger | 705/410 |
| 6,527,178 | B1 | 3/2003 | Gordon et al. | |
| 6,547,136 | B1 | 4/2003 | Sansone | |
| 6,865,560 | B1 * | 3/2005 | Sansone et al. | 705/404 |
| 6,925,451 | B1 | 8/2005 | Bailey et al. | |
| 6,996,546 | B1 | 2/2006 | Giles et al. | |
| 7,191,158 | B2 | 3/2007 | Ogg et al. | |
| 7,458,612 | B1 | 12/2008 | Bennett | |
| 7,567,940 | B1 | 7/2009 | Engelbert et al. | |
| 2001/0044785 | A1 | 11/2001 | Stolfo et al. | |
| 2001/0056469 | A1 * | 12/2001 | Oonuki | 709/206 |
| 2002/0120562 | A1 | 8/2002 | Opiela et al. | |
| 2002/0152174 | A1 | 10/2002 | Woods et al. | |
| 2002/0157003 | A1 | 10/2002 | Beletski | |
| 2002/0165729 | A1 * | 11/2002 | Kuebert et al. | 705/1 |
| 2005/0121517 | A1 | 6/2005 | Igval et al. | |
| 2005/0209976 | A1 * | 9/2005 | Bailey et al. | 705/402 |

FOREIGN PATENT DOCUMENTS

| | | | |
|---|---|---|---|
| EP | 0 137 737 | A3 | 4/1985 |
| FR | 2 580 844 | | 10/1986 |
| GB | 2 251 210 | A | 7/1992 |
| JP | 02-199939 | A * | 8/1990 |
| WO | WO 88/01818 | | 3/1988 |

OTHER PUBLICATIONS

Harmon, Craig K. "Reading Between the Lines" 1997, http://www.qed.org/rbtl_main.htm.*

An Introduction to Cryptography, Version 6.5.1, Network Associates Inc. Santa Clara, CA 1999.*

"Technology Upgrades to Track Mail, Enhance Accounting and Timekeeping Systems," Press Release #01-002, USPS, Jan. 9, 2001.*

Page, Walter Hines. "The World's Work," vol. XXVIII, Doubleday, Page & Company, Garden City, New York, 1914.*

Draft—Information Based Indicia Program (IBIP)—Performance Criteria for Information-Based Indicia and Security Architecture for Open IBI Postage Evidencing Systems (BCIBI-O), The United States Postal Service, Jun. 25, 1999.

Postal Service—Specifications for Postal Security Devices and Indicia (Postmarks), Federal Register, vol. 61, No. 128, Tuesday, Jul. 2, 1996, Notices, 2 pgs.

Postal Service—Specifications for Information-Based Indicia Program "Host Systems", Federal Register, vol. 61, No. 209, Monday, Oct. 28, 1996, Notices, 2 pgs.

Sonedaka, N., System for Verifying Opposite Party.

* cited by examiner

SYSTEMS AND METHODS FOR DETECTING POSTAGE FRAUD USING AN INDEXED LOOKUP PROCEDURE

FIELD OF THE INVENTION

The present inventions relate generally to electronic postage metering systems, and more particularly, personal computer (PC)-based postage systems.

BACKGROUND OF THE INVENTION

In 1992, the United States Postal Service (USPS), acting largely on a formal December 1991 proposal by the inventor, began investigating the feasibility of PC-based postage technology. The USPS hosted an exploratory meeting, inviting the inventor and the four existing conventional postage meter vendors (Pitney Bowes, Neopost (called Friden at the time), Ascom Hasler, and Franco Postalia)—firms that represented 100% of the US meter market at that time. Subsequent years saw a number of follow-on meetings, and the USPS eventually published a specification in the 1996 Federal Register outlining what the USPS called an “Information Based Postage Indicium Program (IBIP).” The requirements for the IBIP are currently set forth in a document called “Information Based Indicium Program (IBIP)—Performance Criteria For Information-Based Indicia and Security Architecture for Open IBI Postage Evidencing Systems (PCIBI-O),” which was published on Jun. 25, 1999 by the USPS, and which is fully and expressly incorporated herein by reference.

Two different types of PC-based postage architectures have evolved. The first type of architecture is a distributed postage indicia generation system, an example of which is detailed in U.S. Pat. No. 5,319,562, entitled “System and Method for Purchase and Application of Postage Using Personal Computer,” which is expressly and fully incorporated herein by reference. In this system, lump sums of postage are purchased and downloaded via a telecommunications link to a local secure computational device at the end user’s location. In USPS jargon, this device is called the Postal Secure Device (PSD). Typically, these postage transfers range from fifty to several thousand dollars. This amount is added to whatever balance remains in the PSD. The end user may then draw upon the balance in the PSD to produce postage indicia of varying amounts and service classes that are printed on mail pieces. As the mail pieces are individually metered (or in the case of the IBIP, created and simultaneously “metered”), the balance in the PSD is decremented by the transaction amount (e.g., 34 cents). The second type of architecture is a centralized postage indicia generation system, an example of which is detailed in U.S. Pat. No. 6,005,945, entitled “System and Method for Dispensing Postage Based on Telephonic or Web Milli-Transactions,” and which is fully and expressly incorporated herein by reference. In this system, the end user’s account balance is securely stored in a centralized postage-issuing computer system, and the end user contacts the centralized postage-issuing computer system each and every time postage is to be applied to a mail piece.

Referring to FIG. 1, a typical IBIP mail piece 100 printed using either the distributed or the centralized postage indicia architecture is shown. The mail piece 100 comprises an envelope 102 on which various items are printed. A postage indicium 104 (in layperson’s terms, a “stamp”), as applied by a computer printer, is located in the upper right hand corner of the envelope 102. The postage indicium 104 comprises a two-dimensional barcode 106 containing data relating to the mail piece 100 and the account holder, as well as human-readable information 108, e.g., the data, account number and amount of postage. The USPS has currently approved Portable Data File (PDF) and DataMatrix 2-D barcodes. Facing Identification Marks (FIM) 110 are located at the top of the envelope 102 above and to the left of the postage indicium 104, and are used by the USPS for the initial sortation of letter mail. The significance of the FIM 110 in letter mail processing is described in U.S. Pat. No. 5,319,562. A return address 112 and destination address 114, which are self-evident, are printed on the face of the envelope 102. A POSTNET barcode 116, which is located beneath the destination address 114, represents the delivery point ZIP code of the destination address. The delivery point ZIP code is an 11-digit code, only 9 of which are shown on the last line of the destination address 114. The last two digits of the delivery point ZIP code are generally derived from the last two digits of the street address number, which in the illustrated embodiment, is “47.”

The amount of data in the postage indicium 104 is substantial and was designed with a distributed postage indicia generation system in mind. Significantly, in a distributed postage indicium generation architecture, the USPS has no detailed knowledge of how the postage is consumed. For example, for a hypothetical $100 of postage downloaded, the end user could create ten postage indicia of a $10 valuation, two hundred indicia of 50-cent valuation, or a combination thereof. In reality, the number of permutations is far greater. The USPS approach to this problem was to create a postage indicium with sufficient information, so that its authenticity could be determined in the absence of any other information. In other words, the USPS sought a “stand-alone” system that would be verifiable using only the human-readable information on the mail piece 100 and the data encoded in the two-dimensional barcode 106 of the postage indicium 104. In theory, no other “outside” information would be necessary. Table 1 sets forth the current IBIP postage indicium contents, including the field name and byte size of each content item.

TABLE 1

Current IBIP Indicium Contents

| Item Number | Field Name | Size (Bytes) |
|---|---|---|
| 1 | Indicia Version Number | 1 |
| 2 | Algorithm ID | 1 |
| 3 | Certificate Serial Number | 4 |
| 4 | Device ID | 8 |
| 5 | Ascending Register | 5 |
| 6 | Postage | 3 |
| 7 | Date | 4 |
| 8 | License ZIP | 4 |
| 9 | Destination ZIP | 5 |
| 10 | Software ID | 6 |
| 11 | Descending Register | 4 |
| 12 | Rate Category | 4 |
| 13 | Signature | 40 |
| 14 | Reserved (Vendor Specific Information) | 1 |
| 15 | Piece Count (Vendor Specific Information) | 4 |

Thus, the date (item #7) embedded in the barcode portion of the postage indicium 104 could be compared to the current date, as well as to the human-readable date. The postage amount (item #6) embedded in the barcode portion 106 of the postage indicium 104 could be compared to the human-readable postage amount, and for United States addresses, the delivery point ZIP code (item #9) embedded in the barcode portion 106 of the postage indicium 104 could be compared with the delivery address 114 printed on the mail piece 100. Should any of these “information pairs” show an inconsistency, the mail piece 100 would be immediately suspect and would be a candidate for further investigation.

The "veracity" of the invention in the barcode portion 106 of the postage indicium 104 was to be validated by public key cryptography, which was first disclosed by Diffie and Hellman in 1976, and essentially involves the use of a matched pair of public and private key components to either encrypt or digitally sign data. The keys are extraordinarily large integer values that have interesting cryptographic capabilities. Briefly, the public key component can be used to encrypt material, or verify a digital signature created by the corresponding private key. The private key component can be used only to create digital signatures that can be verified by the public key. Importantly, the public key component can be widely disseminated and in fact "published," because it is virtually impossible to infer the corresponding private key component. In cryptographic terms, it is "computationally infeasible" to infer the private key component given the public key component provided the modulus or size of the key is of sufficient size. Given the computational speed of computers available at the time of this writing, key sizes of 1024 or 2048 bits are considered highly secure.

In the USPS implementation, public key encryption is not used, but rather the private key component is used to digitally sign data. For example, as illustrated in Table 1, a private key component is used to digitally sign the first twelve items contained in the postage indicium 104 to generate a digital signature (item #13), which digital signature is then appended thereto. In the USPS model, each end user (i.e., meter account) has a unique public/private key pair assigned to him or her. The private key component is never divulged to the end user, but is stored securely in the PSD at the end user's site. The PSD digitally signs the data, i.e., the information associated with the postage indicium request. The matching public key component can then be used to validate the signature. A more detailed discussion of how public key cryptography is used in the IBIP is disclosed in U.S. Pat. No. 6,005,945.

Despite the commercial potential of the IBIP, it languished in uncertainty for several more years until two vendors were approved for beta testing in August of 1998. The companies, EStamp and Stamps.com, were relative newcomers to the PC-postage effort. Both firms finished beta testing approximately one year later (the fall of 1999). Pitney Bowes, the dominant conventional manufacturer, and Neopost were approved several months later. A host of high-value IPO's, based on vastly overstated market potential, funded the EStamp and Stamps.com efforts during the late 1990's. Significantly, as the year 2001 draws to a close, EStamp has withdrawn from the postage business, Stamps.com is encountering several financial and legal problems, and the IBIP is in disarray. During their existence, the foregoing two firms consumed nearly one billion dollars in venture capital and public investment funds attempting to make PC-postage a viable business. In sum, two extraordinarily well-funded vendors have been driven out of the business, the established manufacturers of postage meters have curtailed or delayed their entry into the PC-Postage arena, and end users who were hopeful that this technology would save them time, money, and frustration were deeply disappointed. There are a host of factors that have contributed to the failure of the IBIP to date.

First, the USPS has insisted on developing a "perfect" security model before embarking on limited, alpha-level field-testing to identify "real world" problems. Second, the USPS has emphasized envelope printing, which, due to unyielding USPS mail processing requirements, proved to be very difficult to produce on desktop printers. This was especially true for courtesy reply envelopes provided by utilities and credit card firms, for example, because not only was the envelope difficult to feed and position, but there was a conflict in certain mail processing markings, especially the Facing Identification Code (FIM). Third, the focus on the consumer market with the promise of large numbers ended up costing the initial vendors large sums of money to acquire these customers, which did not provide sufficient financial returns. Fourth, the USPS was slow to appreciate and embrace a host of fraud prevention and detection enhancements inherent to centralized postage dispensing systems. Fifth, there is a lack of single piece discounts for IBIP postage users, even though the addressing and automation requirements imposed by the IBIP are comparable with other discount mailings (such as First Class Presort mail), and even though the discount was repeatedly recommended by the Postal Rates Commission.

Sixth, the public key infrastructure (PKI) approach adopted by the USPS has fallen short on many fronts. The first PKI-related problem surfaced immediately after the USPS published the initial IBIP specification in 1996. In order to provide a "stand-alone" verification system, barcode portion 106 of the postage indicium 104 would not only contain the items shown in Table 1, but would also have to carry the associated public key information for that account. The data in Table 1 is represented by 96 bytes. Because the public key component for a 1024 bit DSA key pair is 128 bytes long, however, adding the public key component for stand-alone verification caused the postage indicium 104 to be over twice the size of the current IBIP version. Comparable public key lengths are seen in the other USPS-approved key pairs such as RSA and elliptic curve.

But the postage indicium 104 needed to be still larger to achieve the goal of stand-alone verification, because the public key component itself must be verifiable. To understand why, suppose an adversary generated her own public/private key pair. This is a very easy process for an entry-level cryptographic programmer. Then she could create a mail piece, generate indicium data with fraudulent account information, digitally sign that information with a private key, and then append the public key to the end of the indicium data. To a verifying party in a stand-alone environment, everything would seem to be in order if one trusted the public key component.

This problem can be solved by using a Certificate Authority (CA), which is a very trusted party (e.g., a government agency or a private firm such as Verisign) who will accept a public key component generated by a third party, investigate that party to ascertain that they are who they say they are, and upon approval, digitally sign the public key with a master private key maintained by that CA. Thus, if the verifying party has the public key component of the CA available in the stand-alone verification system, it can be used to verify the digital signature on the account-specific public key component. If that verification is successful, the account-specific public key can be used to authenticate the postage indicium 104.

The advantage of this approach is that a single master CA public key can be used to ascertain the veracity of millions of other public keys. The disadvantage is that not only is a 128-byte account-specific public key required in the postage indicium 104, but the digital signature generated by the CA adds another 40 to 128 bytes of information. In addition, the CA typically embeds other information in the signed package, including the name of the party and the range of dates for which the account-specific public key is valid. The complete package is called a digital certificate and can grow to a size of several thousand bytes depending upon how many intermediate CA's are involved. The indicium data stream initially proposed by the USPS approached 500 bytes, and the associated two-dimensional bar code portion 106 of the postage indicium 104 covered approximately 25% of the area of a typical commercial #10 envelope. The mailing community and potential IBIP vendors resoundingly rejected this as completely unworkable.

The inventor (and presumably other potential IBIP vendors) proposed an alternative approach to the USPS, which brought the postage indicium down to the current 100 bytes. Rather than including a large digital certificate, a unique 4-byte numerical key pair ID (item #3 in Table 1) would be included instead. The key pair ID then references a complete CA-signed, account-specific public key that the USPS can distribute to field verification staff via CD-ROM or other means. Essentially, each verification staff member would have a database of CA-signed public keys indexed by a key pair ID. When scanning postage indicium 104, the key pair ID would be used to look up the appropriate public key, and that key would be used to verify the digital signature in the postage indicium 104.

While solving the space problem on the mail piece, the inclusion of a key pair ID within the postage indicium 104 did present the USPS with a new problem of distributing public keys to its field staff. This proved to be a daunting task, as some vendors were signing up thousands of new end users per month, each of whom represented a public key that needed to be distributed to every field verifier if the goal of stand-alone verification was to be achieved. Thus, the second major PKI-related problem encountered by the USPS and the IBIP vendors was the cost and logistical issues associated with managing hundreds of thousands, if not millions, of key pairs. IBIP vendors were charged for each key pair certified by the USPS CA. The cost, $8.00 US, was substantial for a PC postage service that had a price point as low as $1.99/month. Furthermore, the USPS had to maintain the database of public keys, deal with the revocation and reissuing of public keys as they expired, and handle other issues associated with the PKI.

In 1998, the inventor suggested another approach to key management in centralized postage systems, which is disclosed in U.S. Pat. No. 6,005,945. Stated briefly, this approach uses a single key pair to service the entire user community for a given centralized postage vendor. The key pair might change daily, weekly or monthly for security reasons, but the net effect would be that only dozens of keys would be employed as compared to millions. We hasten to reiterate that this approach is feasible only when the postage indicia are created at the centralized server cluster run by the postage vendor. That is, the safety of the private key can be assured since it is in the possession of the trusted postage vendor, and not the end user. It should be noted that even the centralized system postage vendor does not have direct knowledge of the private key material. USPS design guidelines require that private key material can only be presented "in the clear" within the confines of a FIPS-140 coprocessor device at the centralized server cluster. This is to prevent "insider attacks" from compromising the private signing key material.

Distributed-architecture IBIP systems that use a local "vault" attached to a PC at an end user's site, or newer stand-alone meters that create signed IBIP-like indicia, must continue to have a unique, dedicated key pair in each remote PSD. If a single key pair was used, and an end user compromised just one of those devices, that key could be distributed widely and used to create millions of fraudulent postage indicia.

In 1Q2001, the USPS permitted the inventor to institute the key management plan under a three-month beta test, and later officially notified all IBI centralized postage vendors that they too could employ this approach. The net result is there will be far fewer public keys to maintain for the USPS verification operations, and it is considerably more practical to perform stand-alone verification. Despite these improvements, the inventor believes that the stand-alone verification system can be eliminated without degrading postage security.

Another problem with the self-verifying EBI indicium concept is that it does a poor job of protecting against the fraudulent use of copies of valid postage indicia. Duplicate mail pieces have the potential to create substantial dollar losses to the USPS, particularly when high postage value packages are involved. Let us consider the following fraud scenario. A shipper has 70 pounds of goods to ship to a client, and he wishes to use Priority Mail. Roughly speaking, the USPS charges about $110 to transport 70 pounds cross-country via Priority Mail. If the goods can be subdivided into smaller packages, the shipper could easily perform the following attack. The shipper would create a postage-bearing shipping label for 35 pounds (approximately $52 in postage). The shipper would then create a second copy of this label, either by using a photocopy process, by interrupting the printer in mid-stream, causing it to think it must reprint a second version from the data in the printer memory, or by using a commonly available software package, such as Adobe Exchange, to create a PDF image of the label (rather than a print image), and then to print the resulting PDF image file more than once. Note that PC-based postage indicia do not use any special inks (such as the fluorescent-traced red ink used in conventional postage meters), so they are particularly easy to replicate. The shipper would then divide the shipment into two 35-pound cartons and apply a postage label to each carton (one an original, and the other a copy).

This would effectively defraud the USPS of over $50. If a USPS inspector happened to intercept either package and perform a scan of the barcode portion of the postage indicium, the information would be consistent on each label. The amount of postage in human-readable and barcode format would match. The date would be reasonable. The destination ZIP+4+2 would match that on the physical destination address. The only way the verifier could detect the fraud is by intercepting both packages simultaneously and scanning them side-by-side. The inspector would hopefully notice that the ascending/descending balances (c.f. items 5 and 11 in Table 1) were the same in each indicium—a clear indication of fraud.

The USPS has seemingly discounted the impact of "copy fraud." The USPS recognizes that, as with conventional postage, it can only perform spot statistical testing on the mail stream. But the USPS has also been somewhat "envelope-centric" in their thinking. That is, the USPS feels that an attacker would find little value in sending two envelopes to the same destination, and that the dollar amount of fraud would be on the order of 34 cents. The inventor believes that the future of PC-based postage is not with envelopes, but with high value, expedited packages. Letter mail (e.g., correspondence, statements, and invoices) is being rapidly replaced with electronic communications, and in the not-too-distant future, packages will dominate the USPS environment. This trend is likely to be accelerated given the anthrax attacks of 3Q2001. Therefore, it is believed that the USPS is underestimating the dollar value of this fraud threat. The inventor believes that by modifying the postage indicium as discussed herein, copy fraud can be further reduced if not effectively eliminated.

This is an appropriate time to discuss the "uniqueness" of the information in indicia. As we have seen in the previous example, using the digitally signed ZIP+4+2 and cross checking this value with the ZIP+4+2 shown in the human readable address, is not a fool proof method to detect copy fraud. The ZIP+4+2 of a given delivery address is something that can appear in an indicium for a given account holder on many occasions. Insofar as the indicium is concerned it is not a particularly unique value. What is unique in the originally proposed and used USPS indicium as the combination of the account number, the ascending register, and the descending register (balance) for that account. For instance, the concatenation of these three values should always result in a unique numerical string in an indicium. Put another way, if one finds two indicia with the identical concatenated value, this is clear evidence that at least one indicium is fraudulent.

The descending register in a given postage account is simply the amount of postage available to create indicia. It is effectively the "remaining balance". The ascending register is the lifetime sum of all postage indicia created within that account. When an indicium is created, the descending register is decremented by the indicium value and the ascending register is incremented. Eventually, the meter account will run out of funds (the descending register approaches zero) and the account hold can purchase more postage from the postal authority. A postal purchase results in a matching increase in the descending register. The ascending register is not impacted by a postage purchase.

One can see that for a given account, a given descending register (say $5.00) may occur many times over the lifetime of the account. However, a situation where the ascending register is $505 and the descending register is $104 will only occur once (if at all) in a given account lifetime. This is because the ascending register is ever increasing as the life of the meter goes on.

The USPS has based some portion of its fraud detection protocol on the "uniqueness" provided by the ascending/descending register combination for a given account. But as an index for uniqueness, this is a poor choice from an operation standpoint. The combination of the two register values does not result in a continuous number series. The registers are tracked to the $1/10^{th}$ of a cent (a mil), and a typical minimum change in the register values is 340 mils (a 34 cent First Class postage indicium). The next indicium might be a high-postage-value package and result in a register change of 20000 mils ($20,00). Again, the combination of ascending/descending registers will be unique for a given account, but this "index of uniqueness" is far from optimal. The index will have large gaps in the number sequence, and the gap sizes will be variable.

A seventh problem that has contributed to the failure of the IBIP is the assumption that all printing-related problems could be controlled by "perfect" vendor software and therefore, a staunch refusal to offer a refund procedure for failed or partially-printed mail pieces. It should be stressed that PC-postage is different from printing other types of shipping labels (e.g., UPS or FedEx) in that misprints are, in effect, losses of "money." If a shipper misprints a UPS shipping label from a shipping software package or web site, another one can be reprinted and placed on the package with no negative financial impact to the shipper. This is because the UPS business model charges the shipper when the package enters the UPS shipping stream and is scanned. The UPS label has no inherent "value" until it enters the UPS delivery system. The USPS, however, as do many postal agencies worldwide, assumes that the postage is paid before the package enters the shipping stream.

The current USPS refund procedures for misprinted mail pieces are overly strict and reflect a mindset formed over decades of supporting conventional meter technologies. Refunds are possible, but only if one presents a physical specimen. For instance, if a mailer creates a meter strip using a conventional postage meter (or prints the postage indicium directly on a mail piece), and decides not to use that postage indicium, the postage indicium can be taken to a local post office for a refund of anywhere from 90% to 100% of the postage value.

For PC-postage vendors, the procedures are somewhat different, although the criteria are the same. If the PC-postage user creates a readable mail piece (specifically, the postage indicium must be scannable), it may be submitted to the PC-postage vendor for a refund. The vendor, in turn, applies to the USPS for a refund. The overall process is complex, time-consuming, and very costly to operate. It also requires that USPS auditors make field visits to the PC-postage vendors to examine all of the physical specimens before the refund can be authorized.

If the end-user is unlucky enough to have attempted to print a mail piece that resulted in a deduction to the account balance, but has no physical evidence of this mail piece, the current USPS rules prohibit a refund. Unfortunately, this situation is not uncommon. The mail piece stock (e.g., label or envelope) can misfeed, causing only a portion of the indicium to print on the paper. Or if the PC is low on Graphic Display Interface (GDI) or memory resources, or has crashed for any reason, the printer driver may fail to render the two-dimensional barcode image. Or if the job is sent to a network printer, it is possible that another user/operator can flush the PC-postage print job by manipulating the printer queue or control panel, thus resulting in the unavailability of the specimen.

As discouraging as all the IBIP-related problems may seem, the inventor feels that PC-postage can be made viable by incorporating novel, yet easily implementable, design elements into the IBIP base design.

SUMMARY OF THE INVENTION

The present inventions use an indexing identifier (such as, e.g., a tracking ID or the combination of a postage vendor ID, user account, and piece count) to decrease the size of the postage indicium transmitted to an end user computer, or eliminate transmission of the postage indicium altogether. When the postage indicium for the end user computer is generated, it is stored, and the indexing identifier, rather than the postage indicium, is transmitted to the end user computer. The indexing identifier is applied to a mail piece, which is then scanned by the postal authority. The postal authority can obtain the stored postage indicium by reference to the indexing identifier. In this manner, the postal authority has access to the postage indicium without having to apply it to the mail piece.

In accordance with a first aspect of the present inventions, a method of indexing a postage indicium within a centralized postage-issuing computer system having a plurality of user accounts is provided. The method comprises generating a postage indicium associated with a mail piece, associating an indexing identifier with the postage indicium, and storing the indexed postage indicium within a database. The indexing identifier can be embodied in a variety of forms, but in the preferred method is unique within a postal service (such as, e.g., the USPS) and comprises a postage vendor ID, user account number, and piece count, or alternatively, a unique tracking ID. The postage indicium may comprise a variety of items, such as, e.g., postage amount, date and time of postage information creation, service class, optional data advance, and delivery zip code.

To protect the integrity of the postage indicium stored in the centralized postage-issuing computer system, the method preferably comprises deriving a digital signature from the postage indicium, associating the digital signature with the postage indicium to generate an indexed self-validating postage indicium, and storing the indexed self-validating postage indicium within the centralized postage-issuing computer system. The digital signature may be generated by applying a private key to the postage indicium, and the digital signature can be associated with the postage indicium by attaching it thereto. The digital signing of the postage indicium can be further protected using a physically secure coprocessor device to perform this operation.

In the preferred method, an indexing identifier request is received from an end user computer, and the indexing identifier is transmitted to the end user computer. The indexing identifier can then be applied to a mail piece. When the mail piece is being inspected by the postal authority, the method may further comprise receiving a postage indicium request containing the indexing identifier from the postal authority, retrieving the indexed postage indicium from the database based on the received indexing identifier, and transmitting the indexed postage indicium to the postal authority.

In accordance with a second aspect of the present inventions, a method of validating postage for a postal service is provided. The method comprises generating a postage indicium associated with a mail piece, associating an indexing identifier with the postage indicium, and storing the indexed postage indicium within a database. The method further comprises applying the indexing identifier to the mail piece, reading the indexing identifier on the mail piece, and retrieving the indexed postage indicium from the database based on the indexing identifier. The indexing identifier can be applied to the mail piece in a variety of formats, but in the preferred method is applied in a barcode format (such as, e.g., a two-dimensional barcode or even a one-dimensional barcode), and read using a barcode reader, or applied in a human-readable format, and read using an optical character reader.

In accordance with a second aspect of the present inventions, a centralized postage-issuing computer system for indexing postage indicia for a plurality of user accounts within a postal system is provided. The centralized postage-issuing computer system comprises data processing circuitry, a database, a postage indicium generation module, when executed by the data processing circuitry, configured for generating a postage indicium, an indexing module, when executed by the data processing circuitry, configured for associating an indexing identifier with the postage indicium, and a database management module, when executed by the data processing circuitry, configured for storing the indexed postage indicium within the database, and for retrieving the indexed postage indicium from the database based on the indexing identifier.

The postage indicium may be self-validating. In generating the self-validating postage indicium, the postage indicium generation module may comprise a postage indicium generation submodule for generating the postage indicium, a digital signature generation submodule for generating the digital signature; and an association submodule for associating the digital signature with the postage indicium to generate the self-validating indexed postage indicium. To provide additional security, key cryptographic operations may be accomplished by means of a physically secure coprocessor device. In the preferred embodiment, the centralized postage-issuing computer system comprises a communications module, when executed by the data processing circuitry, configured for receiving an indexing identifier request from an end user computer, and for transmitting the indexing identifier to the end user computer. The communications module may also be for receiving a postage indicium request containing the indexing identifier from a postal authority, and for transmitting the retrieved indexed postage indicium to the postal authority.

In accordance with a third aspect of the present inventions, a method of validating postage in a postal system is provided. The method comprises receiving a postage indicium request from a postal authority (such as, e.g., the USPS), wherein the postage indicium carries an indexing identifier and is associated with a mail piece inspected by the postage authority. The method further comprises retrieving an indexed postage indicium from a database based on the received indexing identifier, and transmitting the postage indicium to the postal authority. The indexed postage indicium may be self-validating postage indicium that is created within a physically secure coprocessor device. As such, these signed indicia may be safely stored in a conventional database for later access and signature verification.

In accordance with a fourth aspect of the present inventions, the indexing identifier can be used to request and receive sender identification information to verify that the sender of a received mail piece is a trusted individual or entity.

Other and further aspects and features of the invention will become apparent from the following drawings and detailed description.

BRIEF DESCRIPTION OF THE DRAWINGS

In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF PREFERRED EMBODIMENTS

The present invention is directed to a postage indicia tracking system for generating self-validating unique postage indicia that can be validated by a postal authority (such as, e.g., the United Stated Postal Service (USPS), United Parcel Service (UPS), Federal Express (FedEx), etc.) for various purposes (such as, e.g., detecting copy fraud, postage counterfeiting, refund facilitation, etc.).

Figure 2:
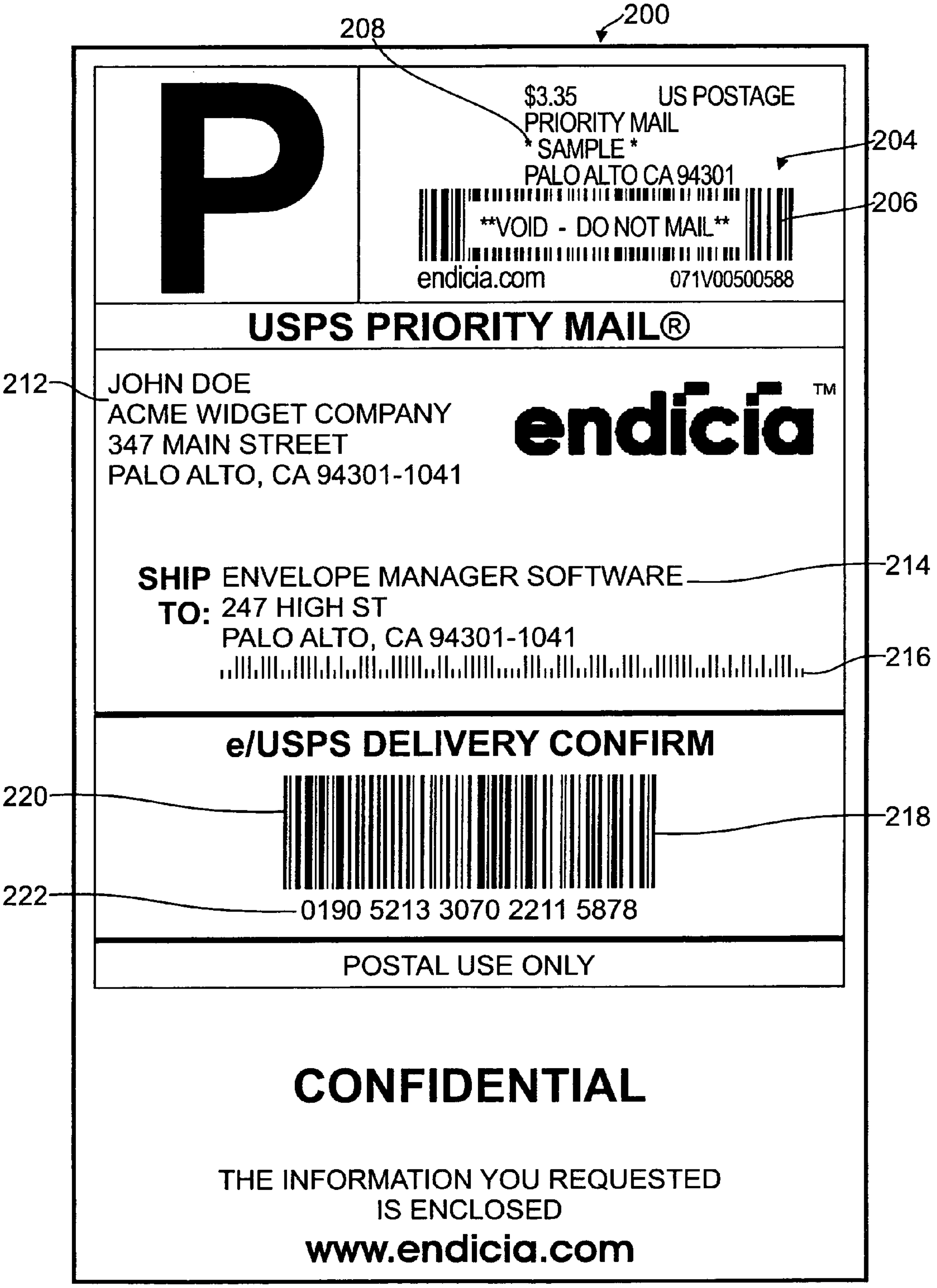
FIG. 2 is a top view of a USPS Priority Mail postage label constructed in accordance with the present inventions.

Referring to FIG. 2, a USPS Priority Mail postage label 200 generated in accordance with the present inventions can be used in a high-postage value transaction (such as, e.g., packages, expedited services, etc.) to detect copy fraud, since such transactions represent the largest fraud threat, and are the mostly likely demographic to embrace PC-Postage. We hasten to add that the present invention does not exclude envelope mail, and there are innovations presented for that arena as well. Nor does it exclude other package shipment services provided by other postal authorities, or by private shipping firms (such as, e.g., UPS, Airborne, or FedEx).

Figure 1:
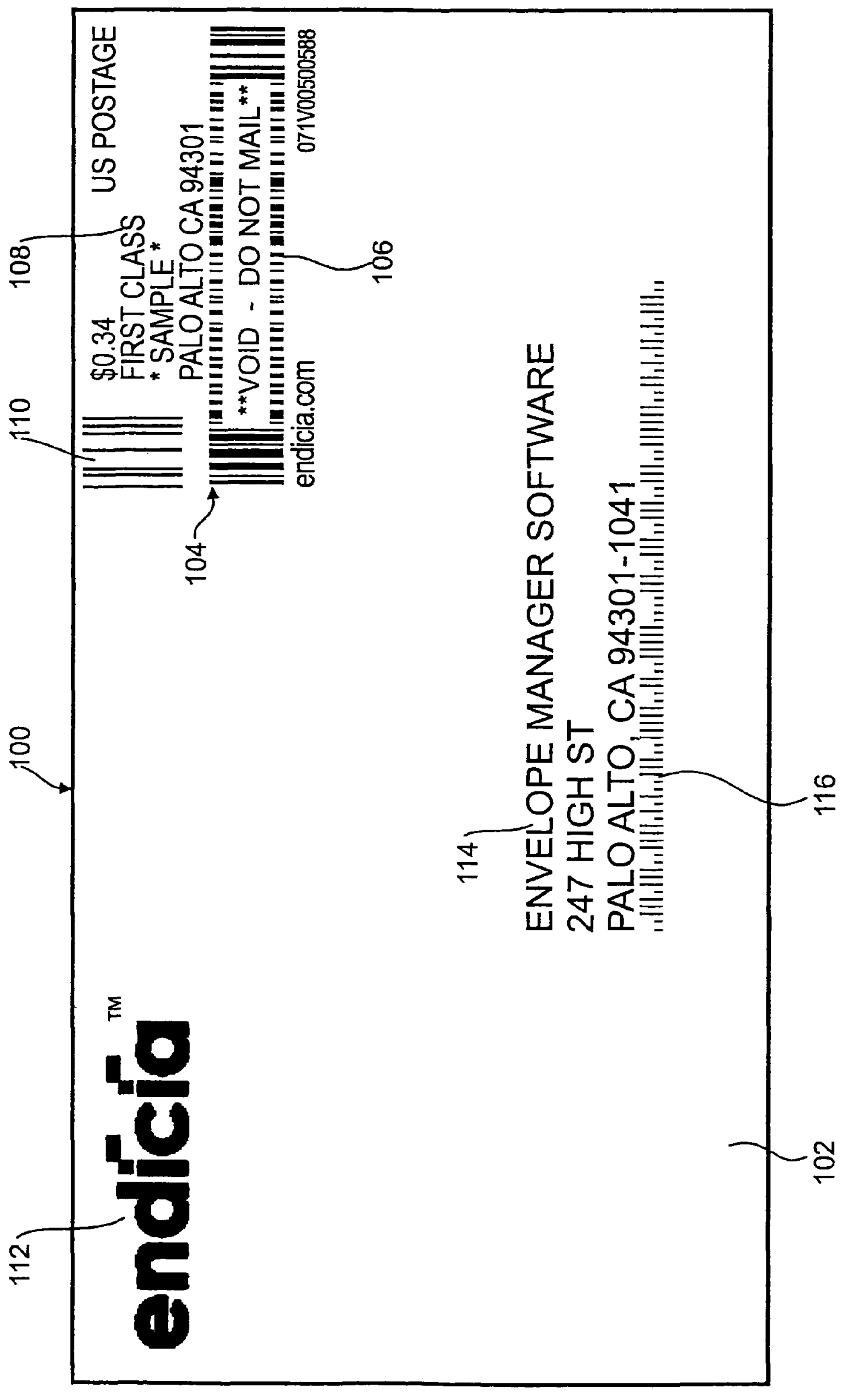
FIG. 1 (PRIOR ART)
FIG. 1 is top view of a prior art IBIP mail piece.

Like the prior art envelope 102 shown in FIG. 1, the label 200 shown in FIG. 2 carries a self-validating unique postage indicium 204 that is presented in a two-dimensional barcode 206 containing data relating to the mail piece on which the label 200 is applied, as well as human-readable information 208, return address 212, destination address 214, and POSTNET barcode 216. Noteworthy, is that Facing Identification Marks (FN) are not located on the label 200, since the FIM is only a requirement for letter mail and has no value in the processing of packages. The label 200 further includes a standard unique tracking ID 218 at its center. The tracking ID 218 is presented in an associated computer readable form (such as, e.g., a one-dimensional barcode 220), and as alphanumerical data 222, in this case, the number "0180 5213 9070 2211 5878." Up to this point, a typical USPS label, which can be used to provide tracking capability for mere administrative purposes, has been described. For example, in the USPS environs, one can obtain a delivery confirmation code for Priority Mail, an Express Mail tracking code for Express Mail, a Signature Confirmation code for Priority Mail, and a delivery confirmation code for media mail. Similar tracking ID's are used by other carriers (such as, e.g., UPS, and FedEx), as well as other postal authorities worldwide. Tracking numbers may also be added to First Class mail in the future, and are used in such ancillary services at Certified Mail.

The standard tracking ID's 218 currently used on these USPS labels, however, are not suitable for preventing postage fraud, since one can easily duplicate the postage indicia, while using different tracking ID's 218 (perhaps on a separate label), effectively covering up the copy fraud. To facilitate in detecting fraud, the self-validating unique postage indicium 204 has been modified to include a unique identifier. As will be described in further detail below, the unique identifier can be composed of, e.g., the same tracking ID 218 that is provided at the bottom right corner of the label 200. In this case, the unique identifier contained within the self-validating unique postage indicium 204 can be used to validate the standard tracking ID 218, and can thus be relied upon to detect copy fraud in a stand-alone verification system. If a standard tracking ID 218 is not used on the label 200 (e.g., if the mail piece is being shipped via first class mail), the unique identifier can be composed of the piece count or ascending register in combination with the postage vendor ID and user account number. In this case, detection of copy fraud can be ensured in a stand-alone verification system only if 100% of the postage indicia are scanned. It is noted that a tracking ID provides uniqueness with a single string of numbers, whereas a postage vendor ID/user account/piece count (or ascending register) combination provides uniqueness with two strings of numbers. To this extent, the tracking ID, when available, is more advantageous to use, not only because it can detect copy fraud with respect to a single mail piece even if less than 100% of the postage indicia is scanned, but also because it can simply accomplish this with a single unique string of characters. As will be described in further detail below, however, use of the postage vendor ID/user account/piece count (or ascending register) combination as the unique identifier can be advantageously used to detect postal fraud in a non-stand-alone verification system even if 100% of the mail pieces are not scanned.

Figure 3:
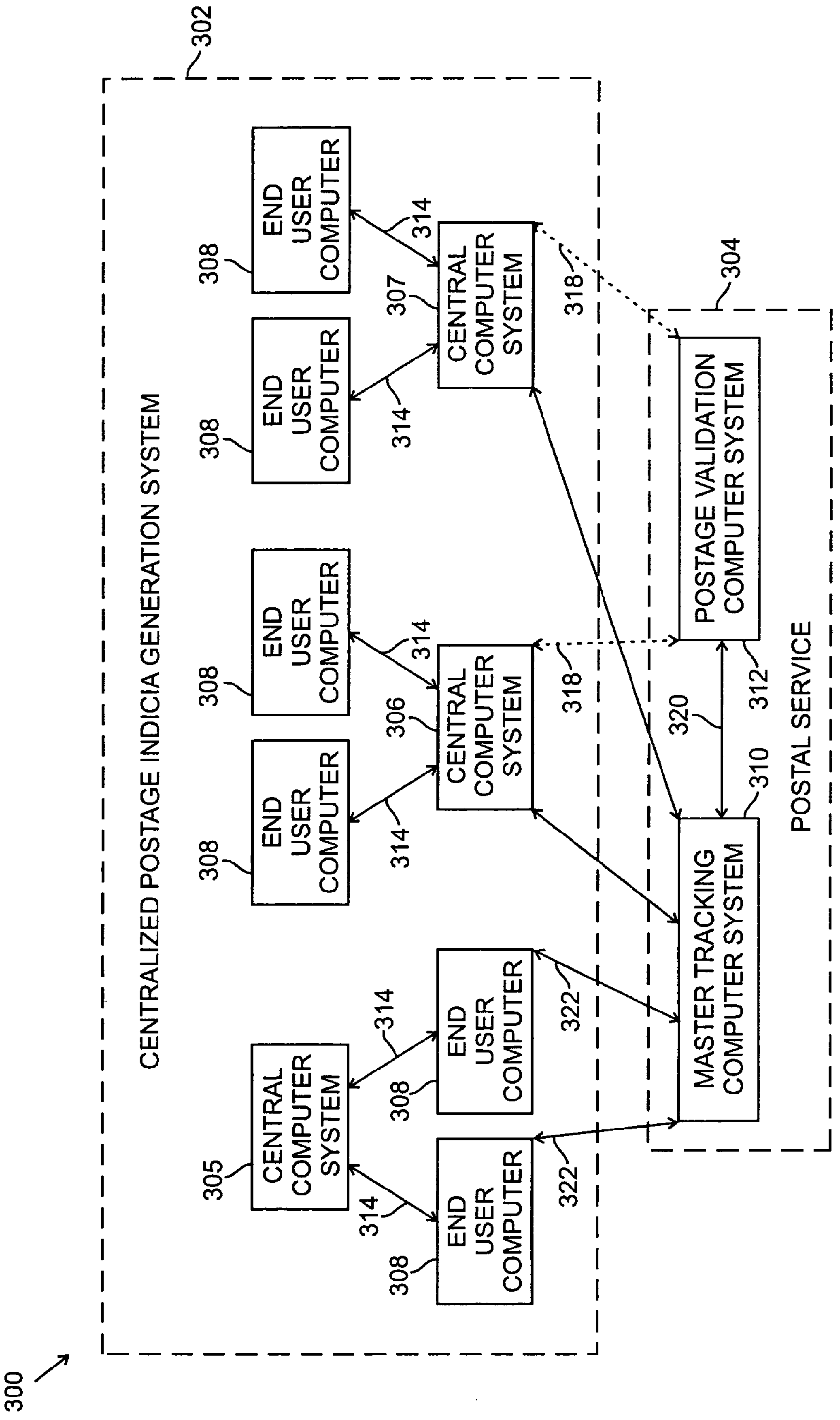
FIG. 3 is a block diagram of a first postal system constructed in accordance with the present inventions, wherein the first postal system utilizes unique tracking ID's to detect postal copy fraud.

Referring to FIG. 3, a postage system 300 provides a means for validating postage indicia in a stand-alone verification system using unique identifiers, and specifically, tracking ID's. In this embodiment, in response to requests for tracking ID's from end users, the postal service directly issues tracking ID's to the end users in a manner similar to that currently used by the USPS today. Alternatively or optionally, the postal service indirectly tracking ID's to the end users via a postage vendor. In any event, the postage vendor generates and sends self-validating unique postage indicia, which carry the issued tracking ID's, to the end users. The tracking numbers contained with the self-validating unique postage indicia are then used by the postal service to verify the postage on the mail pieces generated by the end users.

To this end, the postage system 300 generally comprises a centralized postage indicia generation system 302, which includes a multitude of centralized postage-issuing computer systems 305/306/307 (referred to as “central computer systems” in the figures), each of which communicates with a multitude of end user computers 308. The postage system 300 also generally comprises a postal service 304, which includes a master tracking computer system 310 and a postage validation computer system 312. As will be described in further detail below, the different configurations of centralized postage-issuing computer systems 305/306/307 represent different means for issuing the tracking ID's to the end user computers 308. As illustrated, the centralized postage-issuing computer systems 305/306/307, end user computers 308, master tracking computer system 310, and postage validation computer system 312 variously communicate with each other over communications links 314-322, each of which may represent, e.g. a LAN, Internet, or telephone network). It should be noted that, in the illustrated embodiment, communications among the end user computers 308, centralized postage-issuing computer system 305/306/307, master tracking computer system 310, and postage validation computer system 312 over the various links are generally secured by use of session encryption/decryption technology. The software and processes used to implement this technology is described in detail in U.S. Pat. No. 6,005,945, which has previously been incorporated herein by reference.

In the illustrated embodiment, each end user computer 308 is owned and operated by a client of a postal vendor, and is the principal device for preparing mail pieces by printing the tracking ID's and self-validating unique postage indicia on the mail pieces when received by the centralized postage-issuing computer system 305/306/307. Each centralized postage-issuing computer system 305/306/307 is owned and operated by a postal vendor and is the principal device that dispenses unique postage indicia to the end user computers 308 over communications links 314 in response to requests by the end user computers 308. As will be described in further detail below, the self-validating unique postage indicia contain identifiers that are unique within the postal service 304. Thus, at least for a significant period of time, e.g., one year, no two unique identifiers will be identical, thereby providing a reliable means for detecting mail fraud. The unique identifiers can be composed of numbers, letters, or a combination. As previously discussed, however, these unique identifiers are preferably tracking ID's.

The centralized postage-issuing computer systems 306 and 307 are also the principal devices that directly transmit tracking ID's to the end user computers 308 over communications links 314 in response to requests by the end user computers 308. This configuration is used when the end user computers 308 do not directly obtain the tracking ID's from the master tracking computer system 310. The centralized postage-issuing computer systems 306 and 307 differ from each other in that the centralized postage-issuing computer system 306 merely acts as a vehicle for passing on tracking ID's issued by the master tracking computer system 310 to the end user computers 308, whereas the centralized postage-issuing computer system 307 actually issues tracking ID's from a previously stored pool of unassigned tracking ID's, which are periodically downloaded from the master tracking computer system 310. In contrast to the centralized postage-issuing computer systems 306/307, the centralized postage-issuing computer system 305 does not take part in the tracking ID issuing process. In this case, it is the master tracking computer system 310, rather than the centralized postage-issuing computer system 305, that transmits tracking ID's to the end user computers 308 over communications links 322 in response to requests by the end user computers 308.

In the illustrated embodiment, the master tracking computer system 310 is owned and operated by a postal authority (such as, e.g., the USPS), and is the principal device for allocating tracking ID's either directly to the end user computers 308 over communications links 322, or directly to the centralized postage-issuing computer systems 306 or 307 over communications links 316, which then ultimately be transmitted to the end user computers 308 over the communications links 314. In an alternative embodiment, the master tracking computer system 310 is operated outside of the postal service 304. Because the USPS currently maintains such a master tracking service, however, it is preferable that the master tracking computer system 310 be contained within the postal service 304. The postage validation computer system 312 is owned and operated by the postal authority, and is the principal device for verifying the postage on mail pieces. Although in the illustrated embodiment, the postage validation computer system 312 performs stand-alone verification, if additional validating information is needed, the postage validation computer system 312 may optionally receive end user information from the centralized postage-issuing computer system 305/306/307 over communications links 318, or postage information associated with the tracking ID's from the master tracking computer system 310 over communications links 320.

Figure 4:
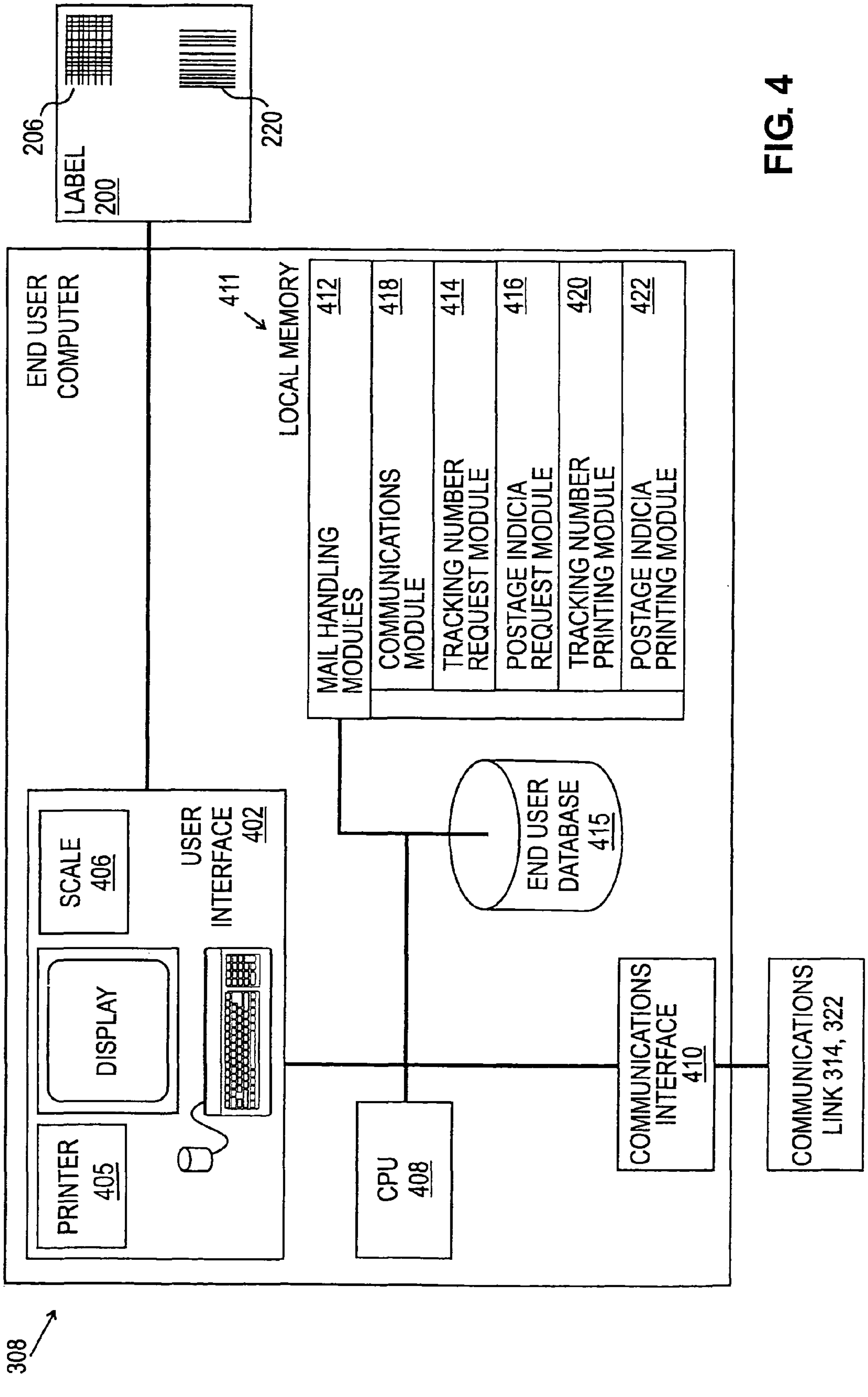
FIG. 4 is a block diagram of an end user computer used in the first postal system of FIG. 3.

Turning now to FIGS. 4-7 and 33, the structural details of the postage system 300 will now be described. With specific reference to FIG. 4, each end user computer 308 contains conventional computer hardware, including a user interface 402 with a keyboard 403, printer 404, display 405, and optional scale 406 for weighing mail pieces, data processing circuitry 408 (such as, e.g., a Central Processor Unit (CPU)) for executing programs, a communications interface 410 (such as, e.g., a modem, LAN connection, or Internet connection) for handling communications with the centralized postage-issuing computer system 305/306/307 over the communications link 314 or for handling communications with the master tracking computer system 310 over the communications link 322, and local memory 411. The user interface 402 is configured to allow the end user to request unique tracking ID's and self-validating unique postage indicia and to enter postage information associated with the unique tracking ID and postage indicium requests, as well as to print the unique tracking ID's and self-validating unique postage indicia on mail pieces. The local memory 411, which will typically include both random access memory and non-volatile disk storage, stores a set of mail handling procedures that are embodied in various software modules 412, and an end user database 415 that contains information needed by mail handling modules 412, including local account balance information, transaction records representing all recent postage purchase transaction by the end user computer 308, and session encryption keys. Although the local memory 411 is depicted in FIG. 4 as a single memory device, it should be understood that it can be implemented in a multitude of memory devices as well.

The mail handling modules 412 include a tracking ID request module 414, postage indicia request module 416, communications module 418, tracking ID printing module 420, and postage indicia printing module 422. The tracking ID request module 414 is configured for generating a request for a unique tracking ID. In the illustrated embodiment, this request takes the form of a query stream (e.g., in Extensible Markup Language (XML) format), and contains postage information to be associated with the unique tracking ID, (such as, e.g., an Application Program Interface (API) user account ID and password, destination address for the mail piece, sender's complete address, weight of the mail piece, service class, and the amount of postage). The postage indicia request module 416 is configured for generating a request for a self-validating unique postage indicium. In the illustrated embodiment, this request takes the form of a query stream (e.g., in XML format), and contains information specific to the immediate postage dispensing transaction (such as, e.g., the user's meter or account ID, the user account password, postage requested, service class, optional data advance, and ZIP+4+2 of the delivery address). If used in conjunction with the tracking ID request module 414, the request generated by the postage indicia request module 416 will also contain the unique tracking ID when received from the centralized postage-issuing computer system 305/306/307.

The communications module 418 is configured for handling communications with the centralized postage-issuing computer system 305/306/307 over the communications link 314 (such as, e.g., transmitting tracking ID requests and postage indicium requests and receiving tracking ID's and self-validating unique postage indicia in response thereto). The communications module 418 is also configured for handling communications with the master tracking computer system 310 over the communications link 322 (such as, e.g., transmitting tracking ID requests and receiving tracking ID's in response thereto). It should be noted that the USPS currently provides a tracking ID service called "Webtools Shipping API," which allows end user computer 308 to obtain unique tracking ID's directly from its server. The tracking ID printing module 420 is configured for printing the one-dimensional barcode 220 corresponding to the tracking ID received from the centralized postage-issuing computer system 306/307 on the label 200. The postage indicia printing module 422 is configured for printing on the label 200 the two-dimensional barcode 206 corresponding to the self-validating unique postage indicium received from the centralized postage-issuing computer system 305/306/307.

Figure 33:
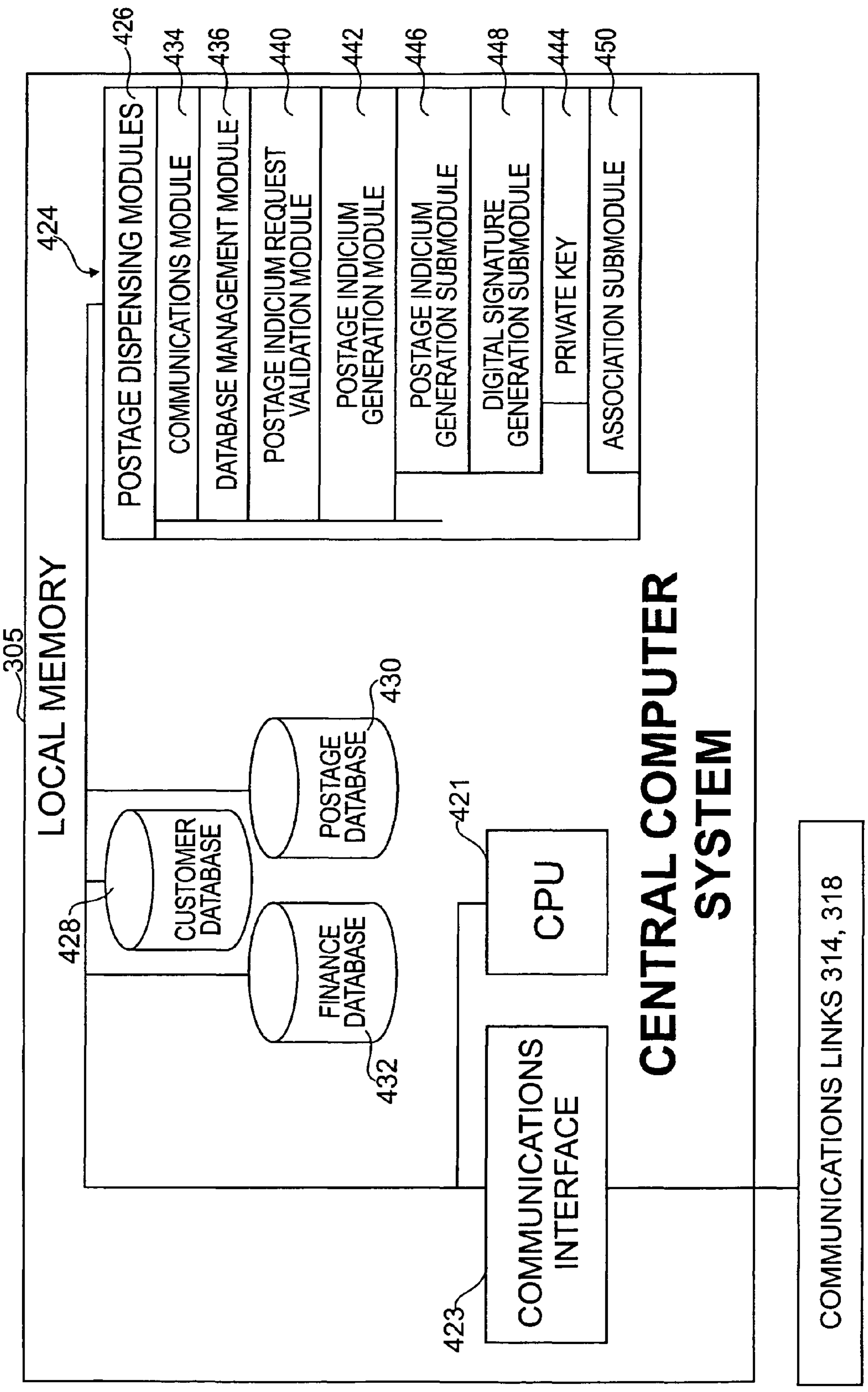
FIG. 33 is a block diagram of still another centralized postage-issuing computer system used in the first postal system of FIG. 3.

Referring specifically to FIG. 33, the centralized postage-issuing computer system 305 comprises data processing circuitry 421 (such as, e.g., a Central Processor Unit (CPU)) for executing programs, a communications interface 423 (such as, e.g., a bank of modems, a LAN connection, or Internet connection) for handling communication with the end user computer 308 and postal service 304, and a local memory 424. The local memory 424, which will typically include both random access memory and non-volatile disk storage, stores a set of postage dispensing procedures that are embodied in various software modules 426. The local memory 424 also stores a customer database 428 of information about each of the user accounts received by the centralized postage-issuing computer system 306, a postage database 430 of records concerning each self-validating unique postage indicium generated by the centralized postage-issuing computer system 306, and a finance database 432 of records concerning each postage credit transaction in which funds are added to a user account.

Figure 5:
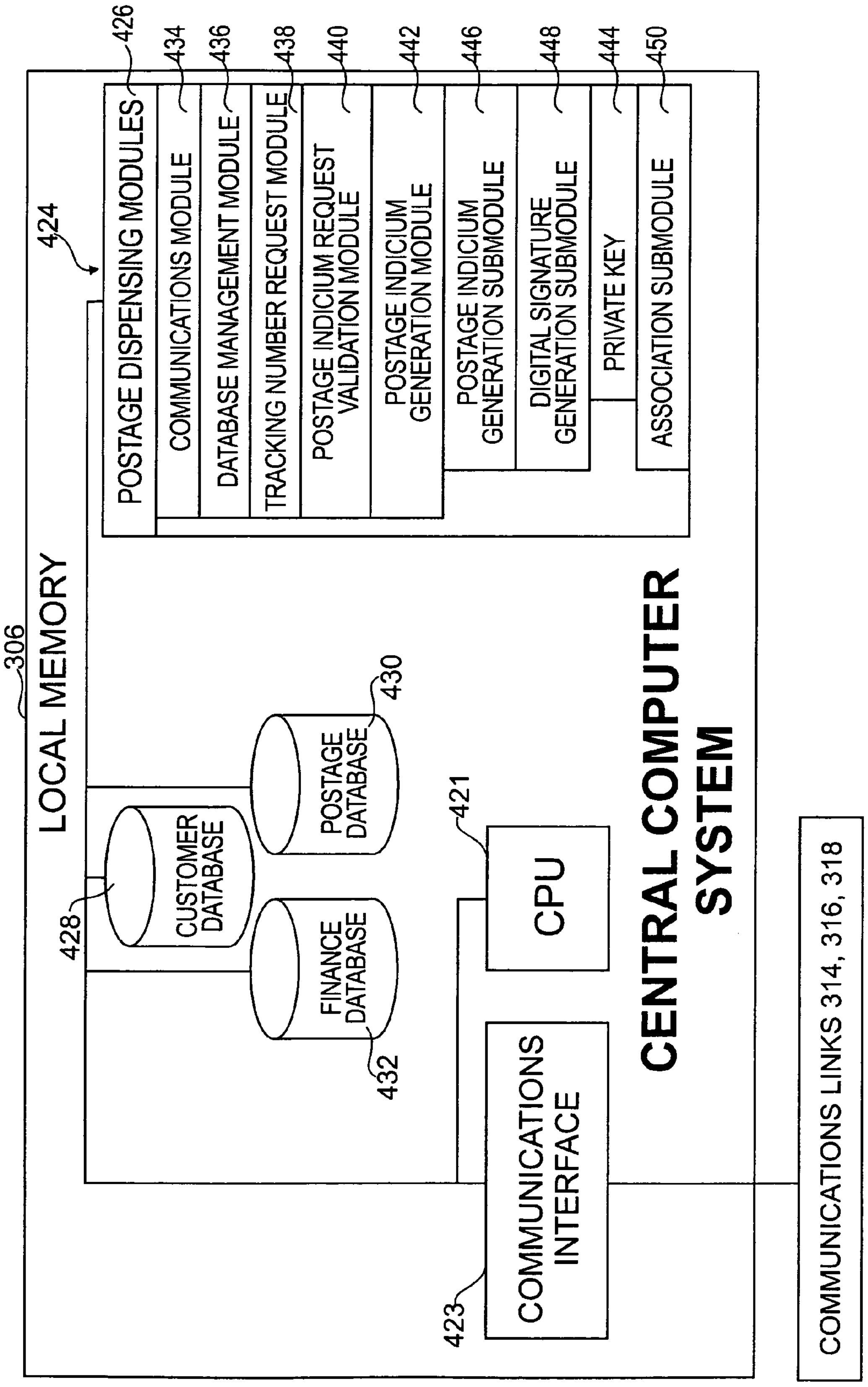
FIG. 5 is a block diagram of a centralized postage-issuing computer system used in the first postal system of FIG. 3.

For example, the customer database 428 may contain the following information: meter/license number, account status (active, hold, canceled, etc.), account name, account password (typically encrypted), user's name, user's company, user's street address, user's city, user's state, user's postal code, descending balance, ascending balance, current piece count (last serial number used), origin/finance ZIP5 (for US Market), origin/finance city, origin/finance state, date initially placed in service, date of last transaction, maximum postage allowable per self-validating unique postage indicium, minimum allowable balance, minimum re-credit amount, maximum re-credit amount, user's cryptographic private signing key (typically itself encrypted), credit card or ACH account numbers (typically encrypted), and account comments. The postage database 430 may contain the following information: date/time of transaction, piece number (serial number), weight, mail class, amount, destination address information, or public key reference number (indicating which key was used by the centralized postage-issuing computer system 306 to digitally sign the unique postage indicium for this postage dispensing event). The finance database 432 may contain the following information: date/time postage dispensed, amount of transaction, type of funds transfer (e.g., credit card, check, etc.), and identifying ID (e.g., credit card number, check number). Although the local memory 424 is depicted in FIG. 5 as a single memory device, it should be understood that it can be implemented in a multitude of memory devices.

The postage dispensing modules 426 include a communications module 434, database management module 436, tracking ID request module 438, postage indicium request validation module 440, and postage indicium generation module 442. The communications module 434 is configured for handling communications with the end user computers 308 over the communications links 314 (such as, e.g., receiving tracking ID requests and postage indicium requests and transmitting tracking ID's and unique postage indicia). The database management module 436 is configured for storing and retrieving pertinent information in and from the customer database 428, postage database 430, and finance database 432 with the pertinent information. The postage indicium request validation module 440 is configured for validating postage indicium requests received from the end user computer 308 by, e.g., validating the meter or account ID and account password in the postage indicium request in relation to the same information contained in the customer database 428. The postage indicium generation module 442, along with a corresponding private key 444, is configured for generating the self-validating unique postage indicium in response to each postage indicium request received from the end user computer 308.

In generating the self-validating unique postage indicium, the postage indicium generation module 442 comprises (1) a postage indicium generation submodule 446 for generating a unique postage indicium containing the tracking ID and/or postage vendor ID/user account/piece count; (2) a digital signature generation submodule 448 for deriving a digital signature from the unique postage indicium using the private key 444; and (3) an association submodule 450 for associating the digital signature with the unique postage indicium to generate the self-validating unique postage indicium.

It should be noted that certain cryptographically important operations are optionally performed in a specialized cryptographic coprocessor such as the FIPS-140/Level 4 IBM 458 co-processor. For instance, in the preferred embodiment, the private signing key appears in an unencrypted, operational form only within the confines of the co-processor. Similarly, the decryption of the postage indicium request and the subsequent authentication of said request is also handled inside the cryptographic co-processor. While these functions can be performed in a generalized computer operating system environment, the addition of the cryptographic coprocessor to the overall schema provides for an ultra-secure environment that is resistant to both outsider and insider attacks.

In the illustrated embodiment, the self-validating unique postage indicium contains the same information as the postage indicium set forth in Table 1, with the exception that the destination zip code has been replaced with the tracking ID (if the postage indicium request contains a tracking ID) and the account-specific piece count has been moved into the portion of the postage indicium that is digitally signed, as set forth in Table 2.

TABLE 2

Improved Unique Indicium Contents

| Item Number | Field Name | Size (Bytes) |
|---|---|---|
| 1 | Indicia Version Number | 1 |
| 2 | Algorithm ID | 1 |
| 3 | Certificate Serial Number | 4 |
| 4 | Device ID | 8 |
| 5 | Ascending Register | 5 |
| 6 | Postage | 3 |
| 7 | Date | 4 |
| 8 | License ZIP | 4 |
| 9 | Tracking Number | 5 |
| 10 | Software ID | 6 |
| 11 | Descending Register | 4 |
| 12 | Rate Category | 4 |
| 13 | Piece Count | 4 |
| 14 | Signature | 40 |

The “Indicia Version Number” identifies the version number assigned by the USPS to the indicia data set. The “Algorithm ID” identifies the digital signature algorithm used to create the digital signature on the postage indicium. The “Certificate Serial Number” identifies the unique serial number of the certificate issued by the IBIP Certificate Authority. The “Device ID” identifies the USPS-assigned ID for each postage vendor, and the user account for which the postage indicium will be issued. The “Ascending Register” identifies the total monetary value of all postage indicia ever produced for the user account. The “Postage” identifies the amount that will be applied to the mail piece. The “Date” identifies the date of mailing for a mail piece on which the postage indicium will be applied. The “License ZIP” identifies the 5-digit zip code for the licensing post office. The “Tracking Number” identifies the unique tracking ID issued by the USPS for that particular mail piece. The “Piece Count” identifies the serial number for the mail piece produced for that user account. The “Software ID” identifies the end user computer software ID number. The “Descending Register” identifies the postage value remaining in the user account. The “Rate Category” identifies the postage class, including any presort discount level, and rate. The “Signature” is the digital signature of items 1-13. It should be noted, however, that the digital signature can be derived from any combination of the items, provided that the unique tracking number is included in the digital signing process.

The overall advantage of this approach is that it inserts at least one unique identifier in the digitally signed portion of the postage indicium. Not only does this allow detection of copy fraud, but the use of a tracking ID, which is scanned 100% of the time, leads to other security advantages. And this approach meets the current USPS desire to validate mail pieces in a stand-alone environment. The scan will validate the digital signature on the postage indicium and present the tracking ID instead of the destination zip code in the case of tracked packages. There are other reasons for replacing the destination zip code in the digitally signed contents of the postage indicium. Not only is the destination zip code not unique, in many cases it does not exist. For instance, mail pieces sent from the United States to foreign countries do not contain a destination zip code in the postage indicium. Also, there is a class of IBIP-related technologies, such as postage strip printers and IBIP “sheet stamps,” that do not include a destination zip code in the postage indicium. Since both venues print the address in a separate and distinct operation from the postage indicium printing, the USPS has permitted the destination zip code field in the postage indicium to be set to zeroes. This opens the door for copy fraud.

Optionally, the destination zip code may be appended to the “vendor portion” of the postage indicium, which is an area of the postage indicium that is not scanned by the USPS and not digitally signed.

Referring specifically to FIG. 5, the centralized postage-issuing computer system 306 differs from the centralized postage-issuing computer system 305 in that it provides means through which the master tracking computer system 310 issue tracking ID’s to the end user computers 308. To the extent that the components of centralized postage-issuing computer systems 305 and 306 are similar, identical reference numbers have been used. In addition to the components contained in the centralized postage-issuing computer system 305, the centralized postage-issuing computer system 306 comprises postage dispensing modules 426, which additionally include a tracking ID request module 438 and a communications module 434. The tracking ID request module 438 is configured for generating and transmitting requests for unique tracking ID’s to the master tracking computer system 310 in response to receiving requests for unique tracking ID’s from the end user computers 308. These requests take the form of query streams and contain the same information as in the tracking ID requests generated by the tracking ID request module 414 in each of the end user computers 308. The communications module 434 is configured for handling communications with the end user computers 308 over the communications links 314 (such as, e.g., receiving tracking ID requests and postage indicium requests and transmitting tracking ID's and unique postage indicia). The communications module 434 is further configured for handling communications with the master tracking computer system 310 over the communications link 316 (such as, e.g., transmitting tracking ED requests and receiving tracking ID's).

Figure 6:
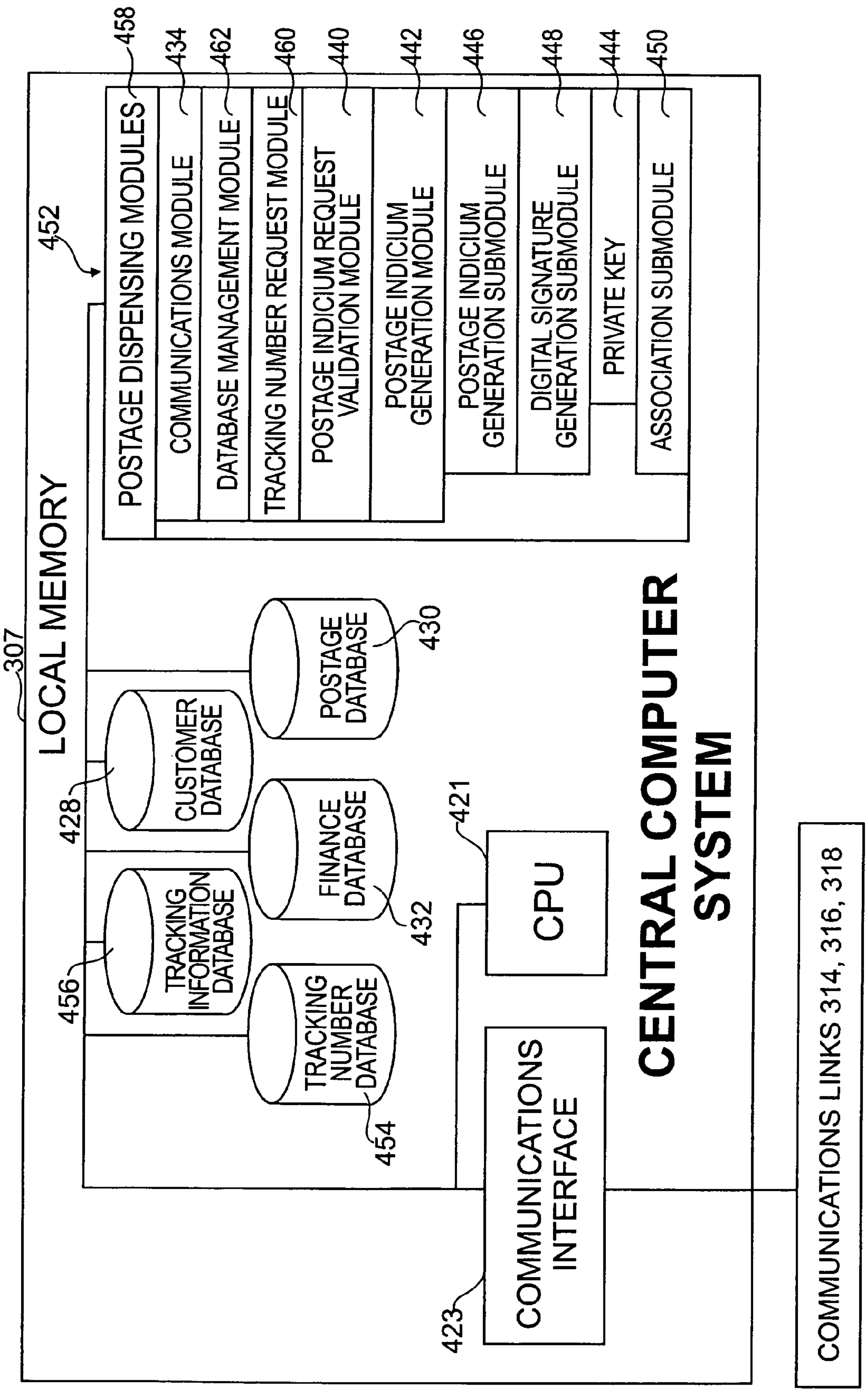
FIG. 6 is a block diagram of another centralized postage-issuing computer system used in the first postal system of FIG. 3.

Referring specifically to FIG. 6, the centralized postage-issuing computer system 307 differs from the centralized postage-issuing computer system 306 in that rather than requesting and receiving tracking ID's from the master tracking computer system 310 as tracking ID requests are received from the end user computers 308, the centralized postage-issuing computer system 307 stores a pool of unassigned tracking ID's previously received from the master tracking computer system 310 and allocates tracking ID's from this pool as tracking ID requests are received from the end user computers 308. To the extent that the components of centralized postage-issuing computer systems 306 and 307 are similar, identical reference numbers have been used.

In addition to the previously described components, the centralized postage-issuing computer system 307 comprises a local memory 452, which in addition to the previously described databases, stores a tracking ID database 454 of pre-stored unassigned tracking ID's received by the master tracking computer system 310, and a tracking information database 456 for storing each tracking ID that has been issued to an end user computer 308 and the postage information associated with each tracking ID, i.e., the information contained in the tracking ID request. The centralized postage-issuing computer system 307 further comprises a set of postage dispensing modules 458, which in addition to the previously described modules, includes a tracking ID allocation module 460 in place of the tracking ID request module 438, and a database management module 462 in place of the database management module 436. The tracking ID allocation module 460 is configured for allocating unique tracking ID's from the tracking ID database 454 to the end user computers 308 in response to receiving tracking ID requests from the end user computers 308. In addition to performing the afore-described functions, the database management module 462 is further configured for storing pools of unassigned tracking ID's within the tracking ID database 454 as they are periodically received by the master tracking computer system 310, and for periodically retrieving postage information from the tracking information database 456 for transmission to the master tracking computer system 310.

Figure 7:
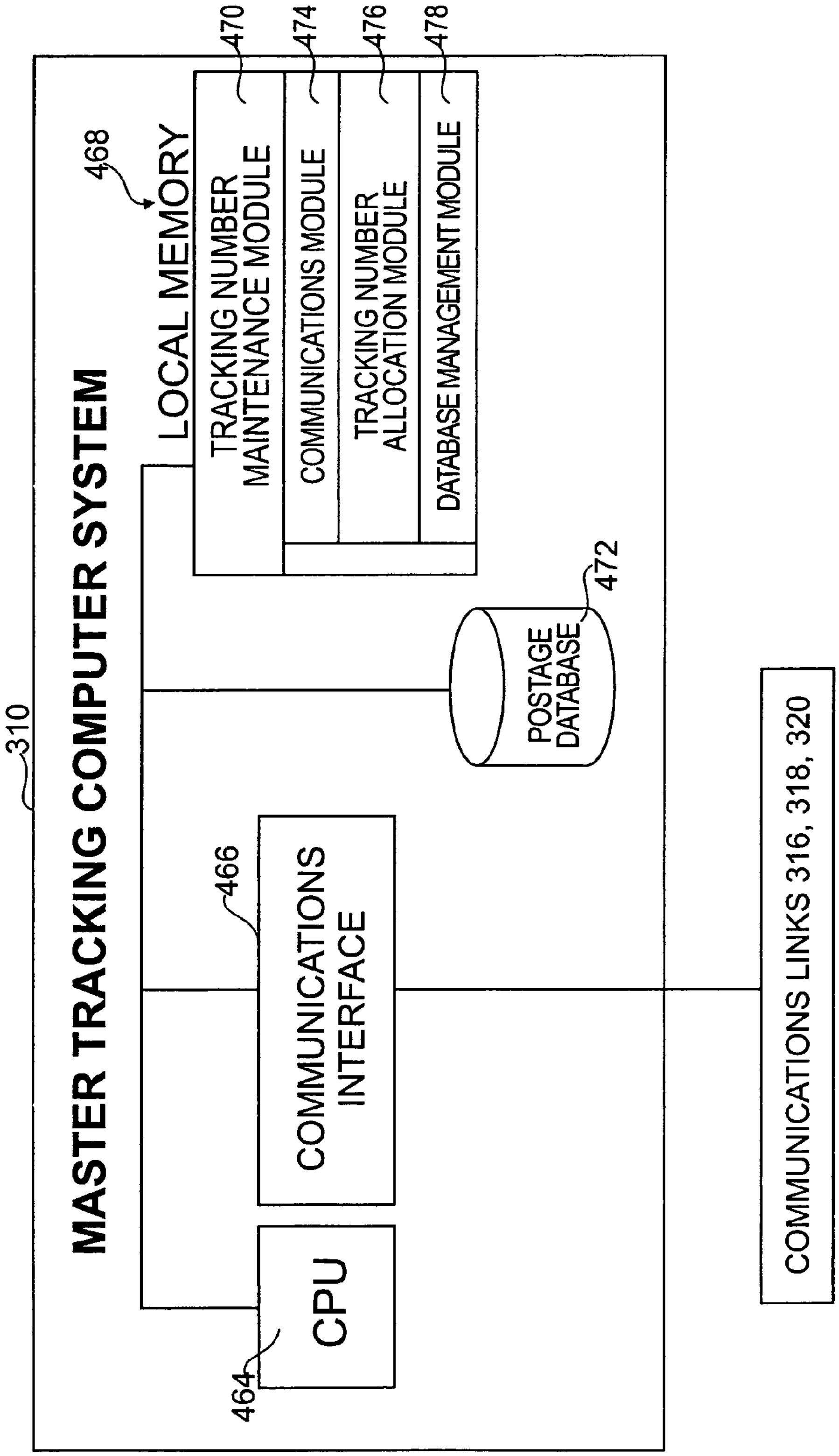
FIG. 7 is a block diagram of a master tracking computer system used in the first postal system of FIG. 3.

Referring specifically to FIG. 7, the master tracking computer system 310 comprises data processing circuitry 464 (such as, e.g., a Central Processor Unit (CPU)) for executing programs, a local memory 468, and a communications interface 466 (such as, e.g., a bank of modems, a LAN connection, or Internet connection) for handling communication with the centralized postage-issuing computer systems 306/307 over communications links 316 or with the end user computers 308 over communications links 322. If the master tracking computer system 310 and the postage validation computer system 312 are not embodied in the same computer, the communications interface 466 may also handle communication with the postage validation computer system 312. The local memory 468, which will typically include both random access memory and non-volatile disk storage, stores tracking ID maintenance procedures that are embodied in various software modules 470. The local memory 468 also stores a tracking information database 472 for storing each tracking ID that has been issued to an end user computer 308 and the postage information associated with each tracking ID, i.e., the information contained in the tracking ID request. Although the local memory 468 is depicted in FIG. 6 as a single memory device, it should be understood that it can be implemented in a multitude of memory devices.

The tracking ID maintenance modules 470 include a communications module 474, tracking ID allocation module 476, and database management module 478. The communications module 474 is configured for handling communications with the centralized postage-issuing computer systems 306/307 over the communications links 316, or with end user computers 308 over the communications links 322 (such as, e.g., receiving single tracking ID requests and transmitting tracking ID's to and from the centralized postage-issuing computer systems 306 or end user computers 308, as well as transmitting pools of unassigned tracking ID's and receiving assigned tracking ID's and associated postage information to and from the centralized postage-issuing computer systems 307). The communications module 474 is also configured for handling communications with the postage validation computer system 312 over the communications link 318 (such as, e.g., receiving requests for assigned tracking ID's, associated postage information, and current delivery status, and transmitting the assigned tracking ID's, associated postage information, and current delivery status). The tracking ID allocation module 476 is configured for generating unique tracking ID's in response to receiving tracking ID requests from the centralized postage-issuing computer systems 306, or optionally from the end user computers 308. The database management module 478 is configured for storing and retrieving assigned tracking ID's and associated postage information to and from the tracking information database 472. Although the local memory 468 is depicted in FIG. 7 as a single memory device, it should be understood that it can be implemented in a multitude of memory devices.

Figure 8:
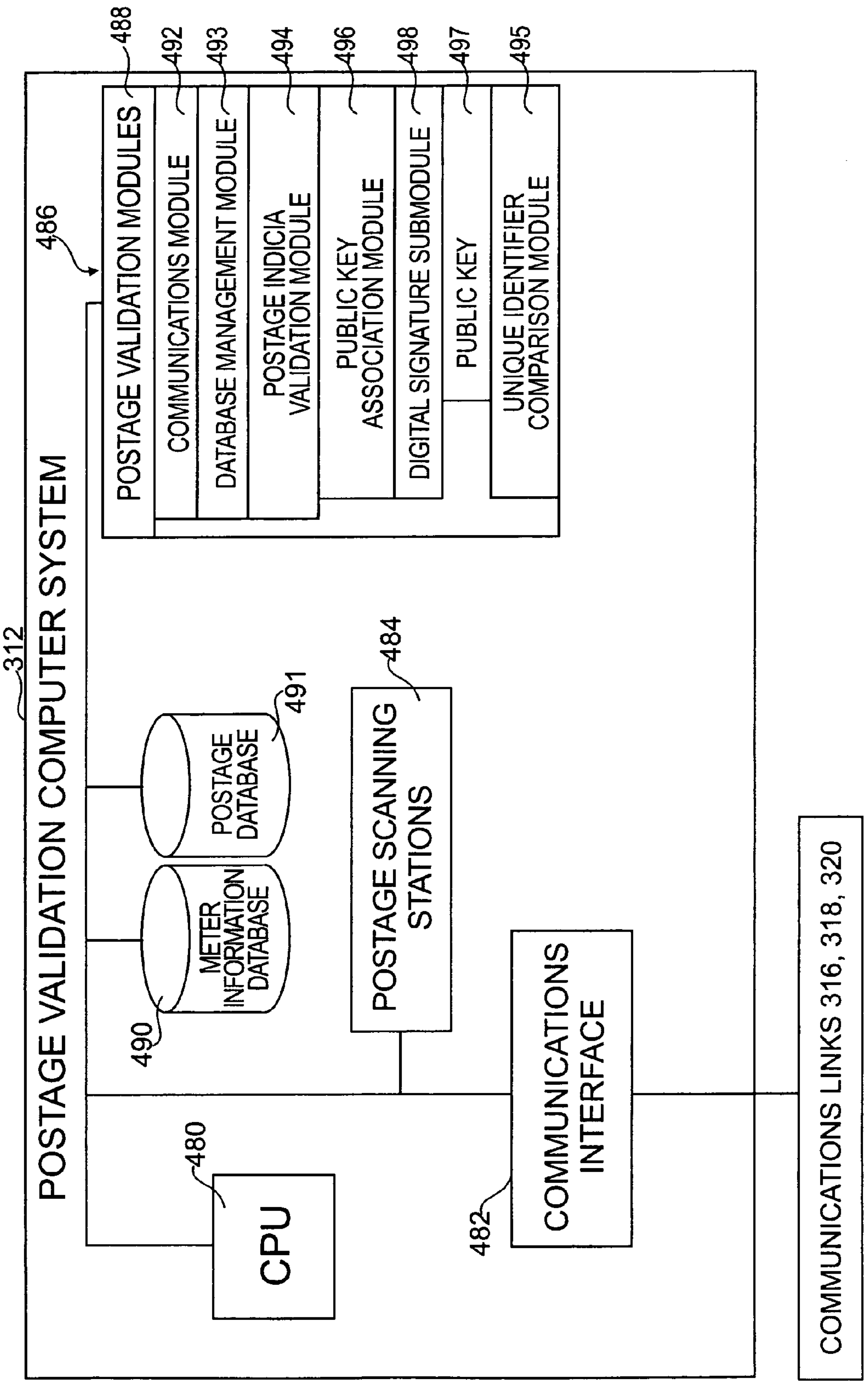
FIG. 8 is a block diagram of a postage validation computer system used in the first postal system of FIG. 3.

Referring specifically to FIG. 8, the postage validation computer system 312 comprises data processing circuitry 480 (such as, e.g., a Central Processor Unit (CPU)) for executing programs, a communications interface 482 (such as, e.g., a bank of modems, a LAN connection, or Internet connection) for handling communication with the centralized postage-issuing computer system 305/306/307, postage scanning stations 484, and a local memory 486. If the master tracking computer system 310 and the postage validation computer system 312 are not embodied in the same computer, the communications interface 482 may also handle communication with the master tracking computer system 310. The postage scanning stations 484 include the software and hardware (including a barcode reader) necessary for reading the barcode information applied on each mail piece and displaying it in a human-readable format for postal verifiers. The local memory 486, which will typically include both random access memory and non-volatile disk storage, stores a set of postage validation procedures that are embodied in various software modules 488. The local memory also stores a meter information database 490 of information about each licensed postage meter, i.e., each end user computer 308, and a transaction database 491 for storing records concerning every mail piece validated or rejected by the postage validation computer system 312, including the unique identifier(s) contained in the postage indicium, e.g., the tracking ID and postage vendor ID/user account/piece count (or ascending register).

The postage validation modules 488 include a communications module 492, database management module 493, a postage indicia validation module 494, and unique identifier comparison module 495. The communications module 492 is configured for handling communications with the centralized postage-issuing computer systems 305/306/307 over the communications links 318 (such as, e.g., receiving updated end user computer information and public key information). The communications module 492 is also configured for handling communications with the master tracking computer system 310 over the communications link 320 (such as, e.g., transmitting requests for tracking ID associated postage information and receiving the tracking ID associated postage information). The database management module 493 is configured for storing and retrieving pertinent information to and from the meter information database 490 and transaction database 491.

The postage indicia validation module 494 is configured for validating the postage indicia, and includes a public key association submodule 496 for selecting a public key from the set of public keys 497, as dictated by the certificate serial number (item #3 in Table 2) in the self-validating unique postage indicium, and a digital signature verification submodule 498, along with a selected public key, configured for verifying the digital signature in the self-validating unique postage indicium.

The unique identifier comparison module 495 is configured for comparing the digitally authenticated unique identifier contained in the postage indicium to all of the unique identifiers previously stored in the transaction database 491 to detect copy fraud. That is, a match means that the unique identifier has been previously used, which is an indication of copy fraud.

Figure 9:
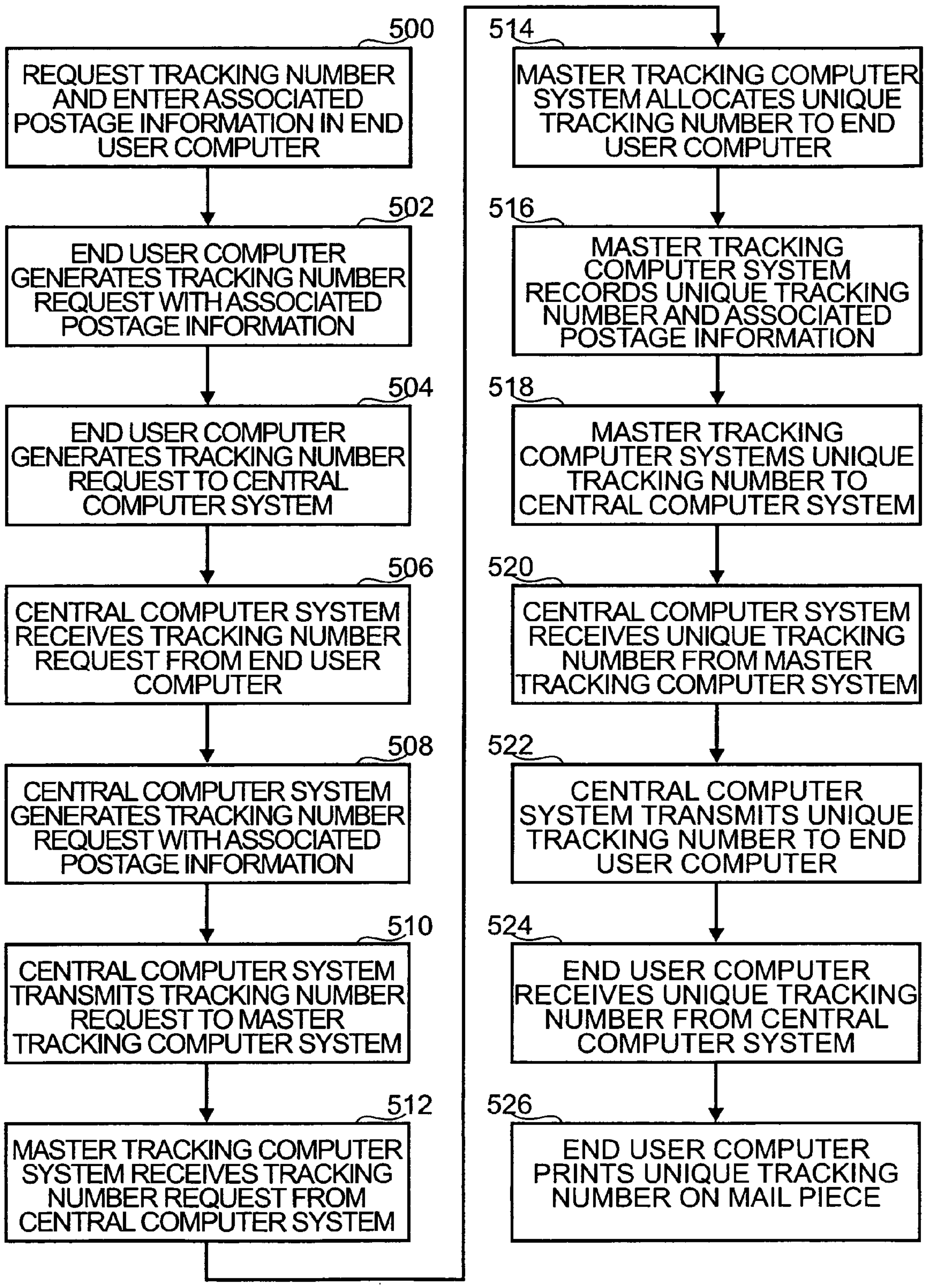
FIG. 9 is a flow diagram illustrating a procedure for indirectly issuing a tracking ID from the master tracking computer system of FIG. 7 to the end user computer of FIG. 4 via the centralized postage-issuing computer system of FIG. 5.

Referring specifically to FIG. 9, and with general reference to FIGS. 3-5 and 7, a procedure for indirectly issuing a tracking ID from the master tracking computer system 310 to the end user computer 308 via the centralized postage-issuing computer system 306 and applying it to the label 200 will now be described. At steps 500-504, the end user computer 308 generates and transmits a request for a unique tracking ID to the centralized postage-issuing computer system 306. In particular, the end user operates the user interface 402 of the end user computer 308 to request a unique tracking ID and enter postage information to be associated with the unique tracking ID (step 500). As previously discussed, this postage information may contain the API user account ID and password, complete destination address for the mail piece, sender's complete address, weight of the mail piece, service class, and the amount of postage. The tracking ID request module 414 then generates a tracking ID request with the associated postage information (step 502). The communications interface 410 then, under control of the communications module 418, transmits the tracking ID request over the communications link 314 (step 504).

At steps 506-510, the centralized postage-issuing computer system 306 receives the tracking ID request from the end user computer 308, and generates an identical tracking ID request, and transmits the tracking ID request to the master tracking computer system 310. In particular, the communications interface 423, under control of the communications module 434, receives the tracking ID request over the communications link 314 (step 506). The tracking ID request module 438 then generates a tracking ID request with the associated postage information, which is identical to the tracking ID request received from the end user computer 308 (step 508). Optionally, the database management module 436 stores the tracking information within a database, such as, e.g., a tracking information database (not shown). The communications interface 423 then, under control of the communications module 434, transmits the tracking ID request over the communications link 316 (step 510).

At steps 512-518, the master tracking computer system 310 receives the tracking ID request from the centralized postage-issuing computer system 306, allocates a unique tracking ID to the end user computer 308, records the unique tracking ID, along with the associated postage information, and transmits the unique tracking ID to the centralized postage-issuing computer system 306. In particular, the communications interface 466, under control of the communications module 474, receives the tracking ID request over the communications link 316 (step 512). The tracking ID allocation module 476 then allocates a unique tracking ID to the end user computer 308, which typically will be the next tracking ID in a series of tracking ID's (step 514). The database management module 478 then stores the unique tracking ID, as well as the associated postage information contained within the tracking ID request received from the centralized postage-issuing computer system 306, within the tracking information database 472 (step 516). The communications interface 466 then, under control of the communications module 474, transmits the unique tracking ID over the communications link 316 (step 518).

At steps 520 and 522, the centralized postage-issuing computer system 306 receives the unique tracking ID from the master tracking computer system 310 and transmits the unique tracking ID to the end user computer 308. In particular, the communications interface 423, under control of the communications module 434, receives the unique tracking ID over the communications link 316 (step 520). The communications interface 423 then, under control of the communications module 434, transmits the tracking ID over the communications link 314 (step 522).

At steps 524 and 526, the end user computer 308 receives the tracking ID from the centralized postage-issuing computer system 306 and prints the tracking ID on the label 200. In particular, the communications interface 410, under control of the communications module 418, receives the unique tracking ID over the communications link 314 (step 524). The tracking ID printing module 420 then prints on the label 200 the standard tracking ID 218 as the one-dimensional barcode 220 (step 526).

Figure 10:
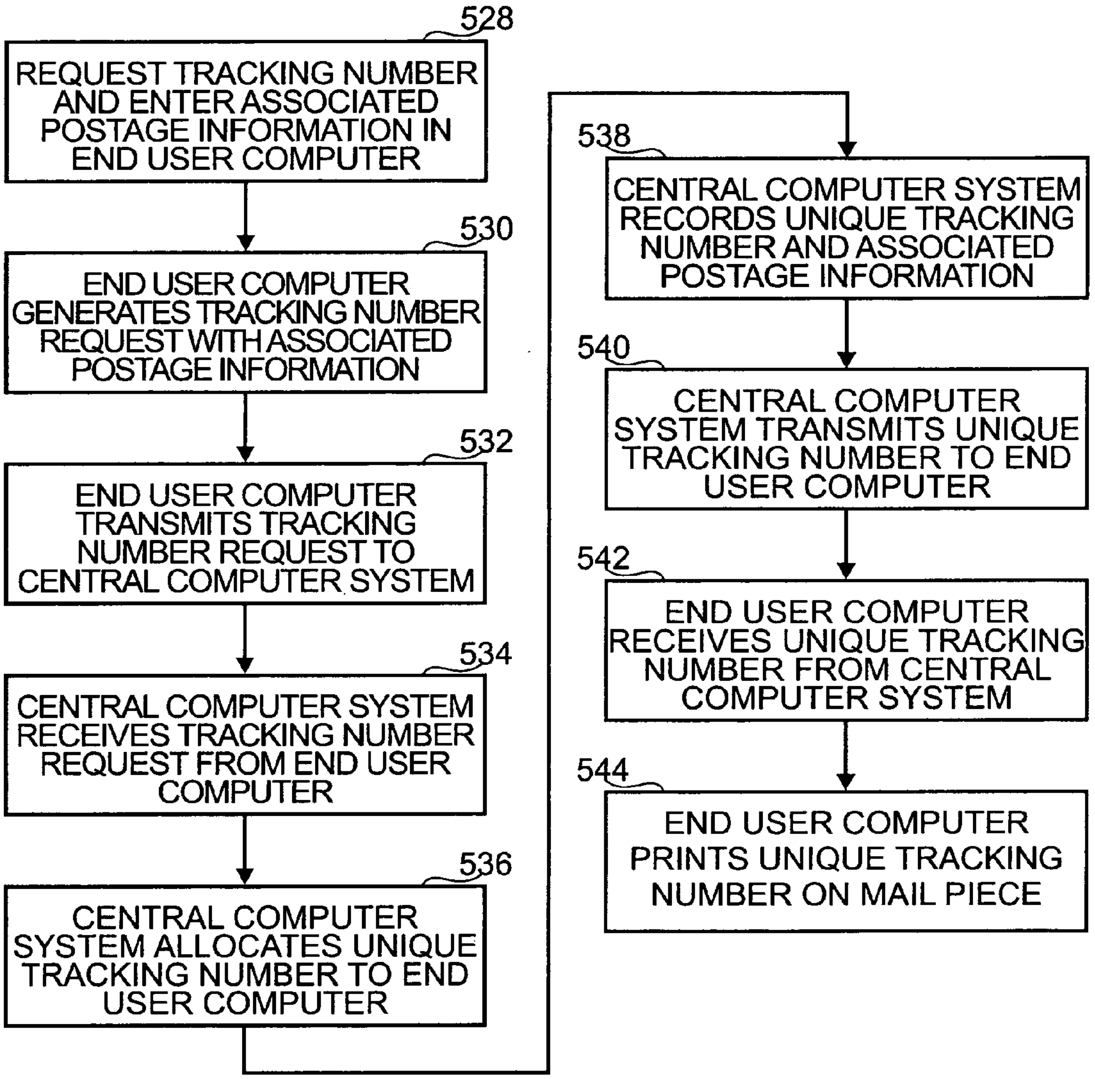
FIG. 10 is a flow diagram illustrating a procedure for issuing a tracking ID from the centralized postage-issuing computer system of FIG. 6 to the end user computer of FIG. 4.

Referring specifically to FIG. 10, and with general reference to FIGS. 3-4 and 6-7, a procedure for issuing a tracking ID from the centralized postage-issuing computer system 307 to the end user computer 308 and applying it to the label 200 will now be described. At steps 528-532, the end user computer 308 generates and transmits a request for a unique tracking ID to the centralized postage-issuing computer system 307. Steps 528-532 are similar to steps 500-504 described with respect to FIG. 9 and will thus not be described in detail here.

At steps 534-540, the centralized postage-issuing computer system 307 receives the tracking ID request from the end user computer 308, allocates a unique tracking ID to the end user computer 308, records the unique tracking ID, along with the associated postage information, and transmits the unique tracking ID to the end user computer 308. In particular, the communications interface 423, under control of the communications module 434, receives the tracking ID request over the communications link 314 (step 534). The tracking ID allocation module 460 then allocates a unique tracking ID to the end user computer 308, which typically will be the next tracking ID in a series of tracking ID's stored in the tracking ID database 454 (step 536). The database management module 462 then stores within the tracking information database 456 the unique tracking ID, as well as the associated postage information contained within the tracking ID request received from the end user computer 308 (step 538). The communications interface 423 then, under control of the communications module 434, transmits the tracking ID over the communications link 314 (step 540).

At steps 542 and 544, the end user computer 308 receives the tracking ID from the centralized postage-issuing computer system 306 and prints the tracking ID on the label 200. Steps 542 and 544 are similar to steps 526 and 528 described with respect to FIG. 9 and will thus not be described in detail here. Periodically, such as, e.g., once a day, a pool of unassigned unique tracking ID's will be downloaded into the centralized postage-issuing computer system 307 from the master tracking computer system 310, and assigned tracking ID's and the associated postage information will be uploaded from the centralized postage-issuing computer system 307 to the master tracking computer system 310. Alternatively, rather than sending tracking information in batch mode, the tracking information can be transmitted to the master tracking computer system 310 in real-time, i.e., as the tracking ID's are assigned to the end user computers 308.

Figure 11:
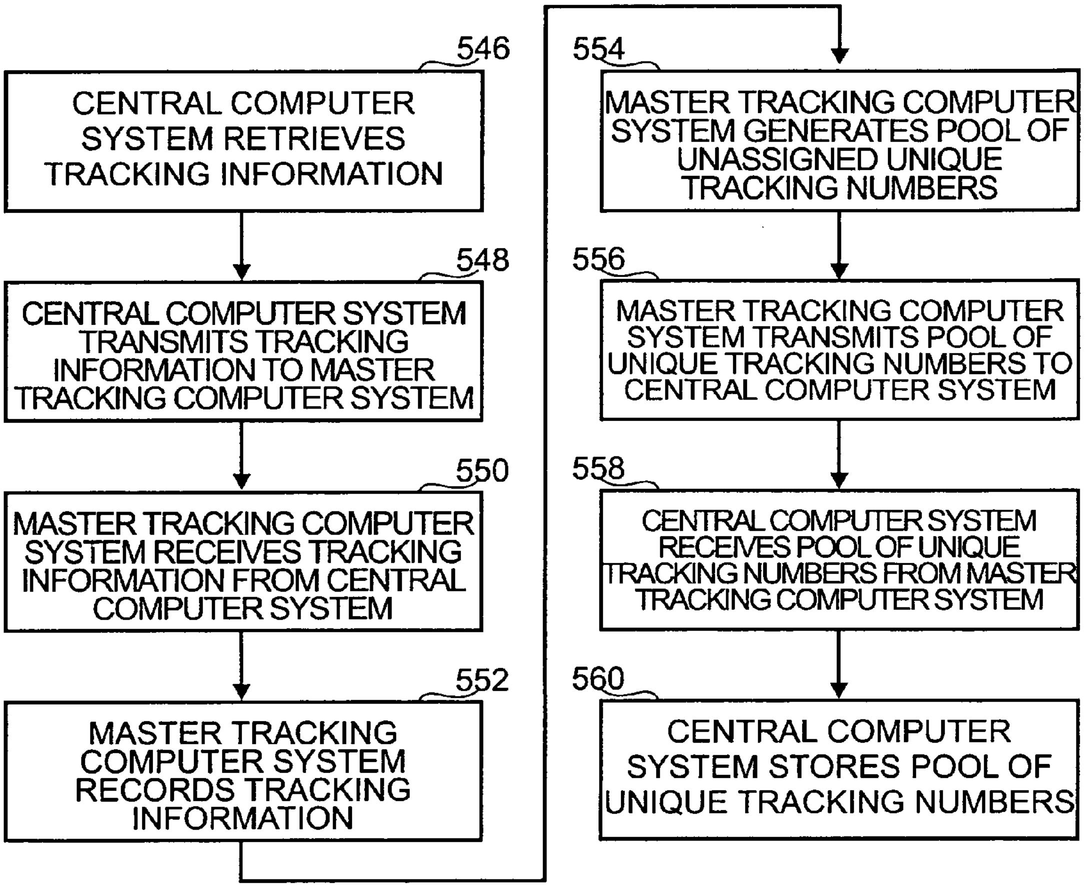
FIG. 11 is a flow diagram illustrating a procedure for downloading unassigned tracking ID's from the master computer tracking system of FIG. 7 into the centralized postage-issuing computer system of FIG. 6 and for uploading postage information from the centralized postage-issuing computer system to the master tracking computer system.

The procedure for performing these downloading and uploading functions are now described with respect to FIG. 11. At steps 546-552, the centralized postage-issuing computer system 307 retrieves all of the accumulated assigned tracking ID's and associated postage information and transmits it to the master tracking computer system 310, and then the master tracking computer system 310 receives the tracking information from the centralized postage-issuing computer system 307 and records it. In particular, the database management module 462 retrieves the assigned tracking ID's and associated postage information from the tracking information database 456 (step 546). The communications interface 423 then, under control of the communications module 434, transmits the retrieved tracking information over the communications link 316 (step 548). The communications interface 466, under control of the communications module 474, receives the tracking information over the communications link 316 (step 550). The database management module 478 then stores the tracking information in the tracking information database 472 (step 552).

At steps 554-560, the master tracking computer system 310 generates a pool of unassigned tracking ID's and transmits it to the centralized postage-issuing computer system 307, and the centralized postage-issuing computer system 307 receives the pool of unassigned unique tracking ID's from the master tracking computer system 310 and records it. In particular, the database management module 478 generates a pool of unassigned unique tracking ID's (step 554). The communications interface 466 then, under control of the communications module 474, transmits the pool of unassigned tracking ID's over the communications link 316 (step 556). The communications interface 423, under control of the communications module 434, receives the tracking information over the communications link 316 (step 558). The database management module 462 then stores the pool of unassigned unique tracking ID's in the tracking ID database 454 (step 560).

Figure 12:
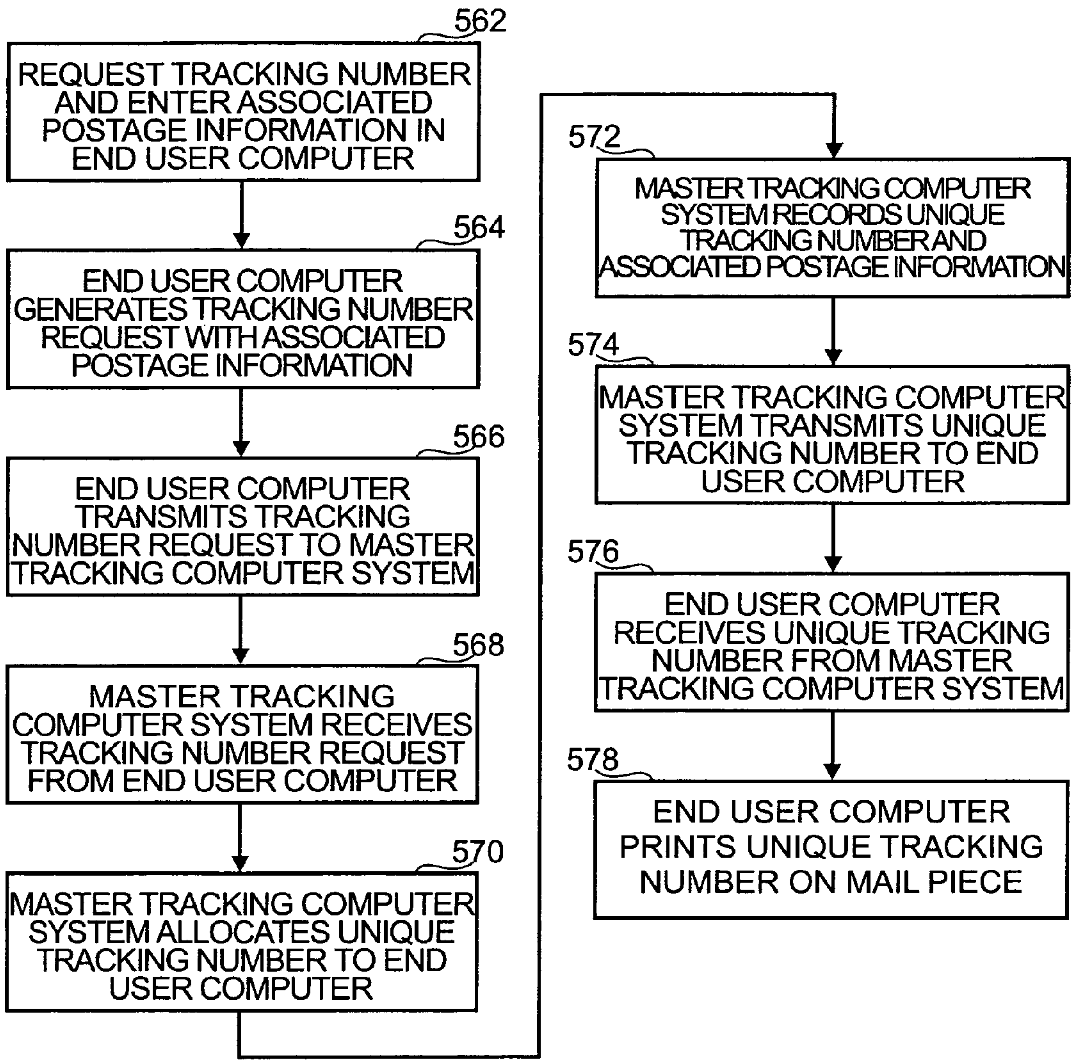
FIG. 12 is a flow diagram illustrating a procedure for directly issuing a tracking ID from the master tracking computer system of FIG. 7 to the end user computer of FIG. 4.

Referring specifically to FIG. 12, and with general reference to FIGS. 3-5 and 7-8, a procedure for directly issuing a tracking ID from the master tracking computer system 310 to the end user computer 308 and applying it to the label 200 will now be described. At steps 562-566, the end user computer 308 generates and transmits a request for a unique tracking ID to the master tracking computer system 310. Steps 562 and 564 are similar to steps 500 and 502 described with respect to FIG. 9 and will thus not be described in detail here. After steps 562 and 564, the communications interface 410, under control of the communications module 418, transmits the tracking ID request over the communications link 322 (step 566).

At steps 568-572, the master tracking computer system 310 receives the tracking ID request from the end user computer 308, allocates a unique tracking ID to the end user computer 308, records the unique tracking ID, along with the associated postage information, and transmits the unique tracking ID to end user computer 308. In particular, the communications interface 466, under control of the communications module 474, receives the tracking ID request over the communications link 322 (step 568). The tracking ID allocation module 476 then allocates a unique tracking ID to the end user computer 308, which typically will be the next tracking ID in a series of tracking ID's (step 570). The database management module 478 then stores within the tracking information database 472 the unique tracking ID, as well as the associated postage information contained within the tracking ID request received from the end user computer 308 (step 572). The communications interface 466 then, under control of the communications module 474, transmits the unique tracking ID over the communications link 322 (step 574).

At steps 576 and 578, the end user computer 308 receives the tracking ID from the master tracking computer system 310 and prints the tracking ID on the label 200. In particular, the communications interface 410, under control of the communications module 418, receives the unique tracking ID over the communications link 322 (step 576). The tracking ID printing module 420 then prints on the label 200 the standard tracking ID 218 as the one-dimensional barcode 220 (step 578).

Figure 13:
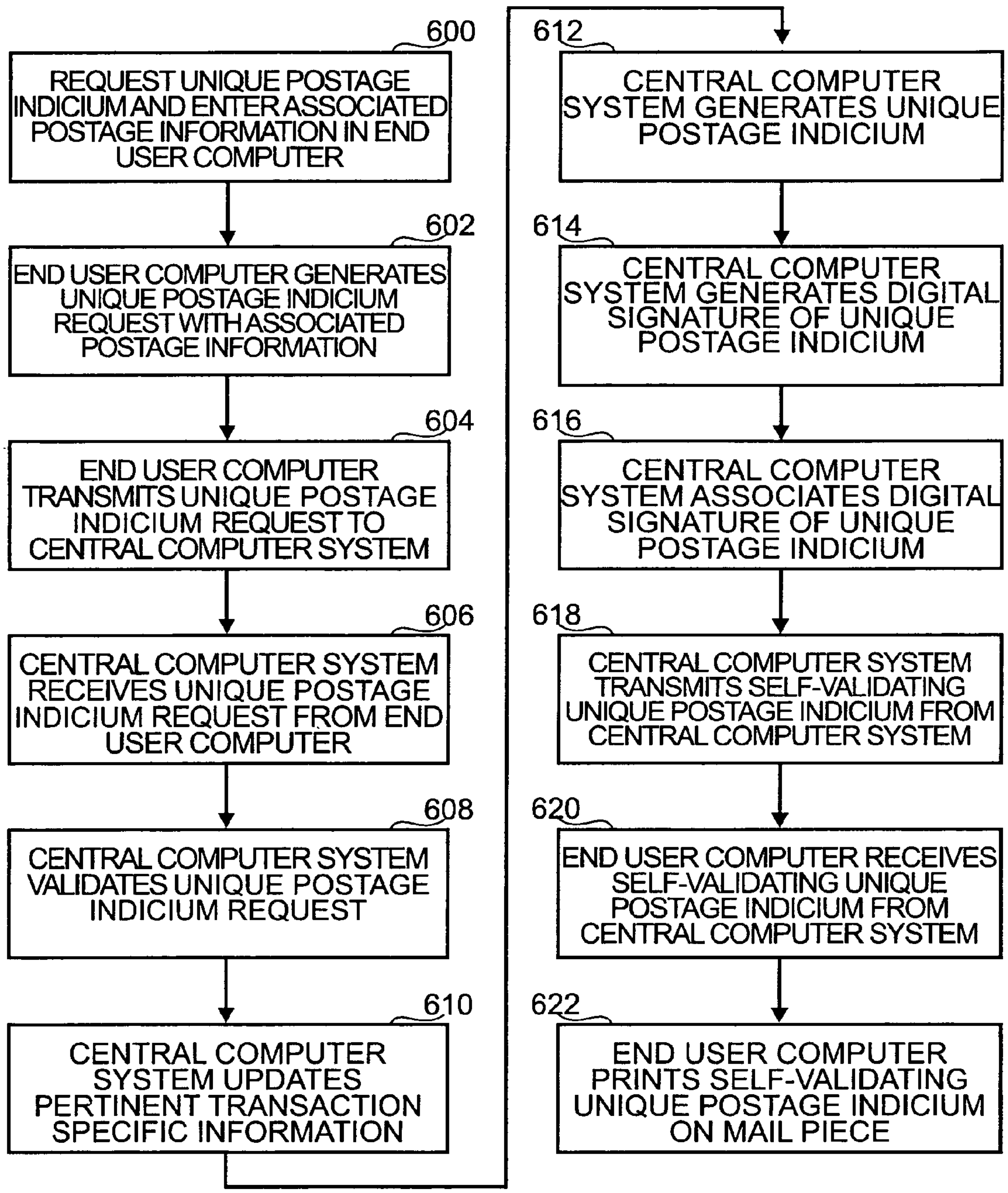
FIG. 13 is a flow diagram illustrating a procedure for dispensing a self-validating unique postage indicium from the centralized postage-issuing computer system of FIG. 5, 6, or 33 to the end user computer of FIG. 4.

Referring specifically to FIG. 13, and with general reference to FIGS. 3-6, the procedure for dispensing and applying a self-validating unique postage indicium to the label 200 will now be described. At steps 600-604, the end user computer 308 generates and transmits a unique postage indicium request to the centralized postage-issuing computer system 305/306/307. In particular, the end user operates the user interface 402 of the end user computer 308 to request a unique postage indicium and enter postage information to be associated with the unique postage indicium (step 600). As previously discussed, this postage information may contain the user's meter or account ID, the user account password, postage requested, service class, optional data advance, and ZIP+4+2 of the delivery address. If the end user computer 308 has previously obtained a tracking ID directly from the master tracking computer system 310 by the process described in FIG. 12, the postage information will also contain the tracking ID. In any event, the postage indicia request module 416 then generates a postage indicium request with the associated postage information (step 602). The communications interface 410 then, under control of the communications module 418, transmits the postage indicium request over the communications link 314 (step 604).

At steps 606-618, the centralized postage-issuing computer system 305/306/307 receives the postage indicium request from the end user computer 308, validates it, records the postage information contained in the postage indicium request, as well as any other transaction specific pertinent information, generates a self-validating unique postage indicium, and transmits the self-validating unique postage indicium to the end user computer 308. In particular, the communications interface 423, under control of the communications module 434, receives the postage indicium request over the communications link 314 (step 606). The postage indicium request validation module 440 then validates the postage indicium request by validating the user account ID and account password (step 608). If the user account ID or password does not correspond to an active user account, an error message is generated.

The database management module 436 then updates the customer database 428 and postage database 430 with the pertinent transaction specific information (step 610). If available, the database management module 436 will store the tracking ID in the postage database 430. The postage indicium generation module 442 then generates the self-validating unique postage indicium (steps 612-616). Specifically, the postage indicium generation submodule 446 generates a unique postage indicium containing the items set forth in Table 2, including the unique identifier(s) (such as, e.g., the postage vendor ID/user account number in combination with the piece count or descending register number, and unique tracking ID (if available) contained within the postage indicium request) (step 612). At this point, the unique postage indicium is not self-validating. The digital signature generation submodule 448 then derives a digital signature from the unique postage indicium by applying the private key 444 thereto (step 614). The association submodule 450 then generates the self-validating unique postage indicium by associating the digital signature with the unique postage indicium (step 616). The communications interface 423 then, under control of the communications module 434, transmits the self-validating unique postage indicium over the communications link 314 (step 618).

At steps 620 and 622, the end user computer 308 receives the self-validating unique postage indicium from the centralized postage-issuing computer system 305/306/307 and prints it on the label 200. In particular, the communications interface 410, under control of the communications module 418, receives the self-validating unique postage indicium over the communications link 314 (step 620). The postage indicia printing module 420 then prints on the label 200 the two-dimensional barcode 206 corresponding to the self-validating unique postage indicium (step 622). The label 200 can then be applied to the appropriate mail piece.

It should be noted that although the tracking ID acquisition and printing processes described with respect to FIGS. 9-12, and the postage indicium acquisition and printing process described with respect to FIG. 13, have been described as distinct functions, these processes are preferably performed as a single process as experienced by the end user. For example, the tracking ID and postage indicium requests will be separately generated and transmitted from the end user computer 308, but will be prompted by the single click of a mouse on, e.g., a "print button." Upon the acquisition of both the tracking ID and postage indicium, the barcodes will be printed on the label 200 as a single step. If either or both of the tracking ID and postage indicium are not returned successfully, nothing is printed on the label 200. For example, if the postage indicium request fails for any reason, the entire process is aborted even through a tracking ID has been issued, in which case, it will be "orphaned."

Figure 14:
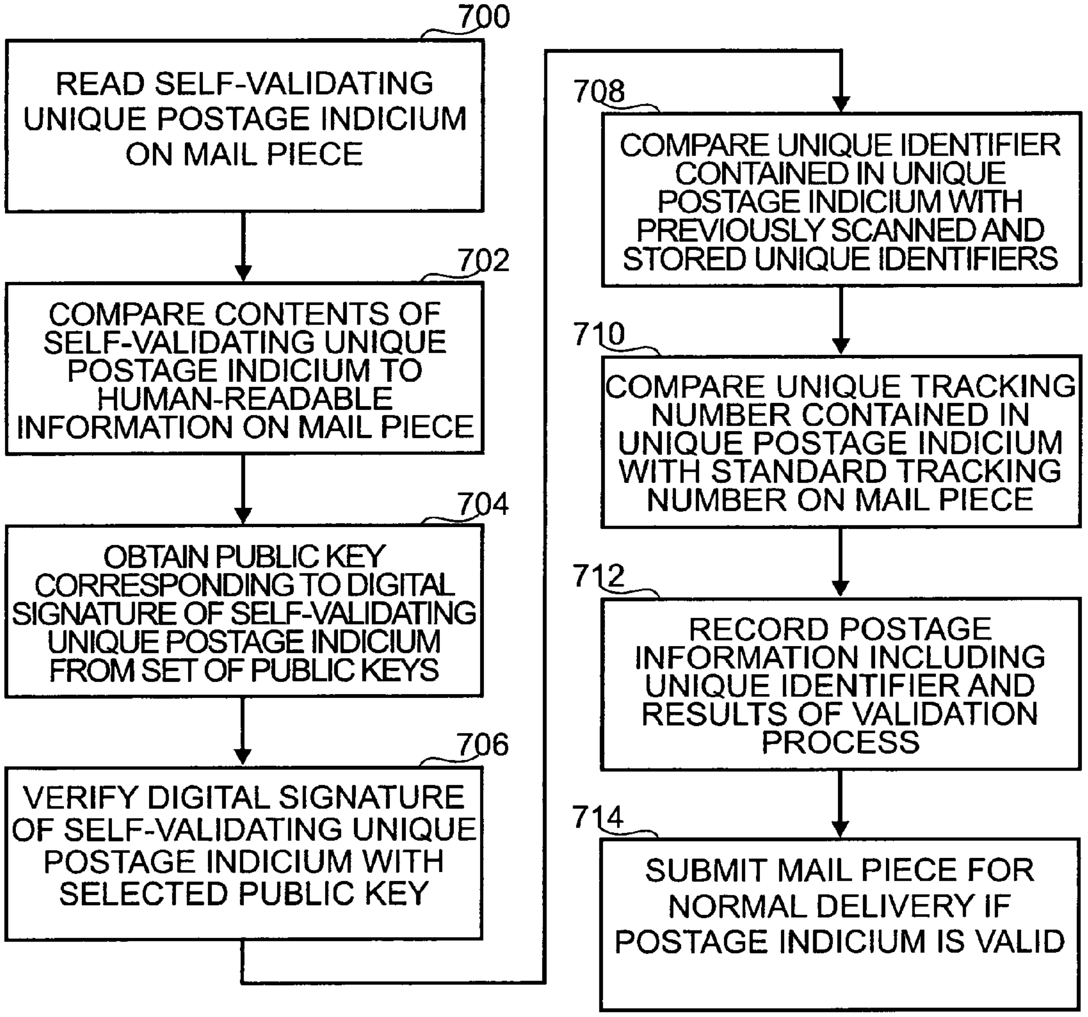
FIG. 14 is a flow diagram illustrating a procedure for validating the postage on a mail piece using the postage validation computer system of FIG. 8.

Referring to specifically FIG. 14, and with general reference to FIGS. 4-7, the procedures for validating the postage on a mail piece using a stand-alone procedure will now be described. It should be noted that the order of the validation steps in the procedure is completely variable and will likely vary from implementation to implementation. At step 700, the postal verifier operates a postage scanning station 484 within the postage validation computer system 312 to read the self-validating postage indicium (i.e., the two-dimensional barcode 206) on the mail piece and display its contents to the verifier. At step 702, the verifier then manually compares the contents of the two-dimensional barcode 206 to the human-readable information (e.g., mailing date, postage amount, origin of mail piece, and destination of mail piece). If the barcode information does not match the human-readable information, this is an indication of likely fraudulent use of a postage indicium and is treated as such. Further details on this comparison process are disclosed in U.S. Pat. No. 6,005,945, which has previously been incorporated herein by reference.

At steps 704-706, the postal verifier validates the postage indicium itself by operating the postage indicia validation module 494. In particular, the public key association submodule 496 obtains from the set of public keys 497 the public key corresponding to the Certificate Serial Number (item #3 in Table 2) within the postage indicium (step 704). The digital signature verification submodule 498 then verifies the digital signature of the postage indicium (step 706) to determine if they are consistent. If the signature verification process returns a Boolean true, this indicates that the postage indicium was in fact generated by a secure central computer 305/306/307 for a mail piece of the same approximate weight, origin and destination as the mail piece being processed.

This will not, however, detect copy fraud. Thus, at step 708, the unique identifier comparison module 495 compares the unique identifier(s) of the mail piece (i.e., the unique tracking ID (if available), and the postage vendor ID/user account/piece count (or ascending register)) with the set of unique identifiers previously stored in the transaction database 491. If the unique identifier of the current mail piece matches at least one of the unique identifiers stored in the transaction database 491, copy fraud is assumed, or at least suspected. If the unique identifier of the current mail piece does not match at least one of the unique identifiers stored in the transaction database 491, copy fraud is not assumed, although copy fraud may be detected if a fraudulent duplicate of the postage indicium is subsequently processed.

It is worth noted that copy fraud detection using this process works with respect to any mail piece of any nature only if the unique identifiers contained in the postage indicia of all mail pieces are scanned and entered into the transaction database 491. Alternatively, copy fraud detection using this process works with respect to any mail piece that carries a tracking ID if the tracking ID's contained in the postage indicia of all of these types of mail pieces are scanned and entered into the transaction database 491. Currently, however, the USPS only spot checks the postage indicia, and thus copy fraud may be currently difficult to detect using copy fraud—at least until the USPS scans 100% of the postage indicia. For example, if the postage indicia is checked only 10% of time, statistically, copy fraud will only be detected 1% of the time.

Alternatively, when spot checking is the norm, detection of copy fraud in mail pieces that carry unique tracking ID's can be maximized by comparing the unique tracking ID contained in the postage indicium with the standard tracking ID printed on the mail piece (step 710). Thus, if the unique tracking ID contained in the postage indicium does not match the tracking ID contained elsewhere on the mail piece, copy fraud is suspected. It is noted that the one-dimensional barcode 220 associated with the tracking ID is scanned 100% of the time in the normal course of the USPS tracking business, and thus, a copyist will not attempt to duplicate one-dimensional barcodes 220 along with the unique postage indicia, but will rather only attempt to duplicate the unique postage indicia hoping that the tracking ID's contained therein will not be compared with the tracking ID's associated with the one-dimensional barcodes 220. Thus, if the postage indicia is checked 10% of the time, copy fraud will be detected 10% of the time—a significant improvement.

It should be noted that additional transaction information can be obtained from the centralized postage-issuing computer system 305/306/307 or master tracking computer system 310 over the communications links 318 and 320. This process will not be described in further detail. After the postage has been validated or rejected, the database management module 493 stores the postage information, including the unique identifier(s) contained within the postage indicium within the transaction database 491, along with the results of the validation process (step 712). If valid, the mail piece is then submitted for normal delivery processing (step 714).

Figure 15:
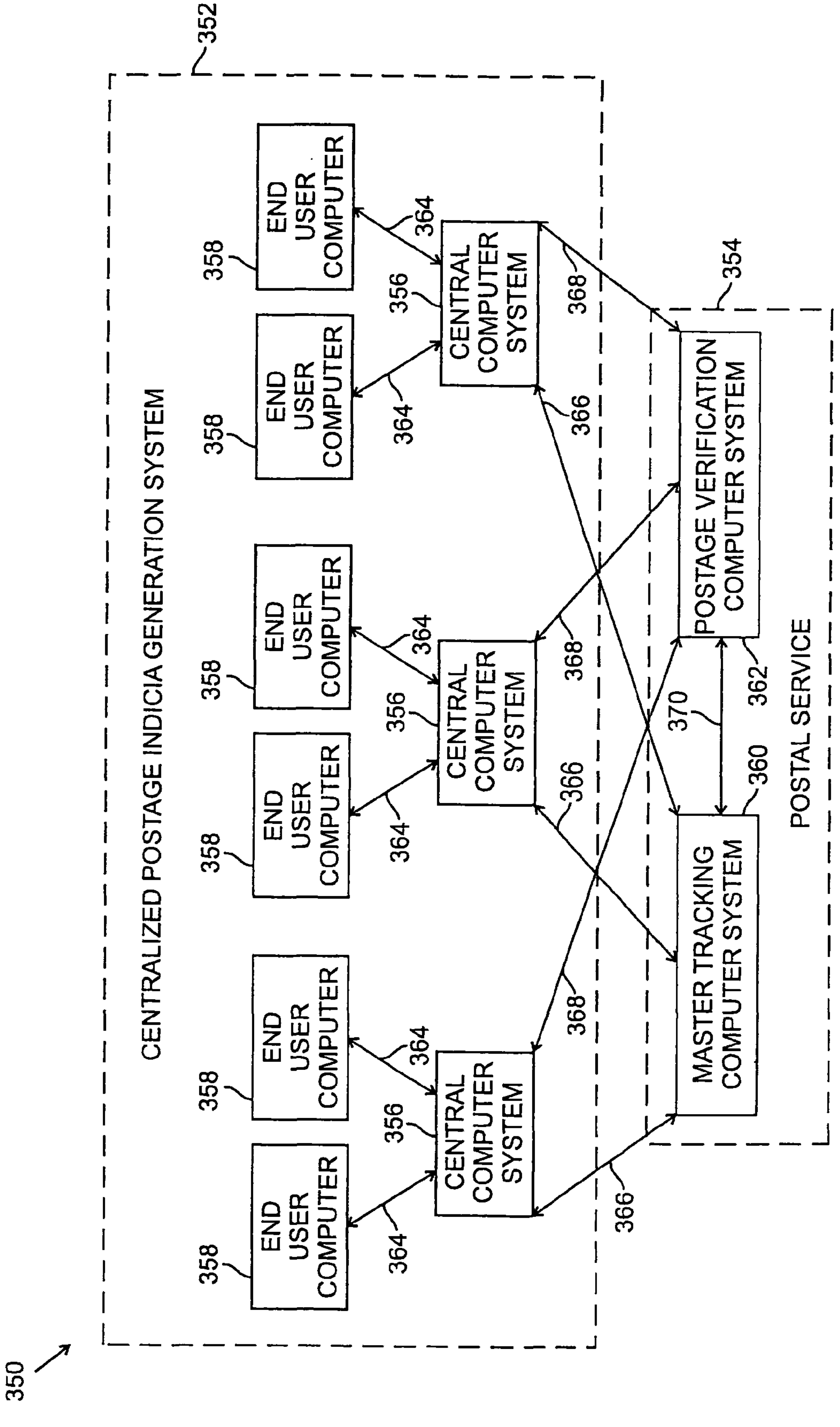
FIG. 15 is a block diagram of a second postal system constructed in accordance with the present inventions, wherein the second postal system utilizes indexing identifiers to reduce or eliminate the size of the postage indicium.

With reference to FIG. 15, a postage system 350 comprises a centralized postage indicia generation system 352, which includes a multitude of centralized postage-issuing computer systems 356, each of which includes a multitude of end user computers 358. The postage system 350 also generally comprises a postal service 354, which includes an optional master tracking computer system 360 and a postage validation computer system 362. The centralized postage-issuing computer system 356, end user computer 358, master tracking computer system 360, and postage validation computer system 362 communicate with each other over communications links 364-370 (such as, e.g., LAN, Internet, or telephone network).

These components are generally similar to the same-named components of the postage system 300, but differ somewhat in that it provides a means for validating postage indicia in a non-stand-alone verification system using indexing identifiers. In this embodiment, in response to requests for postage from end user computers 358, each centralized postage-issuing computer system 356 generates postage indicia, and rather than transmitting it to the end user computers 358, indexes and stores the postage indicia. The postage indicia are indexed using indexing identifiers, which are transmitted to the end user computers 358 for printing on the mail pieces. In the illustrated embodiment, the indexing identifiers are unique within the postage service 354. Thus, at least for a significant period of time, e.g., one year, no two unique indexing identifiers will be identical, thereby providing a reliable means for detecting mail fraud. The unique indexing identifiers can be composed of numbers, letters, or a combination thereof, and can be composed of tracking ID's postage vendor ID/user account/piece count (or ascending register) combinations, similar to the unique identifiers described with respect to the postage system 300.

These printed indexing identifiers can then be subsequently used by the postage service 354 to obtain the stored postage indicia from the centralized postage-issuing computer systems 356. The centralized postage indicia generation methodology offers a host of new security enhancements. Thus, if one makes the assumption that any mail piece validation tool would have access to the Internet (e.g., a laptop with a wireless Internet connection on a loading dock, or a desktop personal computer (PC) located in a mail processing facility), then one may greatly simplify the information contained on the mail piece itself if the mail piece was generated with a centralized postage service.

Figure 16:
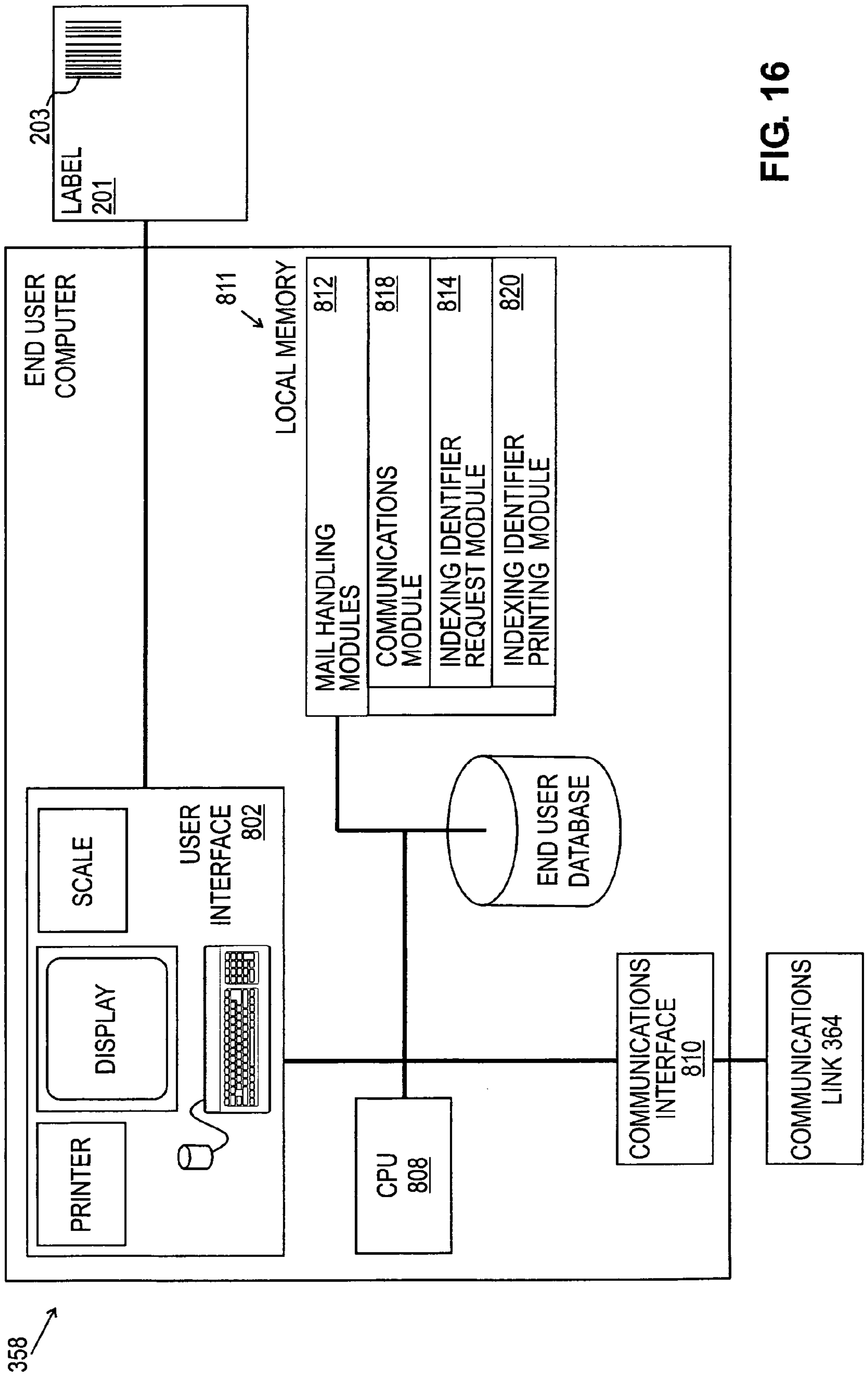
FIG. 16 is a block diagram of an end user computer used in the second postal system of FIG. 15.
Figure 17:
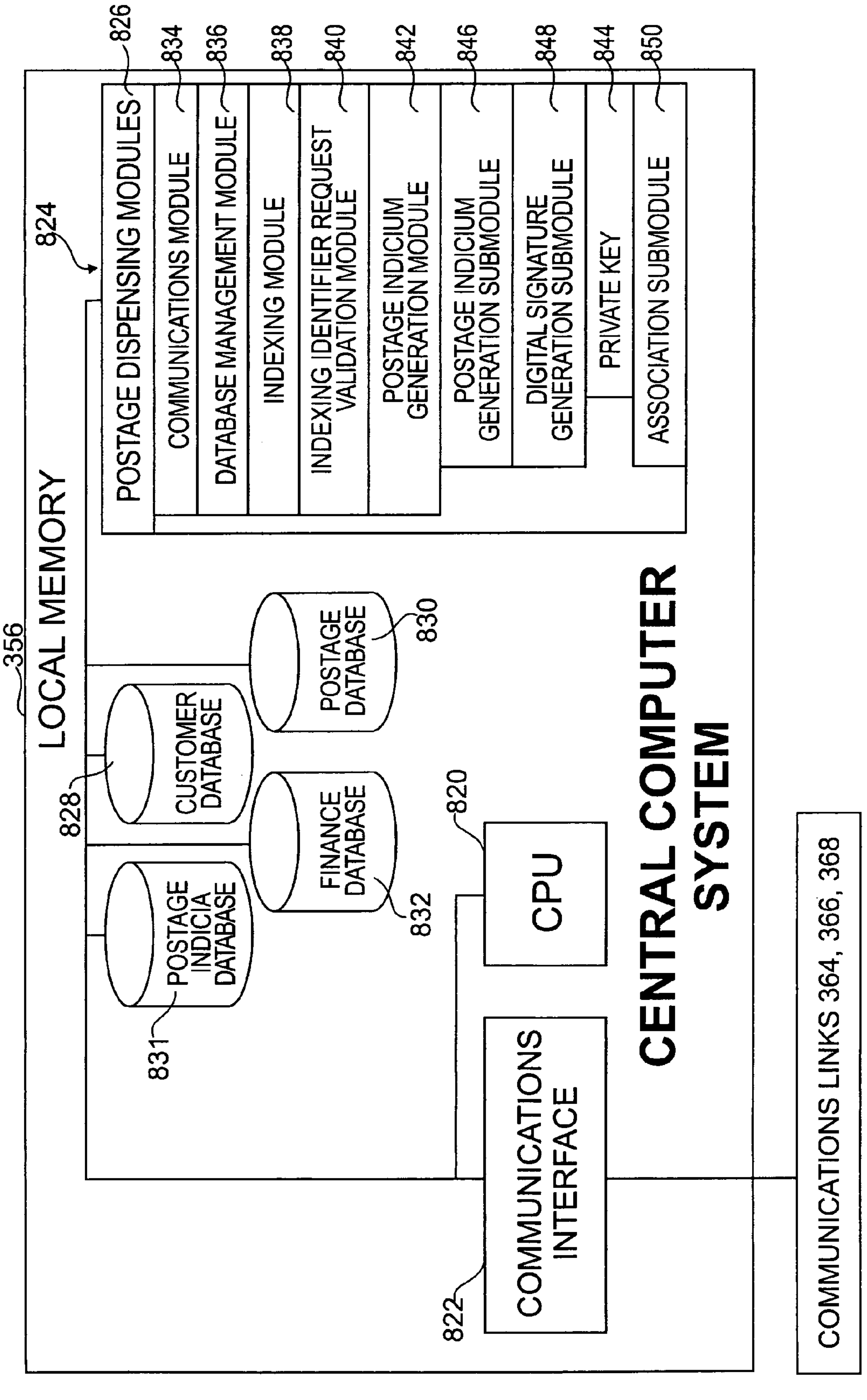
FIG. 17 is a block diagram of a centralized postage-issuing computer system used in the second postal system of FIG. 15.
Figure 18:
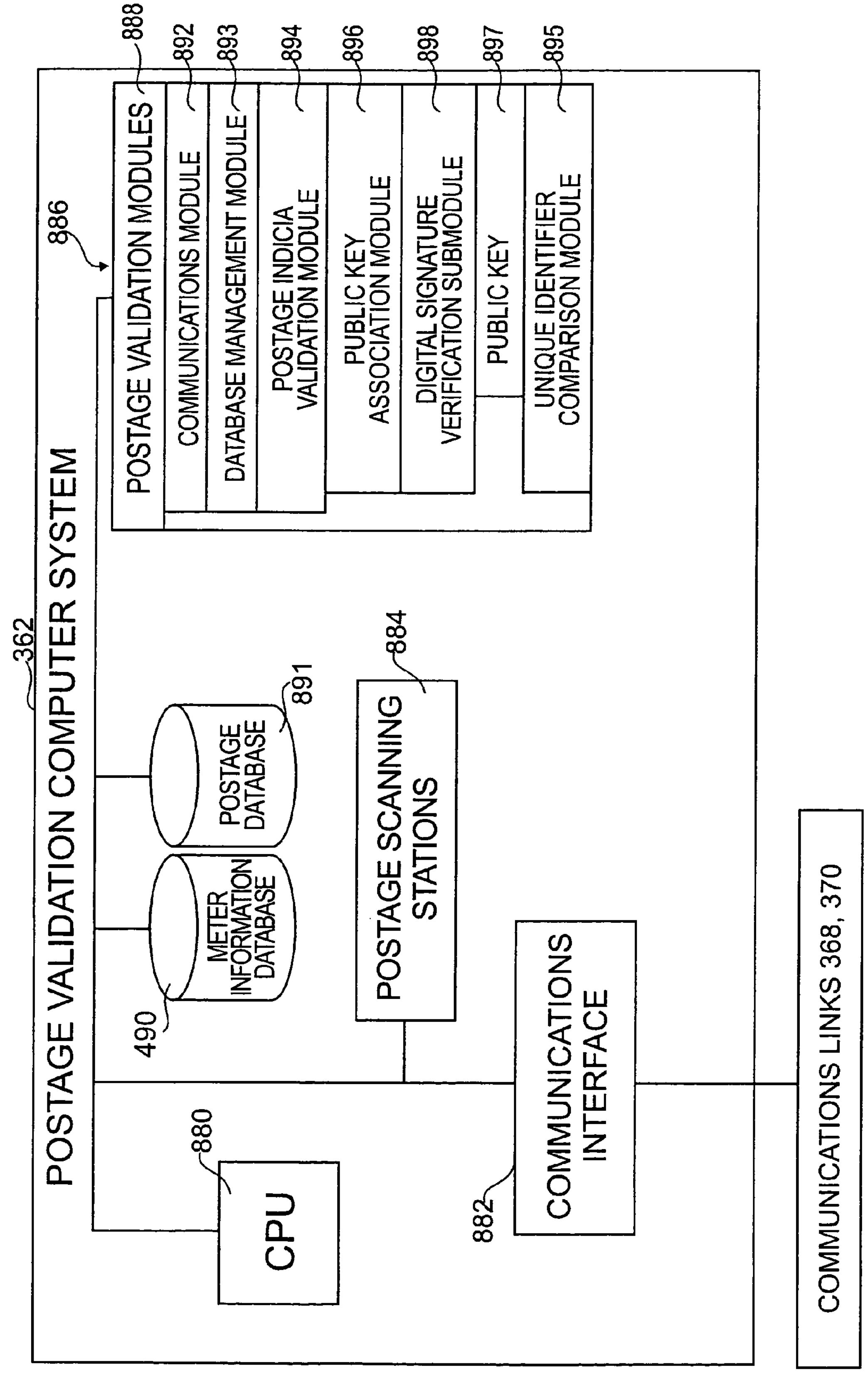
FIG. 18 is a block diagram of a postage validation computer system used in the second postal system of FIG. 15.

Turning now to FIGS. 16-18, the structural details of the postage system 350 will now be described. For purposes of brevity, the tracking ID related components have not been included in the structure details of the postage system 350. It should be noted, however, that such tracking ID components could be incorporated in the postage system 350 to provide tracking ID functionality to the postage system 350 similar to that of the postage system 300.

With specific reference to FIG. 16, each end user computer 358 contains conventional computer hardware, including a user interface 802, data processing circuitry 808 (such as, e.g., a Central Processor Unit (CPU)), and communications interface 810, which are similar to the same-named components of the previously described end user computer 308 and will thus not be described in further detail. The end user computer 358 further comprises local memory 811, which is similar to the local memory 411 of the previously described end user computer 308, with the exception that it includes a set of mail handling modules 812 configured to handle indexing identifiers, rather than tracking ID's and postage indicia.

Specifically, the mail handling modules 812 include an indexing identifier request module 814, communications module 818, and indexing identifier printing module 820. The indexing identifier request module 814 is configured for generating a request for an indexing identifier. In the illustrated embodiment, this request takes the form of a query stream (e.g., in Extensible Markup Language (XML) format), and contains information specific to the immediate postage dispensing transaction (such as, e.g., the user's meter or account ID, the user account password, postage requested, service class, optional data advance, and ZIP+4+2 of the delivery address). The communications module 818 is configured for handling communications with the centralized postage-issuing computer system 356 over the communications link 364 (such as, e.g., transmitting indexing identifier requests and receiving indexing identifiers in response thereto). The indexing identifier printing module 820 is configured for printing an indexing identifier 203 received from the centralized postage-issuing computer system 356 on a label 201. The completed label 201 is similar to the completed label 200 illustrated in FIG. 4, with the exception that the indexing identifier is printed thereon rather than a postage indicium and tracking ID.

Figure 19:
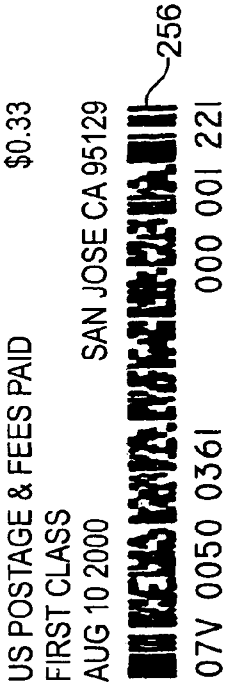
FIG. 19 is a top view of an indexing identifier represented as a two-dimensional barcode.
Figure 20:
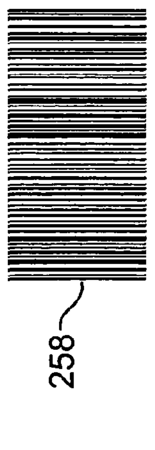
FIG. 20 is a top view of an indexing identifier represented as a one-dimensional Code 128 barcode.
Figure 21:
FIG. 21 is a top view of an indexing identifier represented as a one-dimensional POSTNET or PLANET barcode.
Figure 22:
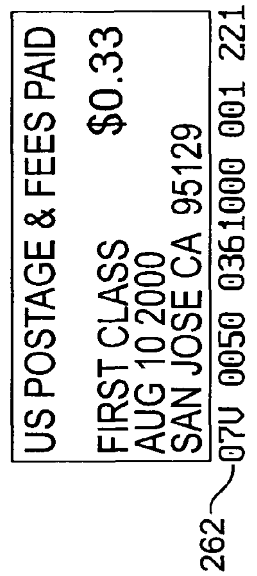
FIG. 22 is a top view of an indexing identifier represented as numerical data.

The indexing identifier can be printed on the label 201 in various formats. For example, FIG. 19 illustrates a two-dimensional barcode 256, which represents the indexing identifier. As can be seen, the two-dimensional barcode 256 is much smaller than two-dimensional barcodes that represent a full postage indicium, because it contains much less information, i.e., a unique identifier. In this case, the unique identifier is composed of a postage vendor ID (07), user account number (500361), and piece count ($1221^{st}$ piece generated for this user account). In fact, the information makes the indexing identifier is so minimal, that a one-dimensional barcode can be used. For example, a Code 128 barcode 258 illustrated in FIG. 20, or postal-specific barcode topology, such as the POSTNET or PLANET barcode 260 illustrated in FIG. 21, can be used to represent the postage vendor ID, account number, and piece count of the indexing identifier. Even more alternatively, use of a barcode can be omitted altogether, and the indexing identifier id) can simply be printed on the mail piece as numerical data 262, as illustrated in FIG. 22. The numerical data 262 can be read by Optical Character Recognition (OCR) software, the speed of which is compatible with mail processing requirements. Note that although the examples in FIGS. 19, 20, 21 and 22 used the unique combinations of postage vendor ID, account number and piece count, one could alternately employ a postal authority assigned tracking number as the unique indexing identifier.

Thus, the use of smaller two-dimensional barcodes or the simpler one-dimensional barcodes or digital data reduces the footprint required on the mail piece, and leaves that much more room for addressing, advertising, etc. This reduction in data also reduces the load on high speed printers, which have difficulty placing custom, non-static barcode images on mail pieces without compromising their rated speed (often 10,000-30,000 pieces per hour). Standard text can be printed at full speed, and most high-speed printers have one-dimensional barcode software (e.g., Code 128) in the printer firmware. Therefore, use of an indexing identifier, rather than a full postage indicium, opens the IBIP market to mass mailers, which account for the bulk of USPS letter mail revenue. Not only will use of the indexing identifier reduce printing costs, it will also reduce capital expenditure costs for barcode reading hardware. If OCR readable data is used for the indexing identifier, OCR capabilities, which the USPS already has extensive experience, can be used.

With specific reference to FIG. 17, each centralized postage-issuing computer system 356 comprises data processing circuitry 820 (such as, e.g., a Central Processor Unit (CPU)) and a communications interface 822, which are similar to the same-named components of the previously described centralized postage-issuing computer system 305 and will thus not be described in further detail. The centralized postage-issuing computer system 356 further comprises a local memory 824, which is similar to the local memory 424 of the previously described centralized postage-issuing computer system 305, with the exception that it includes a set of postage dispensing modules 826 configured to index and store postage indicia, and transmit an indexing identifier, rather than the complete postage indicia, to the end user computers 358. The local memory 824 further includes, in addition to a customer database 828, postage database 830, and finance database 832, a postage indicia database 831 for storing the indexed postage indicia.

Specifically, the postage dispensing modules 826 include a communications module 834, database management module 836, indexing module 838, indexed identifier request validation module 840, and postage indicium generation module 842. The communications module 834 is configured for handling communications with the end user computers 358 over the communications links 364 (such as, e.g., receiving indexing identifier requests and transmitting indexing identifiers). The database management module 836 is configured for storing and retrieving pertinent information in and from the customer database 828, postage database 830, and finance database 832, as well as for storing and retrieving indexed postage indicia in and from the postage indicia database 831. The postage indicia can include, e.g., the postage amount, date and time the postage indicium was created, service class, optional data advance, delivery zip code, and tracking ID (if the mail piece is a tracked piece). The indexing identifier request validation module 840 is configured for validating indexing identifier requests received from the end user computer 358 by, e.g., validating the meter or account ID and account password in the indexing identifier request in relation to the same information contained in the customer database 828.

The postage indicium generation module 842, along with a corresponding private key 844, is configured for generating a self-validating postage indicium in response to each indexing identifier request received from the end user computer 358. In generating the self-validating postage indicium, the postage indicium generation module 842 comprises (1) a postage indicium generation submodule 846 for generating a postage indicium; (2) a digital signature generation submodule 848 for deriving a digital signature from the postage indicium using the private key 844; and (3) an association submodule 850 for associating the digital signature with the postage indicium to generate the self-validating postage indicium. In the illustrated embodiment, the self-validating postage indicium contains the same information as the postage indicium previously set forth in Table 2. The indexing module 838 is configured for associating the indexing identifier transmitted to the end user computer 358 with the postage indicium stored within the postage indicia database 831.

It is noted that the elimination of the digital signature on the mail piece itself does not compromise security, since the postage indicium stored in the postage indicia database 831 of the centralized postage-issuing computer system 356 is digitally signed in accordance with the USPS IBIP specifications. The presence of the digital signature somewhere in the security model addresses one major concern of the USPS—that fraud attacks are very likely to involve "insiders" employed by the postage vendor. To further ensure that the security system is impervious to even an insider attack, all security-critical operations such as indicium signing are actually accomplished within a Federal Information Processing Standard (FIPS-140/Level 4)-approved, physically secure coprocessor device (such as, e.g., an IBM 4758).

With specific reference to FIG. 18, the postage validation computer system 362 comprises data processing circuitry 880 (such as, e.g., a Central Processor Unit (CPU)), and communications interface 882, which are similar to the same-named components of the previously described centralized postage-issuing computer system 305 and will thus not be described in further detail. The postage validation computer system 362 further comprises postage scanning stations 884, include the software and hardware necessary for reading the indexed identifiers on each mail piece and displaying it in a human-readable format for postal verifiers. If the indexed identifiers are printed on the mail pieces in a two-dimensional or one-dimensional barcode format, the postage scanning stations will be equipped with barcode readers and accompanying software capable of reading these barcodes. If the indexed identifiers are printed on the mail pieces in a numerical data format, the postage scanning stations 884 will include OCR equipment. The postage validation computer system 362 further comprises a local memory 886, which is similar to the local memory 486 of the previously described central postage validation computer system 312, with the exception that it validates mail pieces using the postage indicia obtained from the centralized postage-issuing computer system 356, rather than postage indicia printed on the mail pieces.

The postage validation modules 888 include a communications module 892, database management module 893, postage indicia validation module 894, and postage indicia request module 895. The postage indicia request module 895 is configured for generating a request for postage indicium. In the illustrated embodiment, this request takes the form of a query stream (e.g., in Extensible Markup Language (XML) format), and contains the indexing identifier read from the mail piece and a password. The communications module 818 is configured for handling communications with the centralized postage-issuing computer system 356 over the communications link 368 (such as, e.g., transmitting postage indicium requests and receiving postage indicia in response thereto). The postage indicia validation module 894 is configured for validating the postage indicia obtained from the centralized postage-issuing computer system 356, and includes a public key association submodule 896, public keys 897, and digital signature verification submodule 898, which are similar to the same-named components in the previously described postage validation computer system 312, and will thus not be further described.

Figure 23:
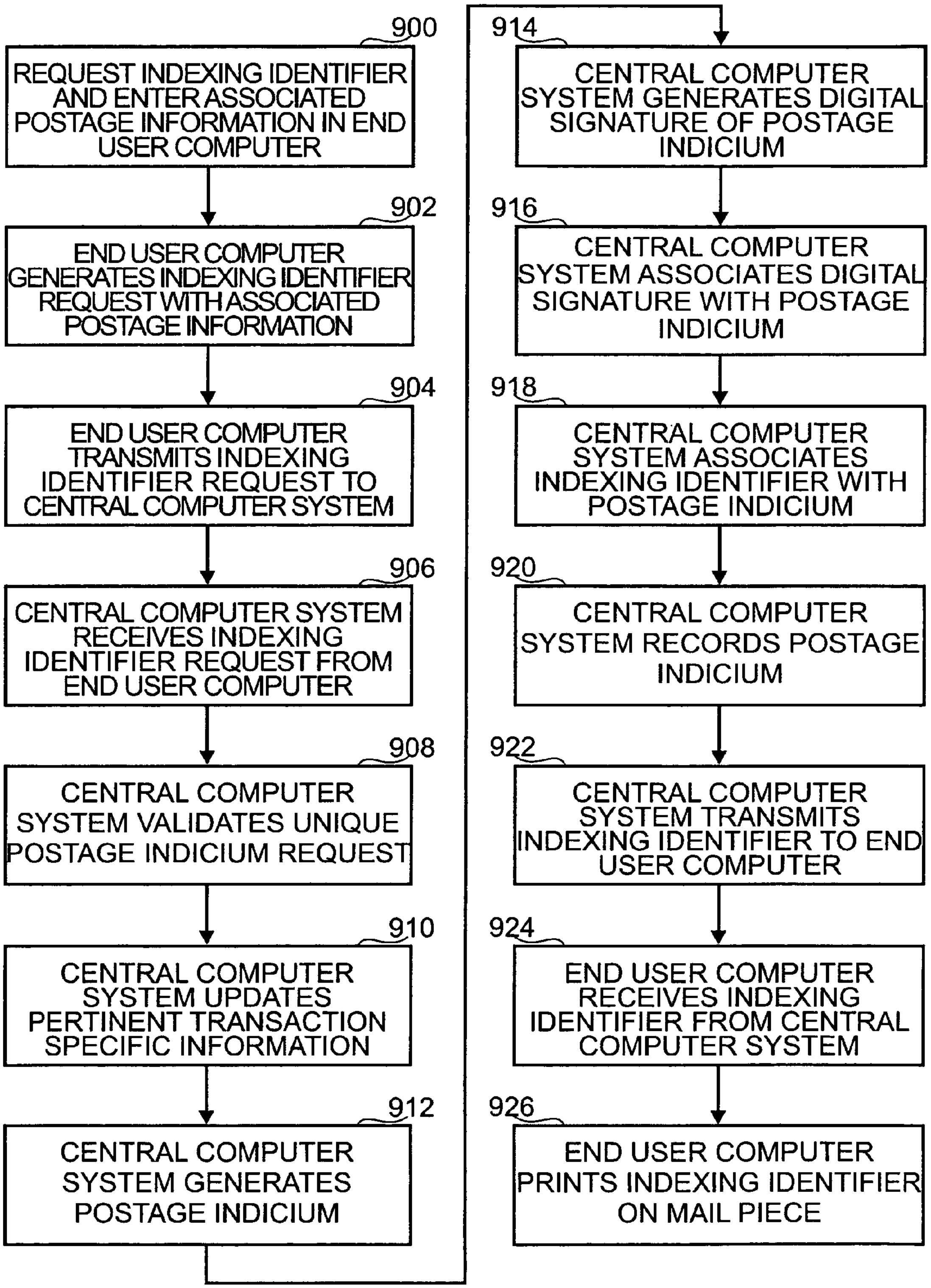
FIG. 23 is a flow diagram illustrating a procedure for indexing a postage indicium and applying an indexed identifier to a label.

Referring to specifically FIG. 23, and with general reference to FIGS. 15-17, the procedures for indexing a postage indicium and applying an indexed identifier to the label 201 will now be described. At steps 900-904, the end user computer 358 generates and transmits a indexing identifier to the centralized postage-issuing computer system 356. In particular, the end user operates the user interface 802 of the end user computer 804 to request an indexing identifier and enter postage information to be associated with the postage indicium (step 900). The indexing identifier request module 814 then generates an indexing identifier request with the associated postage information (step 902). The communications interface 810 then, under control of the communications module 818, transmits the indexing identifier request over the communications link 364 (step 904).

At steps 906-910, the centralized postage-issuing computer system 356 receives and validates the indexing identifier request from the end user computer 358, and records the postage information contained in the postage indicium request, as well as any other transaction specific pertinent information. In particular, the communications interface 822, under control of the communications module 834, receives the indexing identifier request over the communications link 364 (step 906). The indexing identifier request validation module 840 then validates the indexing identifier request by validating the user account ID and account password (step 908). If the user account ID or password does not correspond to an active user account, an error message is generated. The database management module 836 then updates the customer database 828 and postage database 830 with the pertinent transaction specific information (step 910).

At steps 912-916, the centralized postage-issuing computer system 356 then generates the self-validating unique postage indicium. Specifically, the postage indicium generation submodule 946 generates a postage indicium containing the items set forth in Table 2 (step 912). The digital signature generation submodule 848 then derives a digital signature from the postage indicium by applying the private key 844 thereto (step 914). The association submodule 850 then generates the self-validating postage indicium by associating the digital signature with the postage indicium (step 916).

At steps 918-922, the centralized postage-issuing computer system 356 then indexes and records the self-validating postage indicium, and transmits the indexing identifier to the end user computer 358. Specifically, the indexing module 838 indexes the self-validating postage indicium by associating the indexing identifier therewith (step 918). The database management module 836 then stores the indexed self-validating postage indicium in the postage indicia database 831 (step 920). The communications interface 822 then, under control of the communications module 834, transmits the indexing identifier over the communications link 314 (step 922).

At steps 924 and 926, the end user computer 554 receives the indexing identifier from the centralized postage-issuing computer system 356 and prints it on the label 201. In particular, the communications interface 810, under control of the communications module 818, receives the indexing identifier over the communications link 364 (step 924). The indexing identifier printing module 820, prompted by the end user via the user interface, then prints on the label 201 the two-dimensional barcode 256, either of the one-dimensional barcodes 258 or 260, or the alpha-numerical data 262 (step 926). The label 201 can then be applied to the appropriate mail piece.

Figure 24:
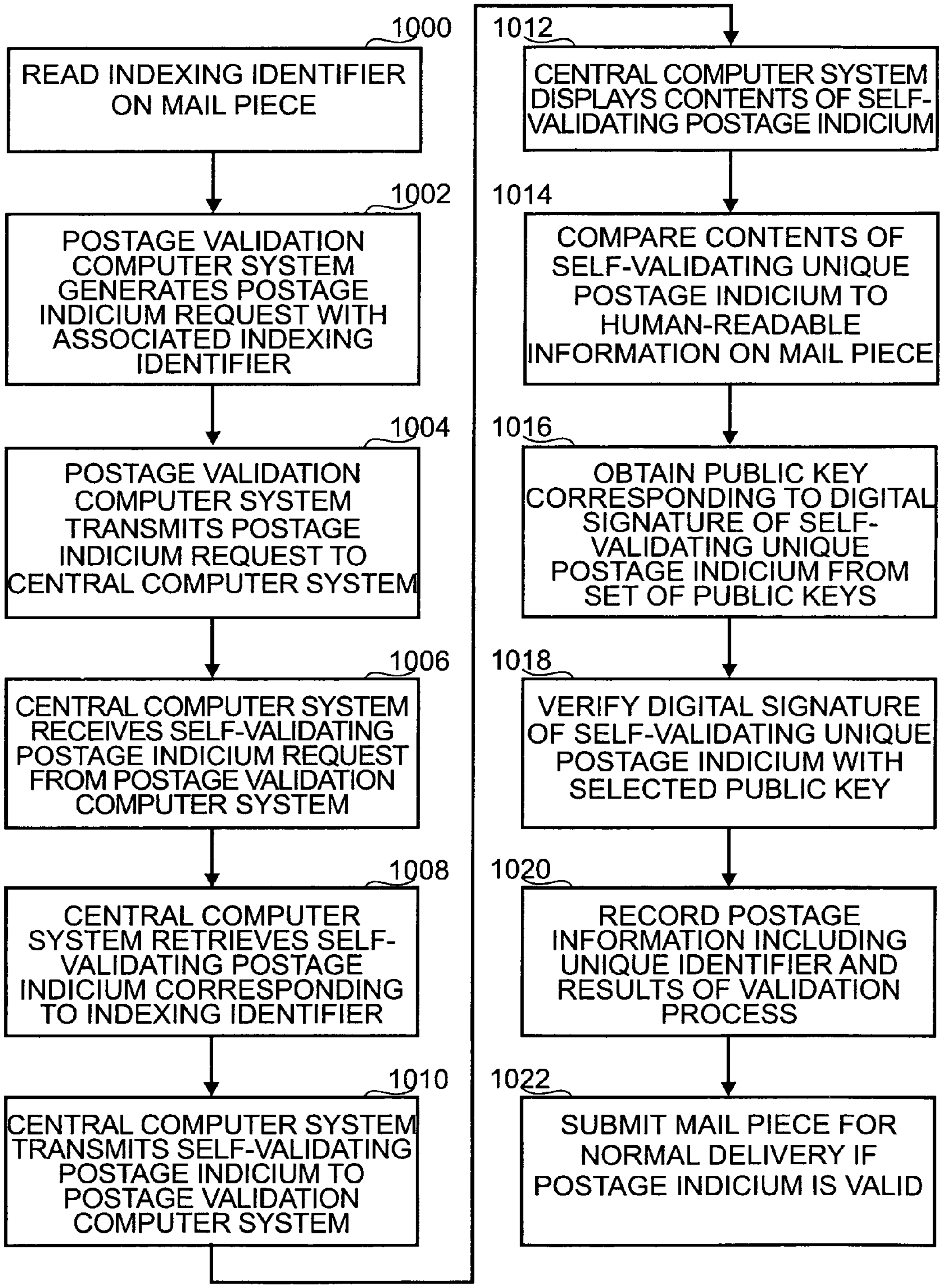
FIG. 24 is a flow diagram illustrating a procedure for validating the postage on a mail piece using the indexed identifier.

Referring to specifically FIG. 24, and with general reference to FIGS. 15, 17, and 18, the procedures for validating the postage on a mail piece using a non-stand-alone procedure will now be described. It should be noted that the order of the validation steps in the procedure is completely variable and will likely vary from implementation to implementation.

At step 1000, the postal verifier operates a postage scanning station 884 within the postage validation computer system 362 to read the indexing identifier (i.e., the two-dimensional barcode 256, one-dimensional codes 258 or 260, or alpha-numerical data 262) on the label 201 of the mail piece and display its contents to the verifier.

At steps 1002-1004, the postage validation computer system 362 requests from the centralized postage-issuing computer system 356 the self-validating postage indicium associated with the indexing identifier read from the mail piece. In particular, the postage indicia request module 895 generates a postage indicium request carrying the indexing identifier and the password (step 1002). The communications interface 882 then, under control of the communications module 892, transmits the postage indicium request over the communications link 368 (step 1004).

At steps 1004-1010, the centralized postage-issuing computer system 356 then receives the postage indicium request, and retrieves and transmits to the postage validation computer system 362 the self-validating postage indicium corresponding to the inspected mail piece. In particular, the communications interface 822, under control of the communications module 834, receives the postage indicium request over the communications link 368 (step 1006). The database management module 836 then retrieves from the postage indicia database 831 the self-validating postage indicium corresponding to the received indexing identifier (step 1008). The communications interface 822 then, under control of the communications module 834, transmits the self-validating postage indicium over the communications link 368 (step 1010).

At steps 1012 and 1014, the postage validation computer system 362 receives the self-validating postage indicium from the centralized postage-issuing computer system 356 and displays its contents to the postal verifier. In particular, the communications interface 882 then, under control of the communications module 892, receives the self-validating postage indicium from the centralized postage-issuing computer system 356 over the communications link 368 (step 1012), and the postage scanning station 884 displays its contents to the postal verifier (step 1012). At step 1014, the verifier then manually compares the contents of the self-validating postage indicium to the human-readable information (e.g., mailing date, postage amount, origin of mail piece, and destination of mail piece) on the mail piece. If the contents of the self-validating postage indicium do not match the human-readable information, this is an indication of likely fraudulent use of a postage indicium and is treated as such.

At steps 1016-1018, the postal verifier validates the postage indicium itself by operating the postage indicia validation module 894. In particular, the public key association submodule 896 obtains from the set of public keys 897 the public key corresponding to the Certificate Serial Number (item #3 in Table 2) within the postage indicium (step 1016). The digital signature verification submodule 898 then verifies the digital signature of the postage indicium to determine if they are consistent (step 1018). If the verification process returns a Boolean true, this indicates that the postage indicium was in fact generated by a secure central computer 356 for a mail piece of the same approximate weight, origin and destination as the mail piece being processed. If copy fraud is to be detected, a copy fraud detection process using unique identifiers or similar to the process disclosed with respect to FIG. 14 can be utilized.

After the postage has been validated or rejected, the database management module 893 stores the postage information, along with the results of the validation process (step 1020). If valid, the mail piece is then submitted for normal delivery processing (step 1022).

It should be noted that rather than have the postal verifier validate the postage indicium, the centralized postage-issuing computer system 356 itself can validate the postage indicium. In this case, the postage indicia validation module 894 will be located in the centralized postage-issuing computer system 356. Thus, after the centralized postage-issuing computer system 356 retrieves the self-validating postage indicium corresponding to the indexing identifier at step 1008, it will validate the postage indicium itself using a corresponding public key. If it is valid, the centralized postage-issuing computer system 356 will transmit a Boolean true, along with the already validated postage indicium, to the postage validation computer system 362, which will then perform postage validation steps 1014, 1016, 1018, and 1020. If it is invalid, the centralized postage-issuing computer system 356 will transmit a Boolean false to the postage validation computer system 362, which will then store the results of the validation process as being invalid at step 1020.

Figure 34:
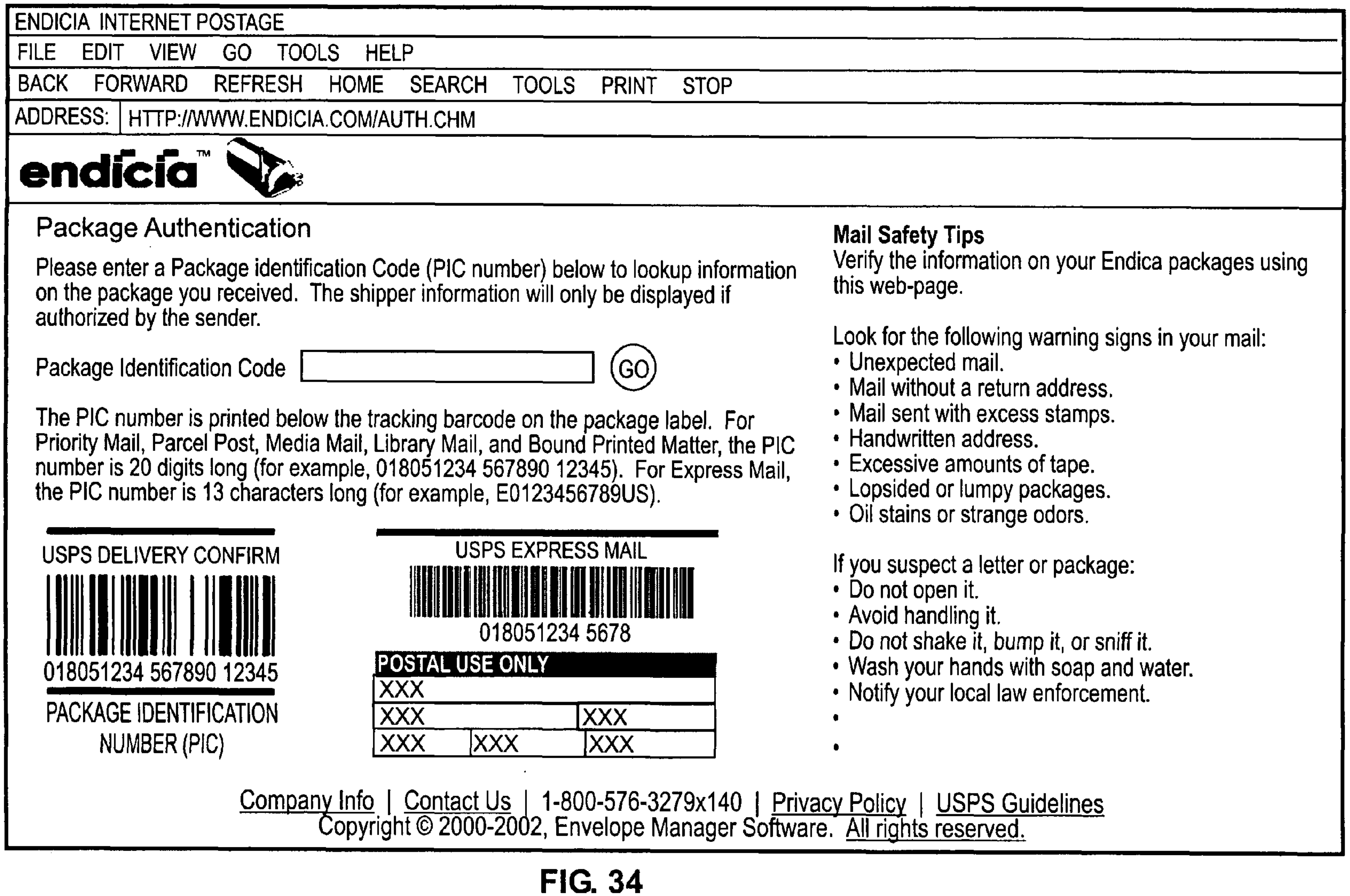
FIG. 34 is a depiction of a display prompting a mail recipient to enter a tracking ID as a sender identification request.
Figure 35:
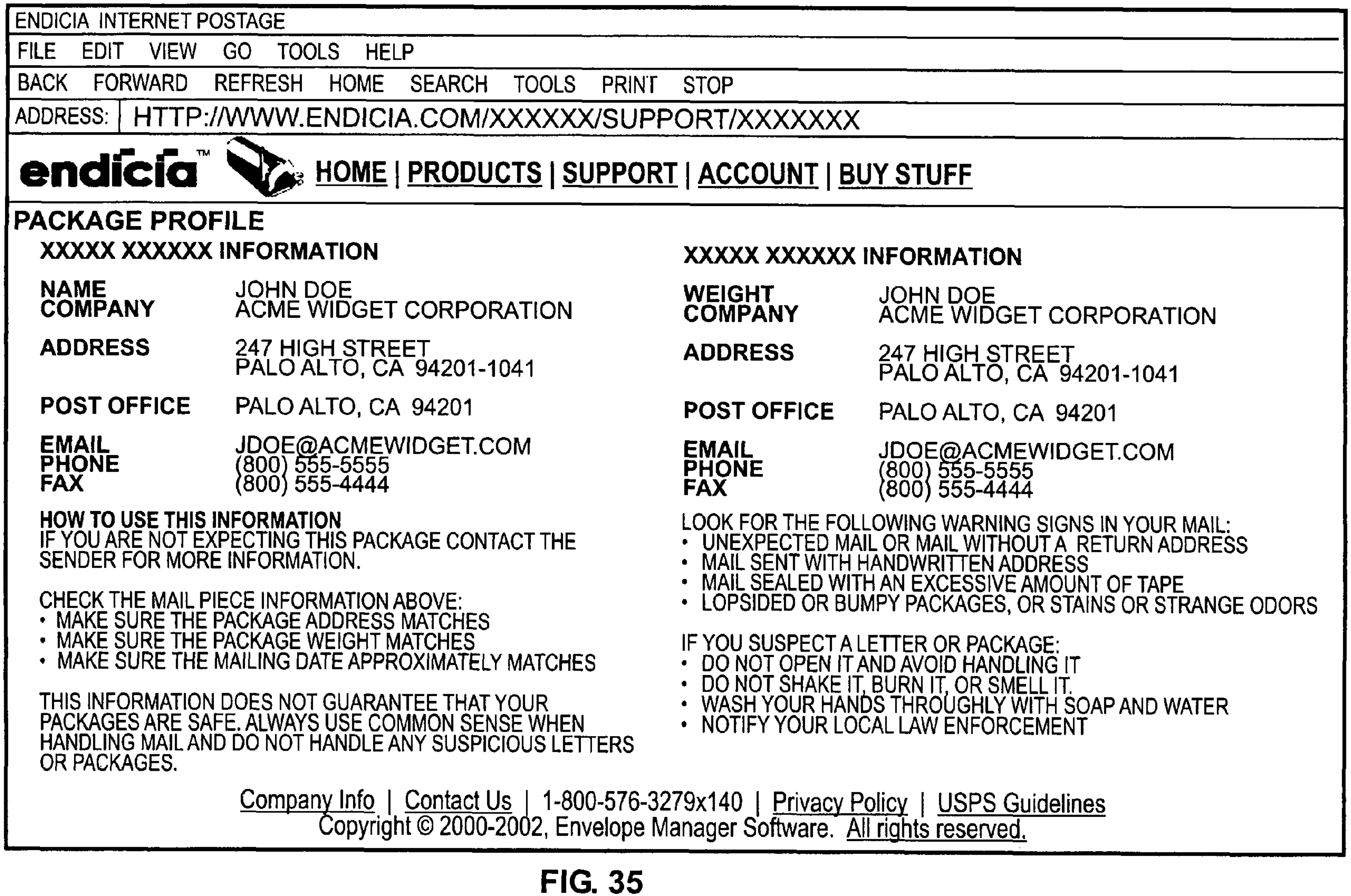
FIG. 35 is a depiction of a display showing sender identification information.
Figure 36:
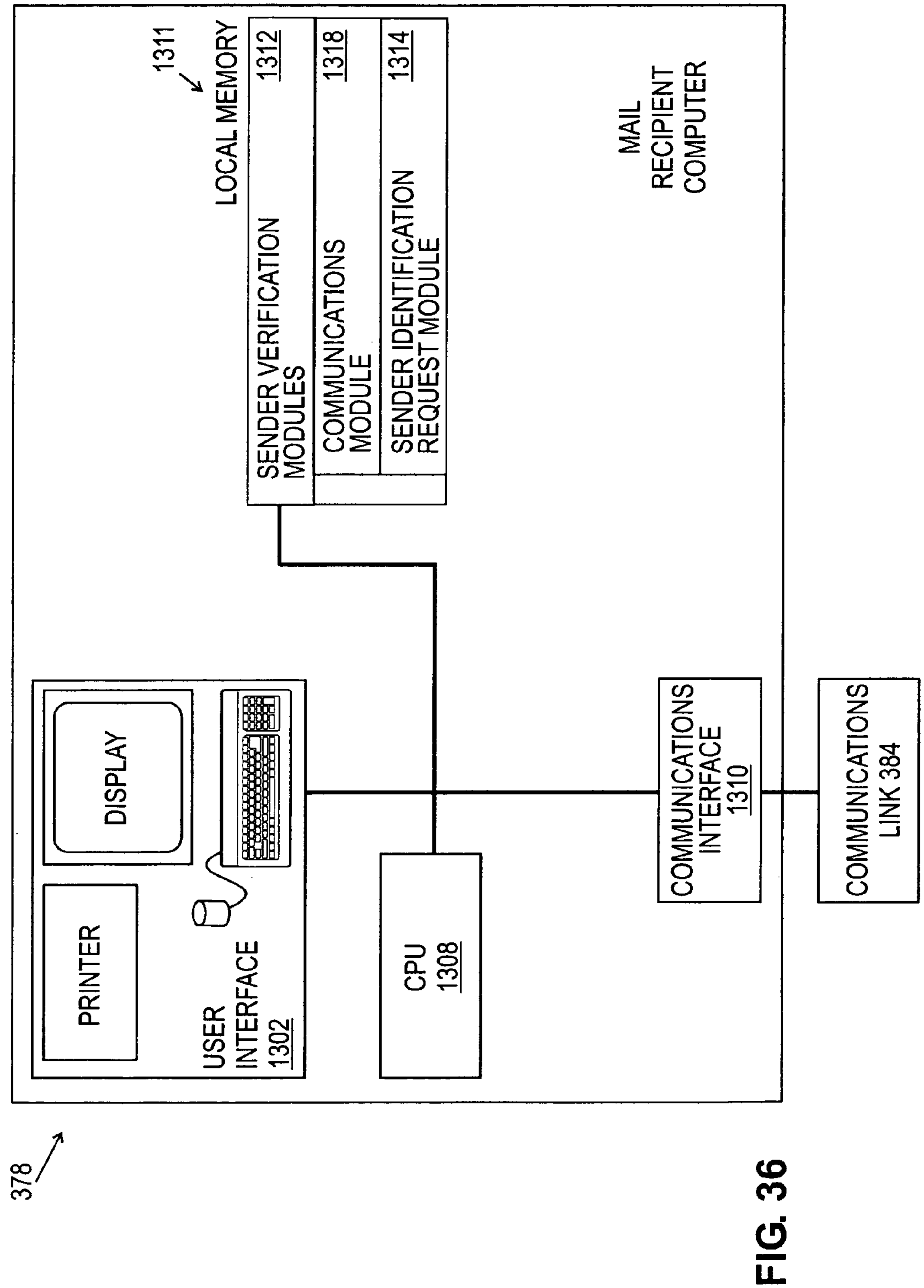
FIG. 36 is a depiction of a mail recipient computer for displaying the information of FIGS. 34 and 35.

The use of an tracking ID as an indexing identifier not only allows the postal service to validate the postage on mail pieces that bear the tracking ID, it provides the recipient of the mail piece a means for verifying that the mail piece was sent from a trusted individual. Referring to FIGS. 34 and 35, a means is provided for allowing a mail recipient to enter a tracking number (FIG. 34) and obtaining identification information concerning the sender of the mail piece bearing the tracking number (such as, e.g., the name of the sender, employer of sender, if applicable, and the address and zip code of the sender) and related postage information (such as, e.g., the date the mail piece was sent, the weight of the mail piece, mail class, etc.) (FIG. 35). The centralized postage-issuing computer system 356 illustrated in FIG. 17, and a mail recipient computer 378 illustrated in FIG. 36 are used to perform this process.

The centralized postage-issuing computer 356 is configured in the same manner as previously described, but now optionally stores information relating to the sender of the mail piece. This can be stored in the postage database 830 or elsewhere. In reality, as a matter of course, the sender information is routinely stored in the centralized postage-issuing computer 356, as well as transmitted to the USPS, when the sender obtains an account with the postage vendor. Thus, these "meter holders" are known to the postage vendor and the USPS, and can be considered to be trusted individuals or entities.

Importantly, this sender identification information, along with postage information, can be easily retrieved by the centralized postage-issuing computer 356 upon receipt of the indexing identifier, and specifically, an associated tracking ID. With specific reference to FIG. 36, the mail recipient computer 378 is similar to previously described end user computers in that it contains conventional computer hardware, including a user interface 1302, data processing circuitry 1308 (such as, e.g., a Central Processor Unit (CPU)) for executing programs, a communications interface 1310 (such as, e.g., a modem, LAN connection, or Internet connection) for handling communications with the centralized postage-issuing computer system 356 over a communications link 384, and local memory 1311. The user interface 1302 is configured to allow the mail recipient to request sender and related postage information. The local memory 1311, which will typically include both random access memory and non-volatile disk storage, stores a set of sender verification procedures that are embodied in software modules 1312, which includes a sender identification request module 1314 and a communications module 1318.

The sender identification request module 1314 is configured for generating a request for sender identification information, along with associated postage information. In the illustrated embodiment, this request takes the form of a query stream (e.g., in Extensible Markup Language (XML) format), and contains the unique tracking ID printed on the received mail piece. The communications module 1318 is configured for handling communications with the centralized postage-issuing computer system 356 over the communications link 384 (such as, e.g., transmitting sender identification requests and receiving sender identification information and associated postage information in response thereto).

Figure 37:
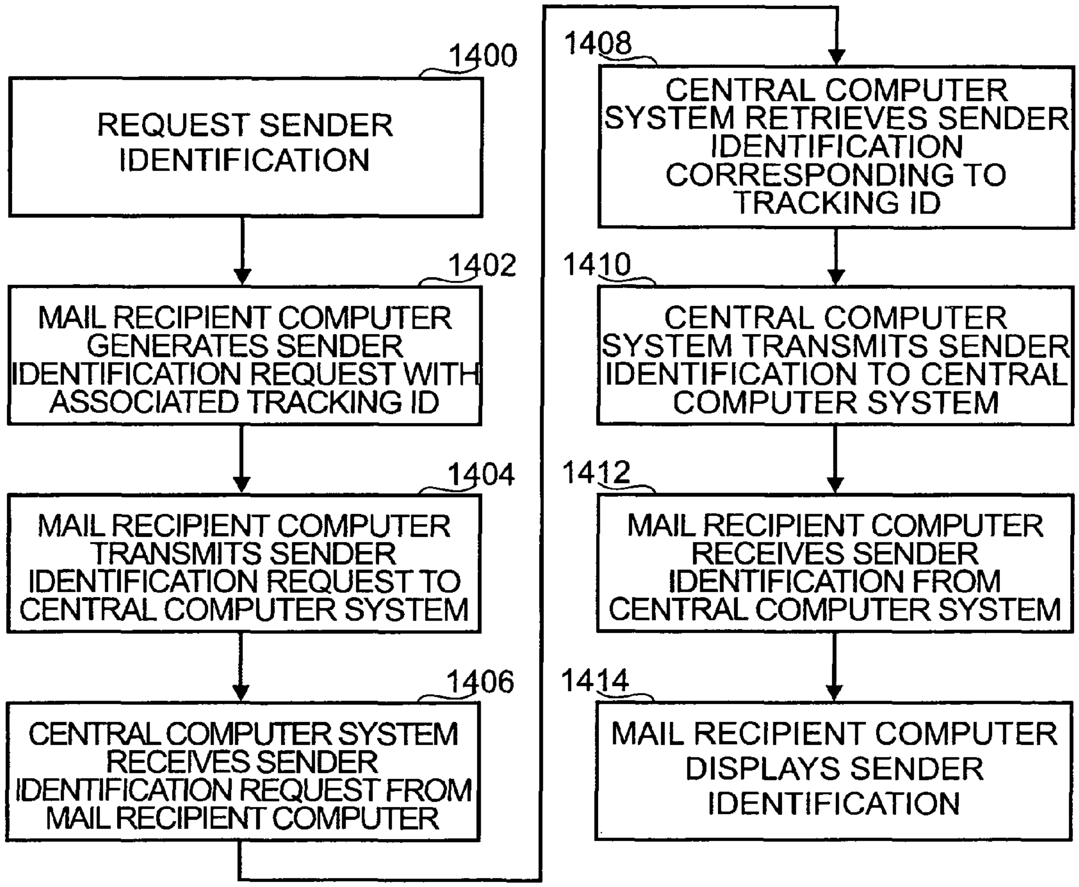
FIG. 37 is a flow diagram illustrating a procedure for verifying a sender of a received mail piece.

Referring to FIG. 37, and with general reference to FIGS. 34-36, the procedures for verifying the sender of a mail piece will now be described. It is assumed that the tracking ID (as the indexing identifier) and sender identification information, along with the postage information, has already been recorded in the centralized postage-issuing computer system 356, and specifically the postage database 830, when the tracking number and postage was issued to the end user (presumably, the sender of the mail piece). At steps 1400-1404, the mail recipient computer 378 generates and transmits a request for sender identification information to the centralized postage-issuing computer system 356 by entering the tracking ID printed on the received mail piece into the user interface 1302, which displays a window similar to the one illustrated in FIG. 34. The sender identification request module 1314 then generates a sender identification request with the associated tracking ID (step 1402). The communications interface 1310 then, under control of the communications module 1318, transmits the sender identification request over the communications link 384 (step 1404).

At steps 1406-1410, the centralized postage-issuing computer system 356 then receives the sender identification request, and retrieves and transmits to the mail recipient computer 378 the sender identification information and associated postage information corresponding to the received mail piece. In particular, the communications interface 822, under control of the communications module 834, receives the sender identification request over the communications link 384 (step 1406). The database management module 836 then retrieves from the postage database 830 the sender identification information and associated postage information corresponding to the received tracking ID (step 1408). The communications interface 822 then, under control of the communications module 834, transmits the sender identification information with the associated postage information over the communications link 384 (step 1410).

At steps 1412 and 1414, the mail recipient computer 378 receives the sender identification information and associated postage information from the centralized postage-issuing computer system 356 and displays it to the mail recipient. In particular, the communications interface 1302 then, under control of the communications module 1318, receives the sender identification information and associated postage information from the centralized postage-issuing computer system 356 over the communications link 384 (step 1412), and the user interface 1302 displays this information to the mail recipient (step 1414), and specifically in a window similar to that illustrated in FIG. 35. Thus, the mail recipient can determine from this whether the sender is a trusted entity, e.g., if the mail recipient is familiar with the displayed name of the sender. It should be noted that the fact that the centralized postage-issuing computer system 356 was capable of retrieving and transmitting the sender identification information to the mail recipient computer 378 for display thereon is a strong indication that the sender is a trusted entity, since individuals or entities that maintain accounts with the postage vendor can typically be considered to be trusted. An insidious individual bent on wreaking havoc through the postal system would typically not maintain a trackable account with a postage vendor.

The use of a tracking ID in the postage indicium or as an indexing identifier not only facilitates the postal service in detecting postage fraud and protecting package recipients from insidious individuals, but also facilitates the postal service in issuing refunds for unused postage. Consider a misprint scenario where an end user attempts to print an Express Mail label and the printing process fails in some way even though the postage was issued. The end user still wants to ship the package, so he/she will take corrective measures and print a second Express Mail label. The second label will have the identical destination address (in particular the same ZIP+4+2 zip code, the same postage amount, but a different tracking ID, which is issued on a per-print basis. This scenario creates a database structure that conceptually holds the information set forth in Table 3 below.

TABLE 3

Express Mail Label Misprint Scenario

| Date/ Time | Account | ZIP + 4 + 2 | Service Class | Postage | Weight | Piece Count | Tracking Number | Delivery Status |
|---|---|---|---|---|---|---|---|---|
| 9/9/01: 15:16:01 | 500318 | 94301104147 | Express | 22:34 | 4 | 2445 | 330343434334 | Submitted |
| 9/9/01: 15:19:01 | 500318 | 94301104147 | Express | 22:34 | 4 | 2446 | 330343456301 | Delivered |

A digital signature protects the integrity of the information in the database. It should be noted that the data set forth in Table 3 alone is strongly suggestive of a misprint scenario. But a much stronger case can be made several days later, when the tracking ID's can be statused against the postal authority's (e.g., USPS) tracking system using a simple Internet transaction. If the end user never mailed a package with the first label (tracking ID 330343434334), it will never achieve a status of "delivered." On the other hand, one should see a "delivered" status on the second transaction if one waits a sufficient amount of time (e.g., 2-10 days).

Figure 25:
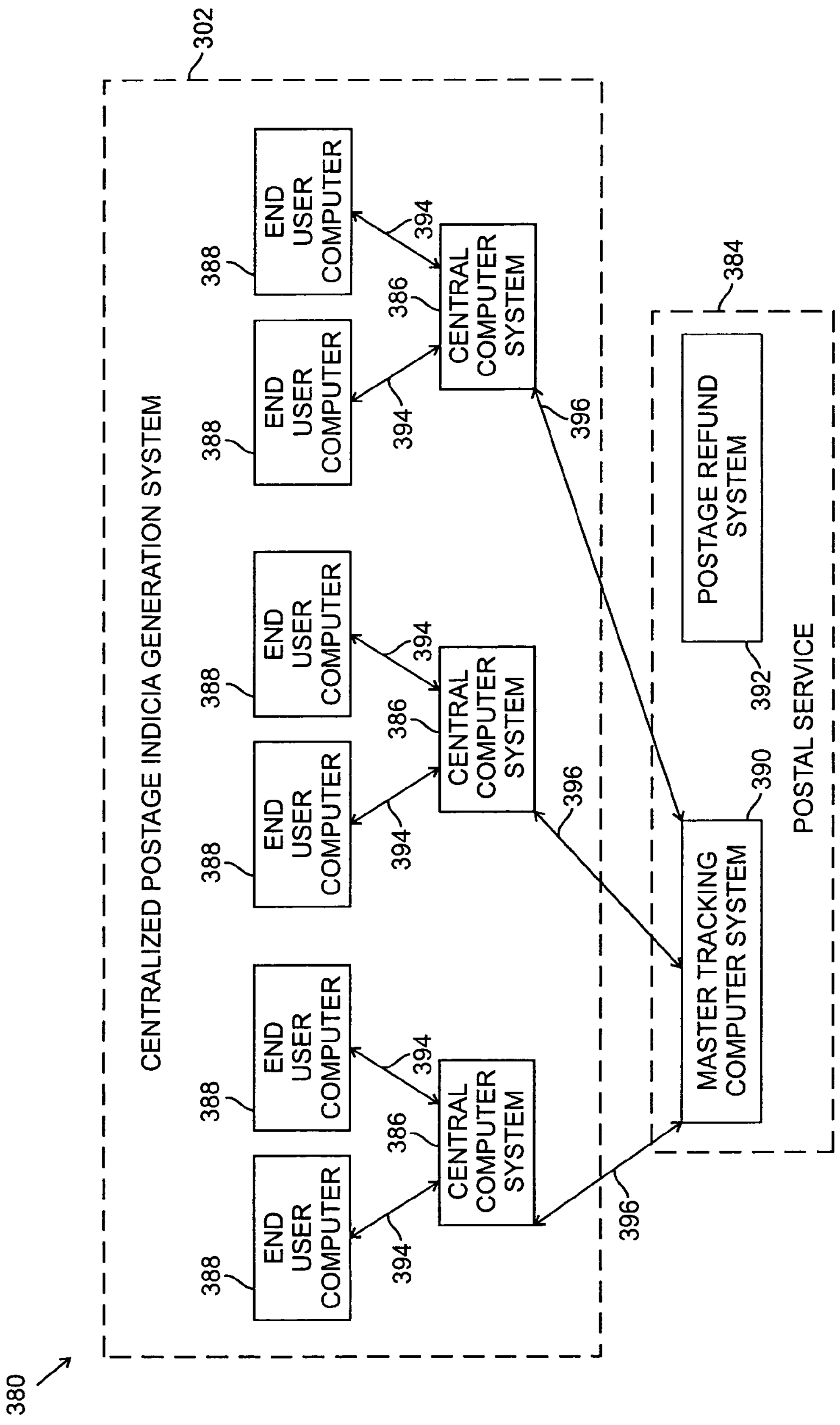
FIG. 25 is a block diagram of a third postal system constructed in accordance with the present inventions, wherein the third postal system utilizes a tracking ID to facilitate refunding of unused postage.

With reference to FIG. 25, a postage system 380 comprises a centralized postage indicia generation system 382, which includes a multitude of centralized postage-issuing computer systems 386, each of which includes a multitude of end user computers 388. The postage system 380 also generally comprises a postal service 384, which includes a master tracking computer system 390 and a postage refund center 392. The centralized postage-issuing computer system 386, end user computer 388, and master tracking computer system 390 communicate with each other over communications links 394 and 396 (such as, e.g., LAN, Internet, or telephone network).

These components are generally similar to the same-named components of the postage system 300, but differ somewhat in that it provides a means for providing refunds for unused postage. In this embodiment, in response to postage refund inquiries from an account administrator, each centralized postage-issuing computer system 386 retrieves previously stored postage transaction information, which contains, for each postage transaction, a tracking ID and an associated delivery status. The centralized postage-issuing computer system 386 filters the retrieved postage transaction information for pertinent refund information, and displays it to the account administrator who determines whether there is unused postage to be refunded. The delivery status within the stored postage transaction information is updated by the master tracking computer system 390.

Figure 26:
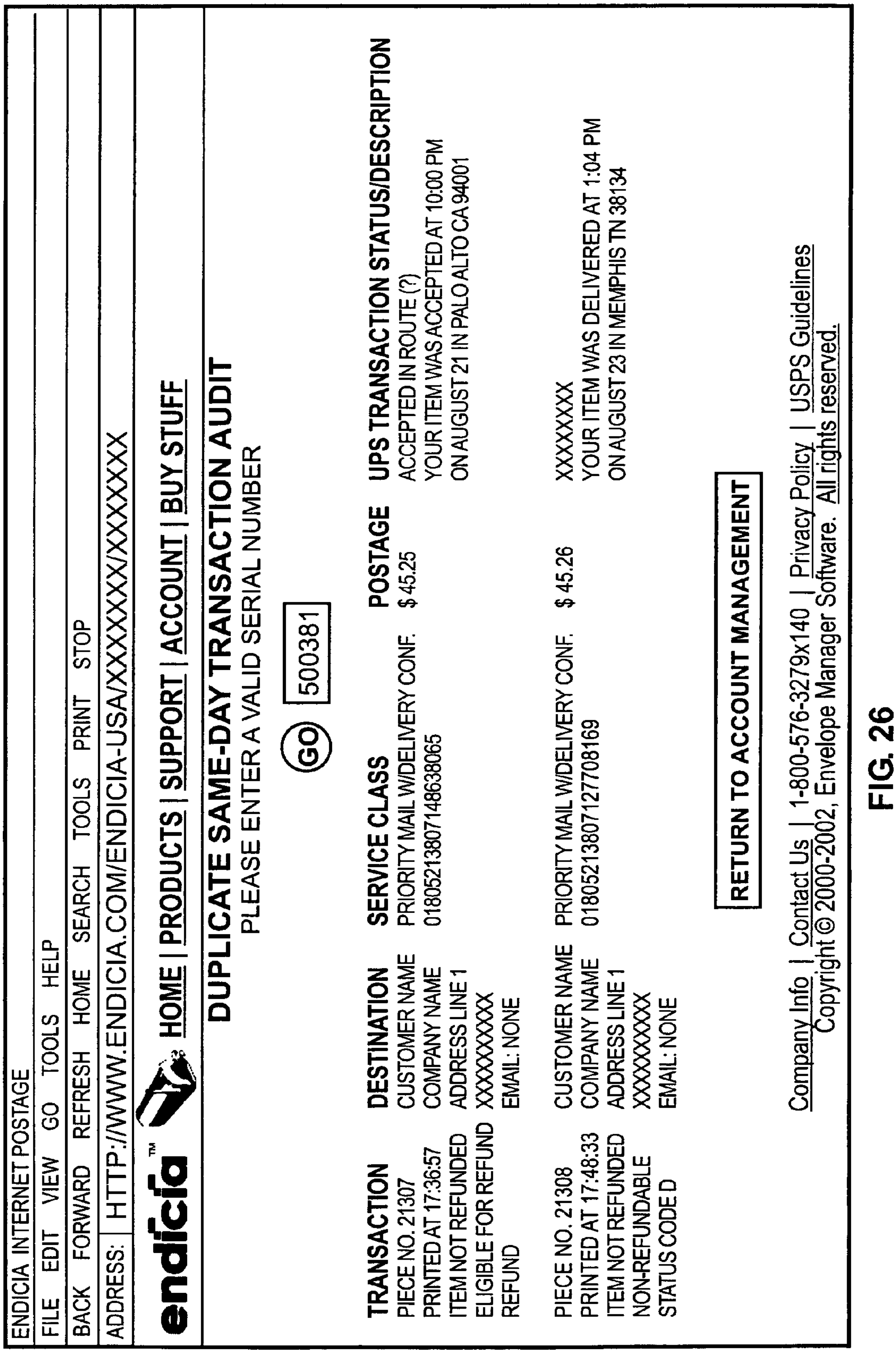
FIG. 26 is a depiction of a display showing the results of a refund eligible inquiry performed in the third postal system of FIG. 25.

The refund inquiry can take a variety of formats. For example, a refund eligible inquiry can reveal postage transaction information that meets the following criteria: (1) two or more transactions; (2) none of the transactions have ever been refunded in the past; (3) issued for the same account; (4) issued on the same day; (5) issued to the same destination; (6) issued for the same service class; (7) issued for the same postage amount; and (8) each transaction has an associated unique tracking ID. FIG. 26 illustrates exemplary results of a refund eligible inquiry. As can been seen, the display information meets the afore-described criteria. The account administrator can simply select the refund option and the following steps will occur automatically: (1) the end user's account will be credited for the misprint; (2) the misprint postage transaction information will be date/time stamped in the postage database and flagged as "refunded"; (3) a refund request is issued to postage refund center 392; and (4) the refunded postage transaction is entered into a statusing database, so that the delivery status can be checked for six months.

It should be noted that the date of this query is Aug. 23, 2001, and the postage transactions in question were completed three days earlier. The USPS delivery status for the first package presents the phrase "Your item was accepted at 10 pm on August 21 in Palo Alto, Calif. 94301. This phrase is misleading in that it infers that the USPS actually took possession of this package. In reality, it only indicates the date/time in which the tracking information was posted to the master tracking computer system. When this message persists for days or weeks, one must conclude that the tracking ID was indeed issued, but the package never entered the postal system. As another example, an audit inquiry can reveal all postage transaction information in a specific user account.

This process provides a complete audit trail even through there is no mail piece specimen. The process not only has utility for misprint scenarios that do not produce a scannable specimen, but it can also be used for misprints that do produce a scannable specimen. Normally, the specimen must be mailed to the postage vendor, which involves an additional mailing expense for the end user, as well as an additional effort for both end user and postage vendor. This process would allow end users to simply destroy misprint specimens if they met the refund criteria listed above. In essence, the evidence supporting the refund is electronic and not paper-based.

It should be noted that the entire process is enabled by the confluence of the centralized postage system concept and the unique tracking ID. Mail pieces devoid of a unique tracking ID would not be eligible for this refund process, nor would mail pieces created by postage metering technologies, which are not centralized (e.g., conventional postage meters or PC-postage meters that draw upon a local "vault" of funds to create postage indicia).

Means can also be provided to automatically poll the delivery status of a "refunded" mail piece after the refund is processed. This process will continue for a period of several months. If the master tracking computer system suddenly shows a change in delivery status for that refunded mail piece, an automated alert is forwarded to the postal authorities and an investigation can be launched.

Figure 27:
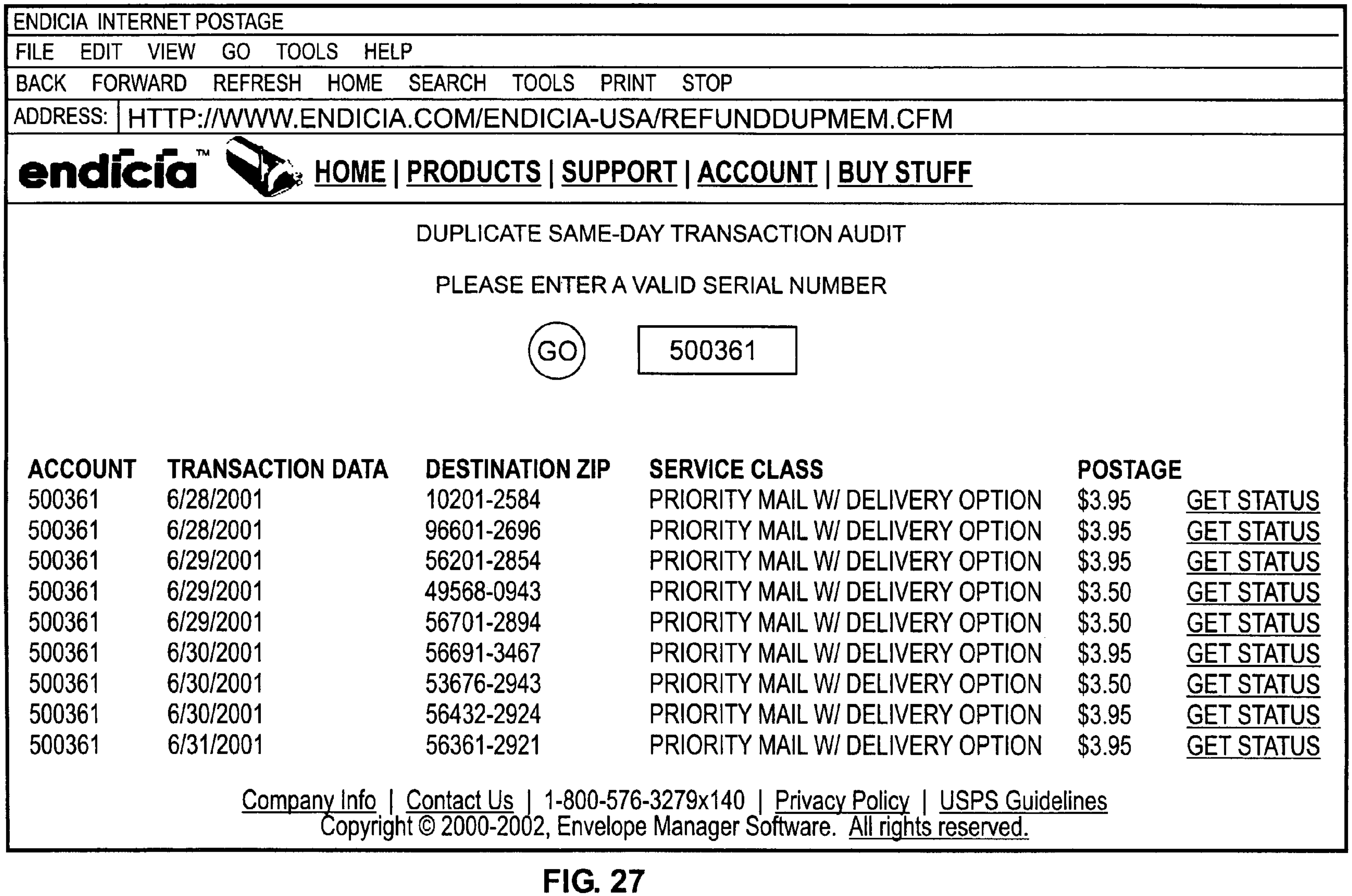
FIG. 27 is a depiction of a display showing the results of an audit review performed in the third postal system of FIG. 25.
Figure 28:
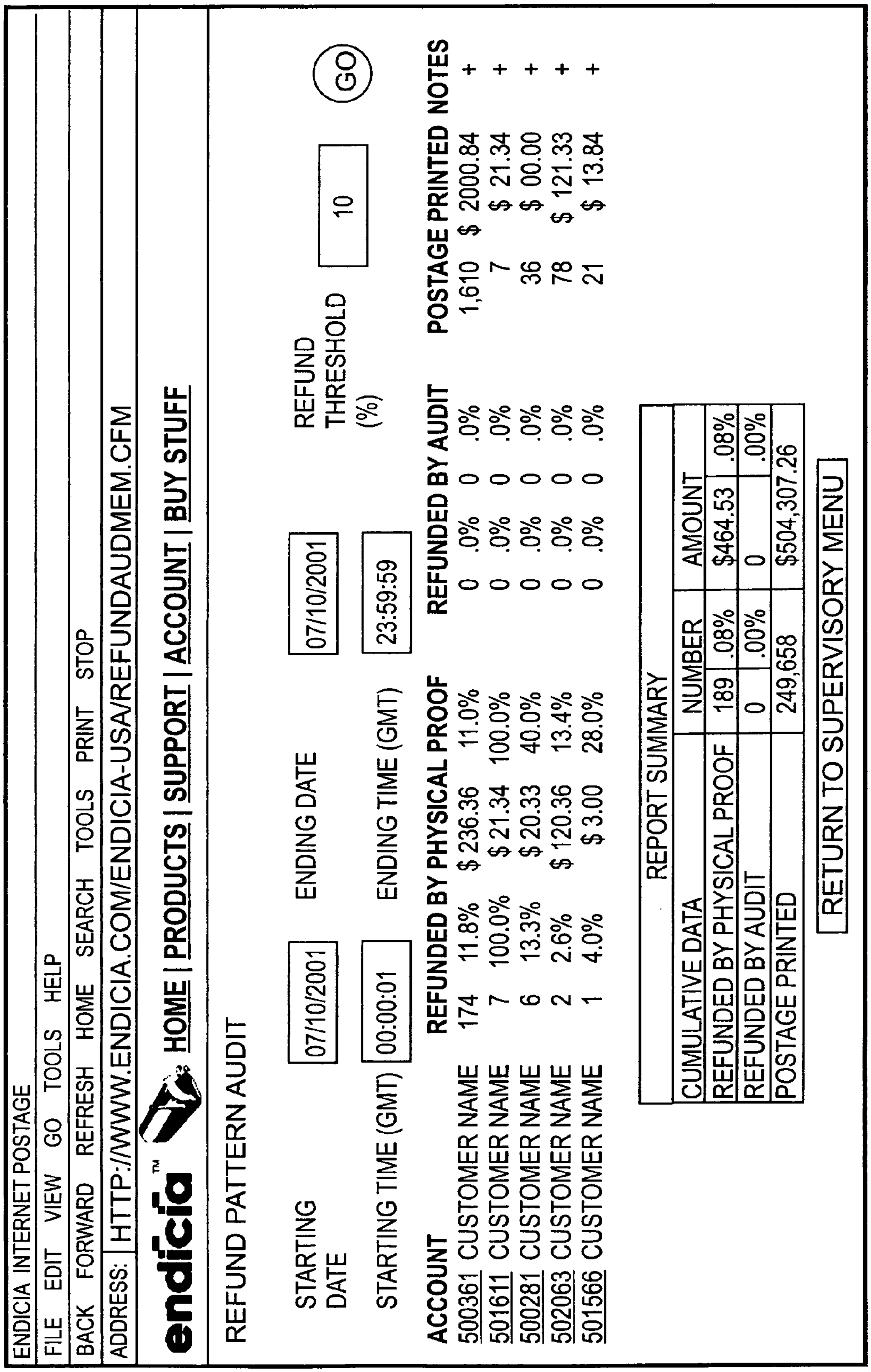
FIG. 28 is a depiction of a display showing the results of a refund pattern audit performed in the third postal system of FIG. 25.

A refund inquiry can also be in the form of an audit review of all postage transactions in a user account. FIG. 27 illustrates exemplary results of an audit review. The account administrator can review the list of postage transactions for duplicate postage transactions. Once a duplicate postage transaction is suspected, the account administrator can click "Get Status" to determine if the mail piece associated with either of the duplicate postage transactions has been delivered. A refund inquiry can also be in the form of a refund pattern audit. FIG. 28 illustrates exemplary results of a refund pattern audit performed on the customers of a particular postage vendor. As can be seen, the account administrator can determine the refund percentage (by piece and total postage amount) of each customer.

Figure 29:
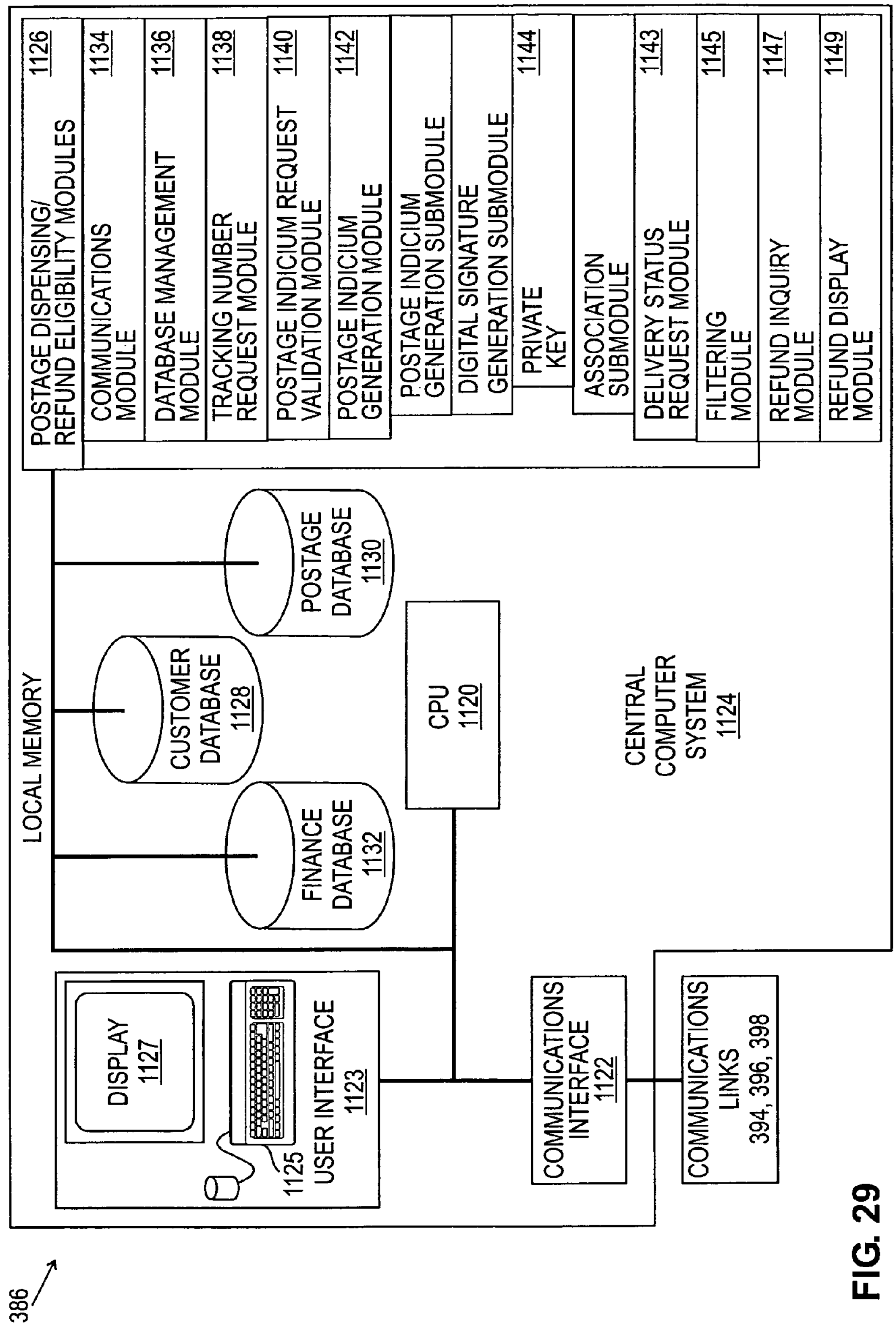
FIG. 29 is a block diagram of a centralized postage-issuing computer system used in the third postal system of FIG. 25.
Figure 30:
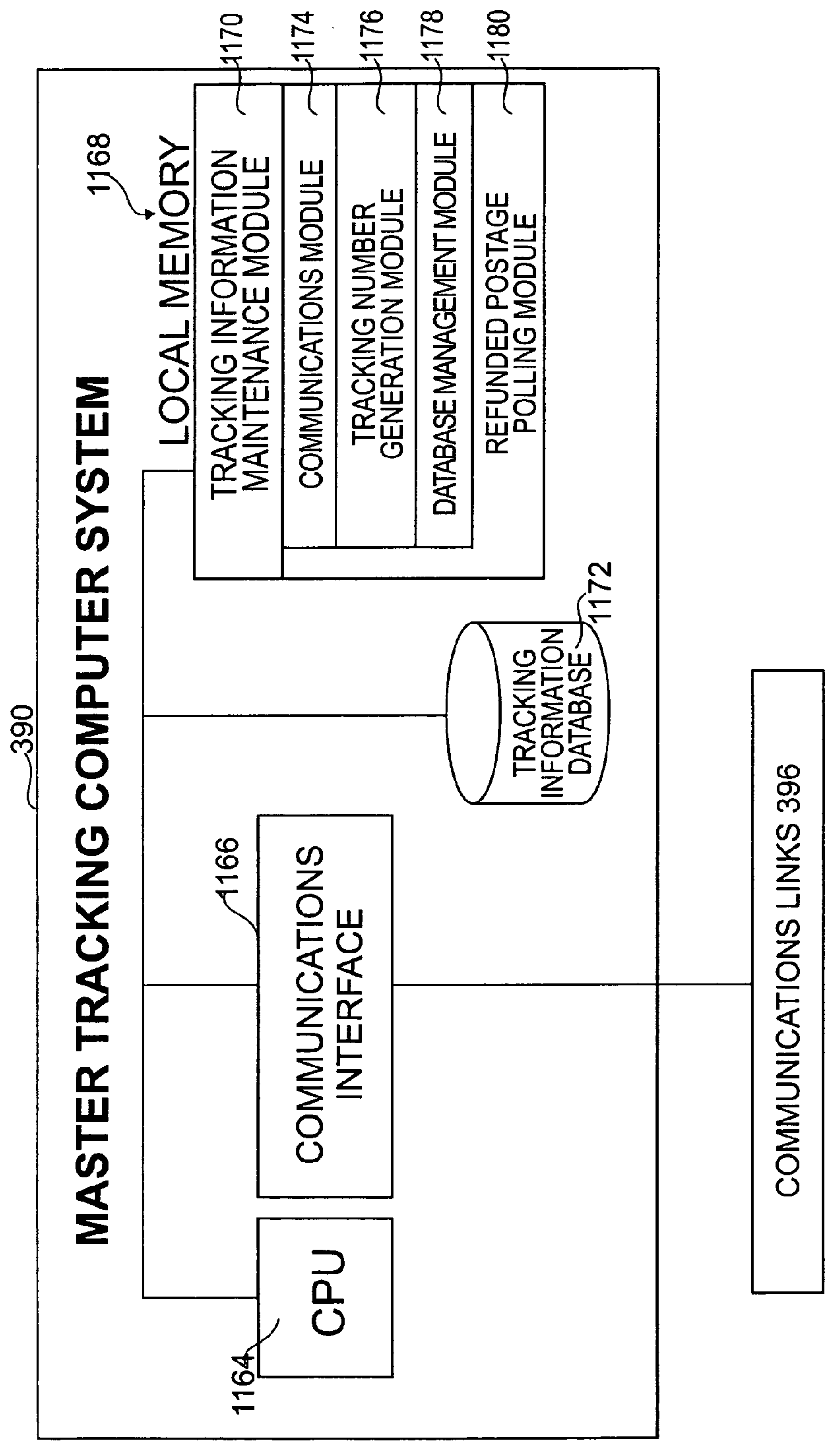
FIG. 30 is a block diagram of a master tracking computer system used in the third postal system of FIG. 25.

Turning now to FIGS. 29 and 30, the structural details of the postage system 380 will now be described. Each end user computer 388 is similar to the previously described end user computer 308 illustrated in FIG. 4, and will thus not be described in further detail here. With specific reference to FIG. 29, each centralized postage-issuing computer system 386 comprises data processing circuitry 1120 (such as, e.g., a Central Processor Unit (CPU)) and a communications interface 1122, which are similar to the same-named components of the previously described centralized postage-issuing computer system 305 and will thus not be described in further detail. The centralized postage-issuing computer system 386 further comprises a local memory 1124, which is similar to the local memory 424 of the previously described centralized postage-issuing computer system 305, with the exception that it includes postage dispensing/refund eligibility modules 1126 that are configured to additionally store and retrieve postage transaction information that includes a tracking ID and an associated delivery status for that tracking ID. The local memory 1124 further includes, in addition to a customer database 1128 and a finance database 1132, a postage database 1130 for storing the tracking ID and associated delivery status in addition to other postage information previously described with respect to the postage database 430. The centralized postage-issuing computer system 386 further comprises a user interface 1123, which includes a keyboard 1125 and a display 1127, which as will be described below, allows the account administrator to issue a refund inquiry.

Specifically, the postage dispensing/refund eligibility modules 1126 include a communications module 1134, database management module 1136, tracking ID request module 1138, postage indicium request validation module 1140, postage indicium generation module 1142, delivery status request module 1143, filtering module 1145, refund inquiry module 1147, and refund display module 1149. The delivery status request module 1143 is configured for generating a request for the delivery status for each tracking ID stored in the postage database 1130. The filtering module 1145 is configured for variously generating refund information by filtering and formatting the postage transaction information retrieved from the postage database 1130, as will be described in further detail below. In addition to being configured for providing the communications previously described with respect to the communications module 434, the communications module 1134 is configured for transmitting delivery status requests to, and receiving confirmatory delivery status information from, the master tracking computer system 390 over the communications link 396.

The database management module 1136 is configured for storing and retrieving pertinent information in and from the customer database 1128, postage database 1130, and finance database 1132. This function includes storing and retrieving a tracking ID and an associated delivery status, and updating that associated delivery status with confirmatory delivery status information received from the master tracking computer system 390. As will be described in further detail, the confirmatory delivery status information indicates whether a mail piece carrying a tracking ID has, in fact, been delivered. The refund inquiry module 1147 is configured for generating an inquiry for postage refund information. In the illustrated embodiment, the inquiry contains a user account ID and password and the refund inquiry, which as previously discussed, can include various types. The refund display module 1149 is configured for displaying on the display 1127 the postage refund information filtered by the filtering module 1145.

The tracking ID request module 1138, postage indicium request validation module 1140, and postage indicium generation module 1142 (and corresponding private key 1144) are configured to perform the same functions described with respect to the tracking ID request module 438, postage indicium request validation module 440, and postage indicium generation module 442 (and corresponding private key 444), and will thus not be described in further detail.

Alternatively, a centralized postage-issuing computer system, in combination with the refund inquiry functionality, can be constructed similarly to the centralized postage-issuing computer system 307, wherein tracking ID's are issued to end user computers by the centralized postage-issuing computer system from a pool of pre-stored unassigned tracking ID's, or even more alternatively, wherein no tracking ID issuing functionality, in which case, the master tracking computer system directly issues tracking ID's to the end user computer. A centralized postage-issuing computer system, in combination with the refund inquiry functionality, can be constructed similarly to the centralized postage-issuing computer system 356, wherein self-validating postage indicia are stored in the centralized postage-issuing computer system and indexing identifiers are transmitted to the end user computers.

Referring specifically to FIG. 30, the master tracking computer system 390 comprises data processing circuitry 1164 (such as, e.g., a Central Processor Unit (CPU)) and a communications interface 1166, which are similar to the same-named components of the previously described master tracking computer system 310 and will thus not be described in further detail. The master tracking computer system 390 further comprises a local memory 1168, which is similar to the local memory 468 of the previously described master tracking computer system 310, with the exception that it includes tracking information maintenance modules 1170 that, in addition to generating and maintaining unique tracking ID's, keep track of the delivery status of the mail pieces carrying these tracking ID's. The local memory 468 further includes a tracking information database 1172, which stores unique tracking ID's and postage information, including the delivery status associated with the tracking ID's.

The tracking information maintenance modules 1170 include a communications module 1174, tracking ID allocation module 1176, database management module 1178, and refunded postage polling module 1180. In addition to being configured for providing the communications previously described with respect to the communications module 474, the communications module 1174 receives delivery status requests from, and transmits confirmatory delivery status information to, each centralized postage-issuing computer system 386 over the communications links 396. The confirmatory delivery status information is obtained from tracking stations (not shown), which scan tracked mail pieces when they are delivered. The tracking ID allocation module 1176 is configured for performing the same functions as the tracking ED allocation module 476 previously described in the master tracking computer system 310. The database management module 1178 is configured for storing and retrieving assigned tracking ID's and associated postage information (including delivery status) to and from the tracking information database 1172. The database management module 1178 is further configured for updating the tracking information database 1172 with refund information. That is, if a specific postage transaction has been refunded, the database management module 1178 will associate a refund indicator with the postage information relating to the specific postage transaction. The refunded postage polling module 1180 periodically polls the tracking information database 1172 to determine if a mail piece associated with any refunded postage transaction has been delivered.

Figure 31:
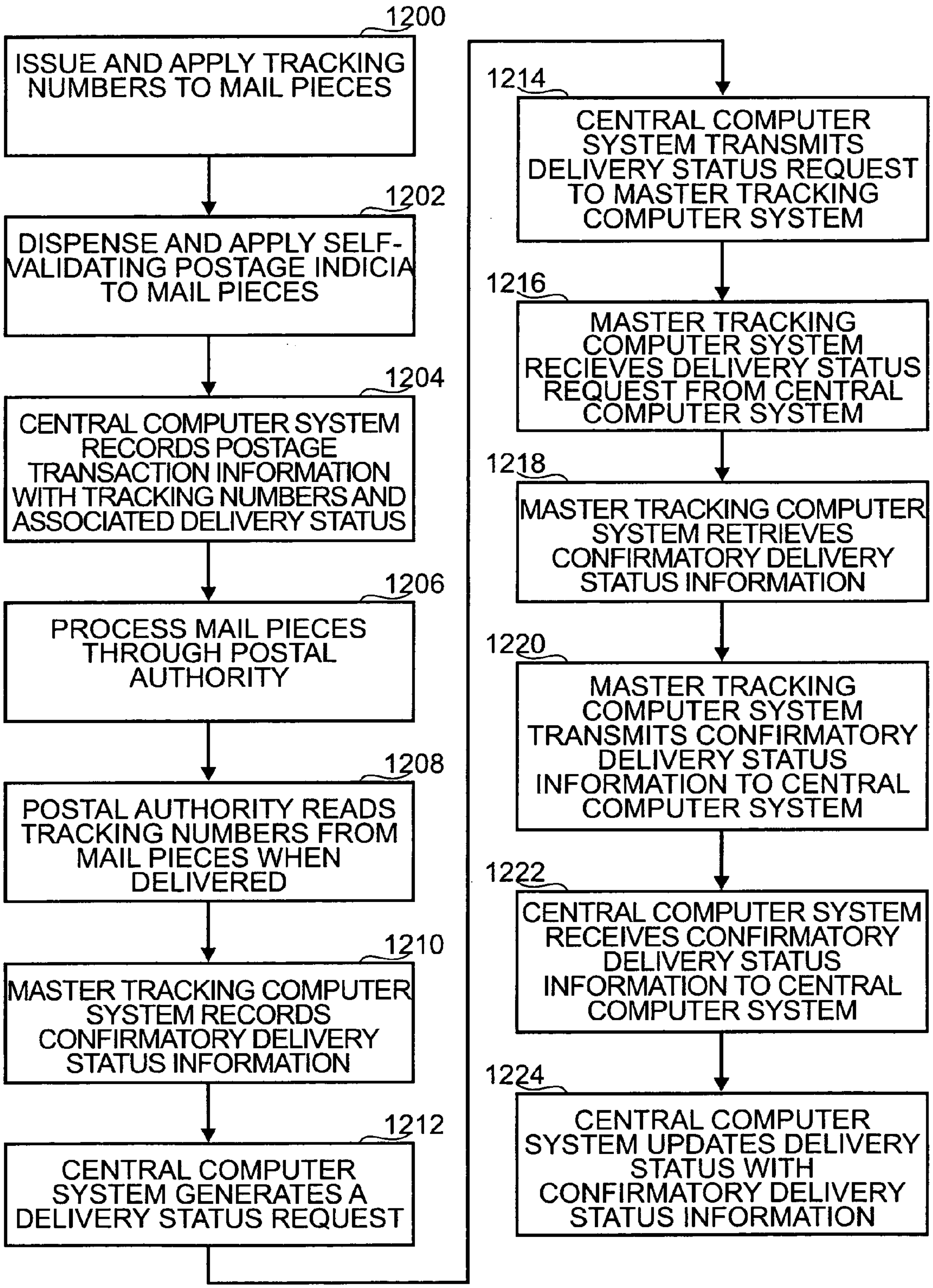
FIG. 31 is a flow diagram illustrating a procedure for accumulating and updating postage transaction information stored in the centralized postage-issuing computer system of FIG. 29.

Referring to specifically FIG. 31, and with general reference to FIGS. 29 and 30, the procedure for accumulating and updating the postage transaction information, including the tracking ID's and associated delivery status, will now be described. At step 1200, tracking ID's are issued and applied to a multitude of mail pieces, as previously described. Specifically, the tracking ID's can be indirectly issued from the master tracking computer system 390 to the end user computers 388 via the centralized postage-issuing computer system 386, as in steps 500-525 of FIG. 9. Alternatively, the tracking ID's can be directly issued from the centralized postage-issuing computer system 386, as in steps 528-544 of FIG. 10. Even more alternatively, the tracking ID's can be directly issued from the master tracking computer system 390 to the end user computers 388, as in steps 546-578 of FIG. 12. At step 1202, self-validating postage indicia are dispensed and applied to the mail pieces, which is described in detail as steps 600-622 of FIG. 13.

At step 1204, the postage transaction information, along with the tracking ID's and associated delivery status, is recorded. Specifically, the database management module 1136 stores the postage transaction information in the postage database 1130. At step 1206, the multitude of mail pieces are processed through the postal authority, which in this case, is the USPS. At step 1208, the postal authority, upon delivery of the mail pieces to their intended destination, reads the tracking ID's on the mail pieces. At step 1210, this delivery information is transmitted to and recorded in the master tracking computer system 390: Specifically, the database management module 1178 updates the confirmatory delivery status information in the tracking information database 1172 by changing the status from "accepted" to "delivered."

At steps 1212 and 1214, the centralized postage-issuing computer system 386 generates and transmits a delivery status request to the master tracking computer system 390. Specifically, the delivery status request module 1143 generates a delivery status request (step 1212), and the communications interface 1122 then, under control of the communications module 1134, transmits the delivery status request over the communications link 396 (step 1214). At steps 1216-1220, the master tracking computer system 390 receives the delivery status request from the centralized postage-issuing computer system 386 and transmits the confirmatory delivery status information to the centralized postage-issuing computer system 386. Specifically, the communications interface 1166, under control of the communications module 1174, receives the delivery status request over the communications link 396 (step 1216). The database management module 1178 then retrieves the confirmatory delivery status information from the tracking information database 1172 (step 1218), and the communications interface 1166 then, under control of the communications module 1174, transmits the confirmatory delivery status information over the communications link 316 (step 1220). Alternatively, the confirmatory delivery status information can periodically be downloaded from the master tracking computer system 390 without prompting by the centralized postage-issuing computer system 386.

At steps 1222 and 1224, the centralized postage-issuing computer system 386 receives the confirmatory delivery status information from the master tracking computer system 310 and updates the delivery status within the stored postage transaction information with the confirmatory delivery status information. In particular, the communications interface 1222, under control of the communications module 1234, receives the confirmatory delivery status information over the communications link 396 (step 1222). The database management module 1136 then updates the delivery status within the postage database 1130 (step 1224). If the confirmatory delivery status information indicates that the mail piece carrying the tracking ID has been delivered, the delivery status associated with that tracking ID will be updated as delivered. If the confirmatory delivery status information indicates that the mail piece carrying the tracking ID has not been delivered, the delivery status associated with that tracking ID will be updated as not delivered.

Figure 32:
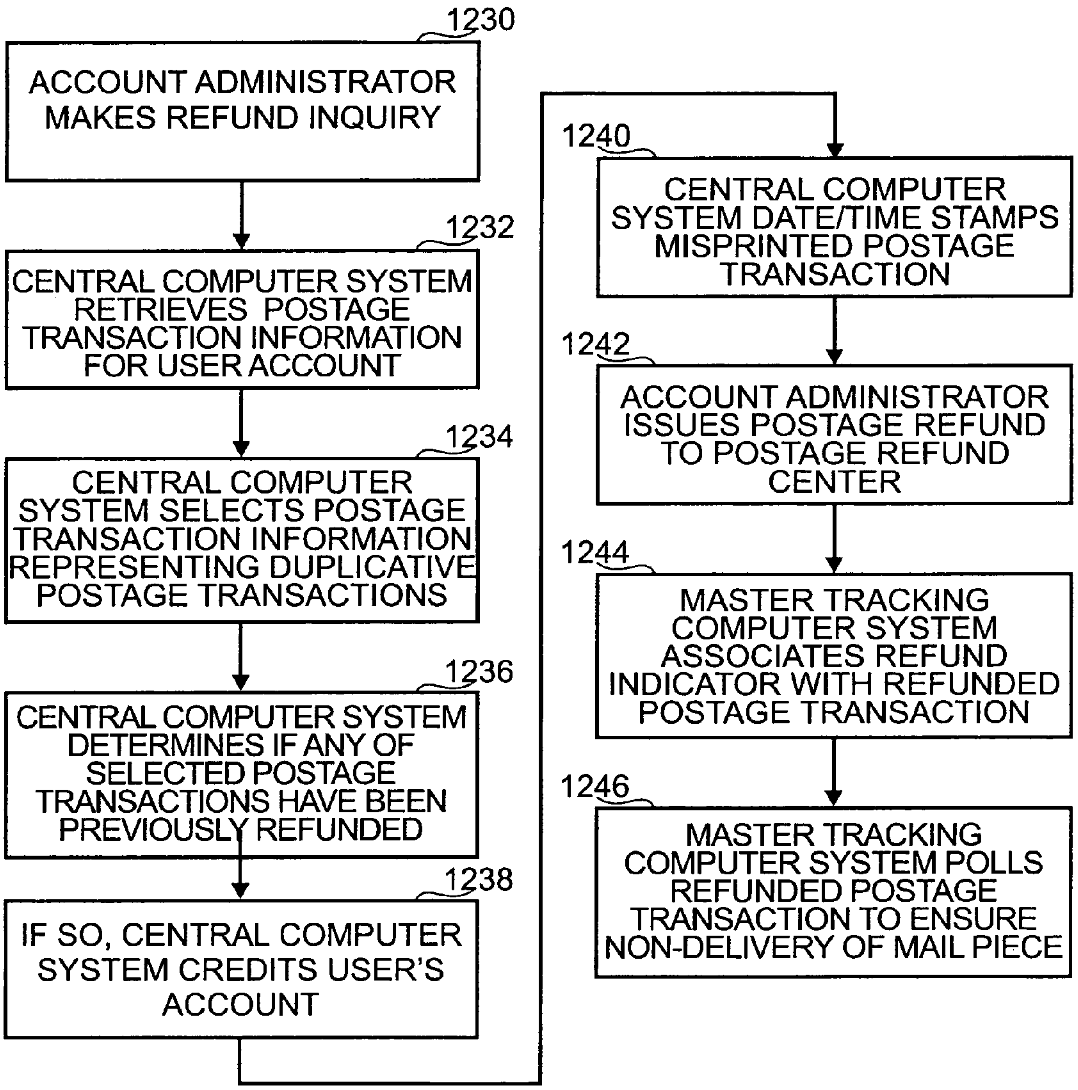
FIG. 32 is a flow diagram illustrating a procedure for issuing a refund within the centralized postage-issuing computer system of FIG. 29.

Referring to specifically FIG. 32, and with general reference to FIG. 29, the procedures for issuing a refund will now be described. At step 1230, the account administrator operates the user interface 1123 of the centralized postage-issuing computer system 386 to make a refund inquiry. The type of refund inquiry can be, e.g., any of the three refund inquiries described above (refund eligible inquiry, audit review, or refund pattern audit), but for purposes of the following explanation the refund eligible inquiry will be described. At step 1232, the database management module 1136 retrieves for a specific user account the postage transaction information from the postage database 1130. At step 1234, the filtering module 1145 selects the postage transaction information representing duplicative postage transaction. In particular, it selects the postage transactions that carry tracking ID's that have never been refunded in the past, that are issued for the specific user account, and that have identical key postage transaction items, i.e., postage transaction date, destination zip code, service class, and postage amount. At step 1236, the filtering module 1145 then determines if any of the selected postage transactions have been previously refunded. If so, it is determined that a refund for that postage transaction is forthcoming. In this case, the database management module 1136, at step 1238, credits the user's account for the misprint in the finance database 1132. At step 1240, the database management module 1136 then date/time stamps the misprint postage transaction in the postage database 1130. In this manner, the filtering module 1145 will filter out this refunded postage transaction in the future, so that it is not refunded multiple times. At step 1242, the account administrator issues a refund request to the postage refund center 392 of the postal authority (e.g., USPS).

At steps 1244 and 1246, the postal authority then enters the refunded postage transaction into the master tracking computer system 390, where the delivery status can be checked for six more months. In particular, the database management module 1178 will associate a refund indicator with the postage information relating to the refunded postage transaction (step 1244), and the refunded postage polling module 1180 periodically polls the tracking information database 1172 to determine if a mail piece associated with any refunded postage transaction has been delivered (step 1246).

It should be noted that the refund process even allows an end user to initiate a refund inquiry without intervention by the account administrator. In this case, the end user will would have to wait the required minimum time to ensure the "never mailed package" doesn't show up on the tracking system, but then the process is so automatic that the refund could be instituted entirely without an account administrator's intervention.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. Thus, the present inventions are intended to cover alternatives, modifications, and equivalents, which may be included within the spirit and scope of the present inventions as defined by the claims. All publications, patents, and patent applications cited herein are hereby incorporated by reference in their entirety for all purposes.

What is claimed is:

1. A method for detecting postage fraud using an indexed lookup procedure, comprising:

receiving, at a postage-issuing computer system, a request for a postage transaction from an end user computer;

allocating a unique tracking number to the requested postage transaction, wherein the unique tracking number allocated to the postage transaction provides a mail piece tracking capability within the United States Postal Service (USPS);

generating, at the postage-issuing computer system, a unique postage indicium for the requested postage transaction, wherein the unique postage indicium contains the unique tracking number allocated to the postage transaction that provides the mail piece tracking capability within the USPS;

storing information for the postage transaction in a postage database coupled to the postage-issuing computer system, wherein the information stored for the postage transaction includes the unique tracking number and the unique postage indicium;

indexing the information stored for the postage transaction in the postage database with the unique tracking number allocated to the postage transaction;

retrieving the information indexed with the unique tracking number from the postage database in response to receiving a validation request from the USPS, wherein the validation request received from the USPS relates to a mail piece carrying a printed postage indicium that contains the unique tracking number;

comparing the information retrieved from the postage database to one or more records in a transaction database that stores one or more tracking numbers contained in one or more postage indicia carried on mail pieces previously handled by the USPS; and transmitting, from the postage-issuing computer system to the USPS, data indicating whether the unique tracking number contained in the printed postage indicium carried on the mail piece matches any of the records in the transaction database, wherein the USPS submits the mail piece for normal delivery if the data transmitted from the postage-issuing computer system indicates that the unique tracking number contained in the printed postage indicium carried on the mail piece does not match any of the records in the transaction database.

2. The method of claim 1, wherein the information stored for the postage transaction further includes one or more of a postage amount, a date, a time, a service class, an optional data advance, a meter number, an account number, or a destination zip code.

3. The method of claim 1, further comprising:

applying a private key to the unique postage indicium to derive a digital signature from the unique postage indicium, wherein the information stored for the postage transaction in the postage database further includes the digital signature derived from the unique postage indicium; and transmitting, from the postage-issuing computer system, the digital signature derived from the unique postage indicium to the USPS in response to the validation request, wherein the USPS verifies that the postage-issuing computer system generated the printed postage indicium carried on the mail piece if the digital signature transmitted from the postage-issuing computer system is consistent with a digital signature derived from the printed postage indicium carried on the mail piece.

4. The method of claim 1, wherein allocating the unique tracking number to the requested postage transaction includes:

requesting the unique tracking number from the USPS, wherein the postage-issuing computer system requests the unique tracking number from the USPS; and receiving the unique tracking number from the USPS at the postage-issuing computer system prior to allocating the unique tracking number to the postage transaction.

5. The method of claim 1, wherein the unique tracking number comprises a delivery confirmation code.

6. The method of claim 5, further comprising:

applying a private key to the delivery confirmation code to derive a digital signature from the unique postage indicium, wherein the information stored for the postage transaction in the postage database further includes the digital signature derived from the unique postage indicium; and transmitting, from the postage-issuing computer system, the digital signature derived from the unique postage indicium to the USPS in response to the validation request, wherein the USPS verifies that the postage-issuing computer system generated the printed postage indicium carried on the mail piece if the digital signature transmitted from the postage-issuing computer system is consistent with a digital signature derived from the printed postage indicium carried on the mail piece.

7. The method of claim 1, wherein the postage-issuing computer system receives the validation request from the USPS over a communications link connecting the postage-issuing computer system with a computer system at the USPS.

8. The method of claim 7, wherein the postage-issuing computer system transmits the data indicating whether the unique tracking number contained in the printed postage indicium carried on the mail piece matches any of the records in the transaction database to the USPS over the communications link.

9. The method of claim 8, further comprising transmitting the unique tracking number and the unique postage indicium to the end user computer in a format that enables the end user computer to print a one-dimensional bar code representative of the unique tracking number and a two-dimensional bar code representative of the unique postage indicium.

10. The method of claim 9, wherein the computer system at the USPS displays the data transmitted from the postage-issuing computer system.

11. The method of claim 10, wherein the USPS verifies that the mail piece was sent from a trusted entity if the data transmitted from the postage-issuing computer system includes one or more of a meter number or an account number.

12. The method of claim 11, wherein the postage-issuing computer system transmits the unique tracking number and the unique postage indicium to the end user computer over another communications link connecting the postage-issuing computer system with the end user computer.

13. The method of claim 1, further comprising:

comparing the unique postage indicium indexed with the unique tracking number in the postage database to the printed postage indicium carried on the mail piece, wherein the validation request received from the USPS identifies the printed postage indicium carried on the mail piece.

14. The method of claim 13, further comprising:

transmitting, from the postage-issuing computer system to the USPS, a response to the validation request received from the USPS, wherein the response to the validation request indicates whether the unique postage indicium indexed with the unique tracking number in the postage database matches the printed postage indicium carried on the mail piece, wherein the USPS submits the mail piece for the normal delivery if the response to the validation request indicates that the unique postage indicium indexed with the unique tracking number in the postage database matches matching the printed postage indicium carried on the mail piece.

15. The method of claim 14, wherein the USPS does not submit the mail piece for the normal delivery if the response to the validation request indicates that the unique postage indicium indexed with the unique tracking number in the postage database does not match the printed postage indicium carried on the mail piece.

16. The method of claim 1, wherein the USPS does not submit the mail piece for the normal delivery if the data transmitted from the postage-issuing computer system indicates that the unique tracking number contained in the printed postage indicium carried on the mail piece matches one or more of the records in the transaction database.

17. A system for detecting postage fraud using an indexed lookup procedure, comprising:

a postage database coupled to a postage-issuing computer system, wherein the postage database stores one or more records describing unique postage indicia generated by the postage-issuing computer system;

a transaction database coupled to the postage-issuing computer system, wherein the transaction database stores one or more records describing one or more tracking numbers contained in one or more postage indicia carried on mail pieces previously handled by the United States Postal Service (USPS);

a communications link that connects the postage-issuing computer system with an end user computer, and that further connects the postage-issuing computer system with a computer system at the USPS; and one or more software modules that execute on the postage-issuing computer system, wherein executing the one or more software modules on the postage-issuing computer system causes the postage-issuing computer system to:

receive a request for a postage transaction from the end user computer;

allocate a unique tracking number to the requested postage transaction, wherein the unique tracking number allocated to the postage transaction provides a mail piece tracking capability within the USPS;

generate a unique postage indicium for the requested postage transaction, wherein the unique postage indicium contains the unique tracking number allocated to the postage transaction that provides the mail piece tracking capability within the USPS;

store information for the postage transaction in the postage database, wherein the information stored for the postage transaction includes the unique tracking number and the unique postage indicium;

index the information stored for the postage transaction in the postage database with the unique tracking number allocated to the postage transaction;

retrieve the information indexed with the unique tracking number from the postage database in response to receiving a validation request from the computer system at the USPS, wherein the validation request received from the USPS relates to a mail piece carrying a printed postage indicium that contains the unique tracking number;

compare the information retrieved from the postage database to the records in the transaction database that stores the tracking numbers contained in the postage indicia carried on the mail pieces previously handled by the USPS; and transmit data indicating whether the unique tracking number contained in the printed postage indicium carried on the mail piece matches any of the records in the transaction database to the USPS, wherein the USPS submits the mail piece for normal delivery if the transmitted data indicates that the unique tracking number contained in the printed postage indicium carried on the mail piece does not match any of the records in the transaction database.

18. The system of claim 17, wherein the information stored for the postage transaction further includes one or more of a postage amount, a date, a time, a service class, an optional data advance, a meter number, an account number, or a destination zip code.

19. The system of claim 17, wherein executing the one or more software modules on the postage-issuing computer system further causes the postage-issuing computer system to:

apply a private key to the unique postage indicium to derive a digital signature from the unique postage indicium, wherein the information stored for the postage transaction in the postage database further includes the digital signature derived from the unique postage indicium; and transmit the digital signature derived from the unique postage indicium to the USPS in response to the validation request, wherein the USPS verifies that the postage-issuing computer system generated the printed postage indicium carried on the mail piece if the digital signature transmitted from the postage-issuing computer system is consistent with a digital signature derived from the printed postage indicium carried on the mail piece.

20. The system of claim 19, wherein the postage-issuing computer system applies the private key to the unique tracking number contained in the unique postage indicium to derive the digital signature from the unique postage indicium.

21. The system of claim 17, wherein executing the one or more software modules on the postage-issuing computer system further causes the postage-issuing computer system to:

request the unique tracking number from the computer system at the USPS; and receive the unique tracking number from the computer system at the USPS prior to allocating the unique tracking number to the postage transaction.

22. The system of claim 17, wherein the USPS verifies that the mail piece was sent from a trusted entity if the data transmitted from the postage-issuing computer system includes one or more of a meter number or an account number.

23. The system of claim 17, wherein the unique tracking number comprises a delivery confirmation code.

24. The system of claim 17, wherein executing the one or more software modules on the postage-issuing computer system further causes the postage-issuing computer system to:

compare the unique postage indicium indexed with the unique tracking number in the postage database to the printed postage indicium carried on the mail piece, wherein the validation request received from the USPS identifies the printed postage indicium carried on the mail piece.

25. The system of claim 24, wherein executing the one or more software modules on the postage-issuing computer system further causes the postage-issuing computer system to transmit a response to the validation request to the USPS, wherein the response to the validation request indicates whether the unique postage indicium indexed with the unique tracking number in the postage database matches the printed postage indicium carried on the mail piece, wherein the USPS submits the mail piece for the normal delivery if the response to the validation request indicates that the unique postage indicium indexed with the unique tracking number in the postage database matches the printed postage indicium carried on the mail piece.

26. The system of claim 25, wherein the USPS does not submit the mail piece for the normal delivery if the response to the validation request indicates that the unique postage indicium indexed with the unique tracking number in the postage database does not match the printed postage indicium carried on the mail piece.

27. The system of claim 17, wherein the USPS does not submit the mail piece for the normal delivery if the data transmitted from the postage-issuing computer system indicates that the unique tracking number contained in the printed postage indicium carried on the mail piece matches one or more of the records in the transaction database.

28. A method for detecting postage fraud using an indexed lookup procedure, comprising:

generating, at a postage-issuing computer system, a unique postage indicium in response to receiving a request for a postage transaction from an end user computer, wherein the unique postage indicium contains a unique delivery confirmation code allocated to the postage transaction, and wherein the unique delivery confirmation code provides a mail piece tracking capability within the United States Postal Service (USPS);

storing information for the postage transaction in a postage database coupled to the postage-issuing computer system, wherein the information stored for the postage transaction includes the unique delivery confirmation code and the unique postage indicium;

indexing the information stored for the postage transaction in the postage database with the unique delivery confirmation code allocated to the postage transaction;

retrieving the information indexed with the unique delivery confirmation code from the postage database in response to receiving a validation request from the USPS, wherein the validation request received from the USPS relates to a mail piece carrying a printed postage indicium that contains the unique delivery confirmation code;

comparing the information retrieved from the postage database to one or more records in a transaction database that stores one or more delivery confirmation codes contained in one or more postage indicia carried on mail pieces previously handled by the USPS; and transmitting, from the postage-issuing computer system to the USPS, data indicating whether the unique delivery confirmation code contained in the printed postage indicium carried on the mail piece matches any of the records in the transaction database, wherein the USPS submits the mail piece for normal delivery if the data transmitted from the postage-issuing computer system indicates that the unique delivery confirmation code contained in the printed postage indicium carried on the mail piece does not match any of the records in the transaction database.

* * * * *